United States Patent Office 2,792,716
Patented May 21, 1957

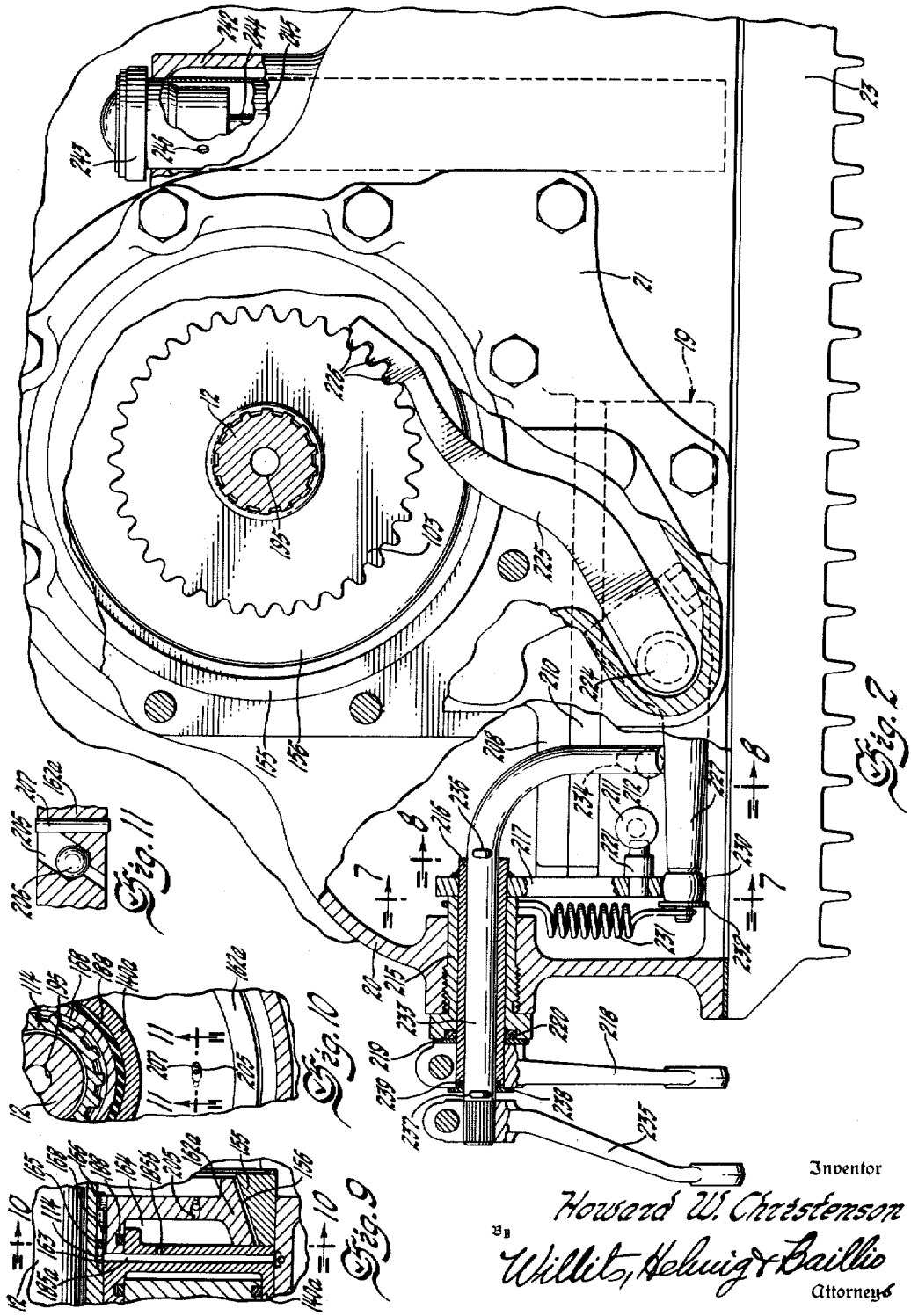

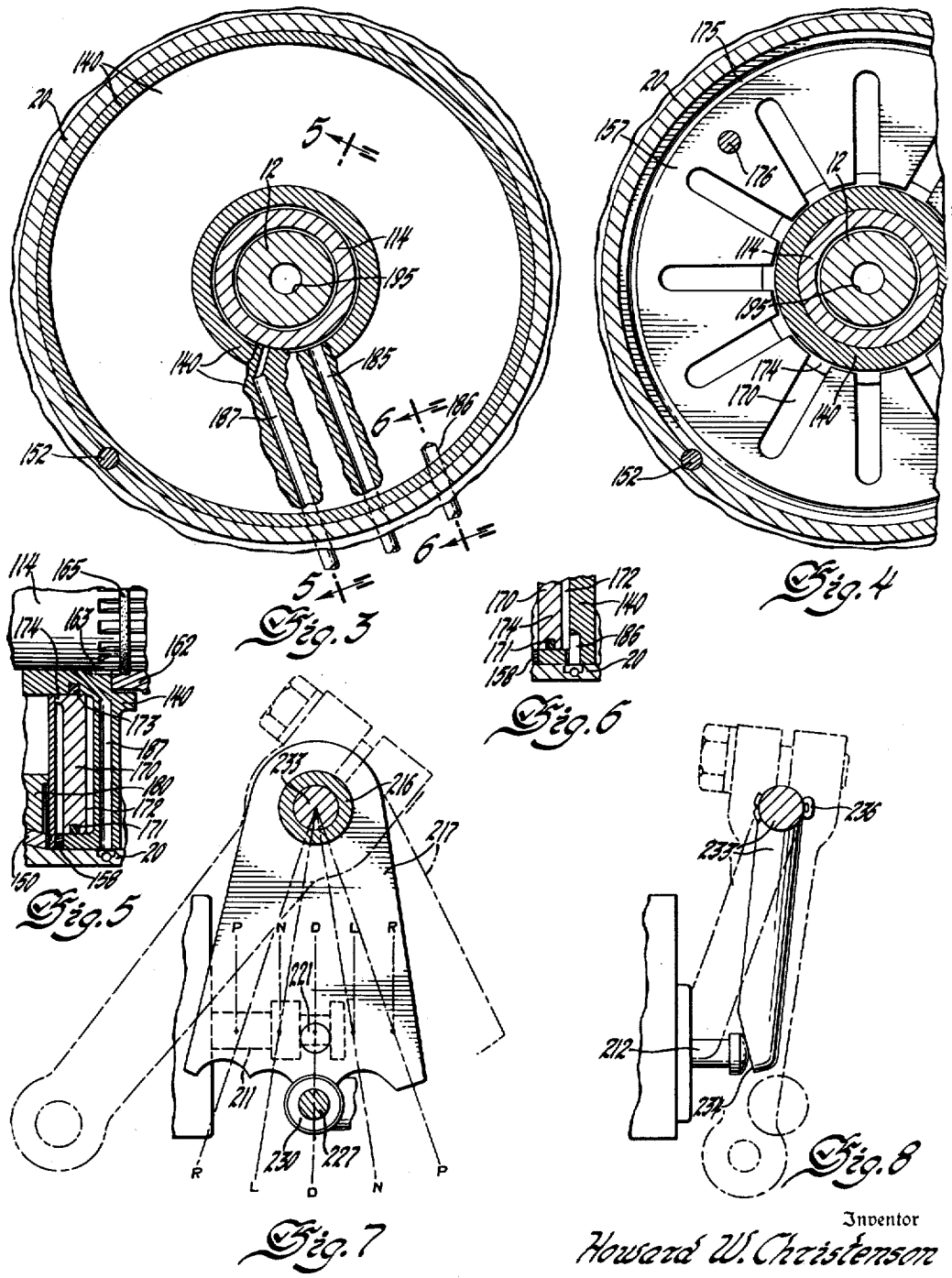

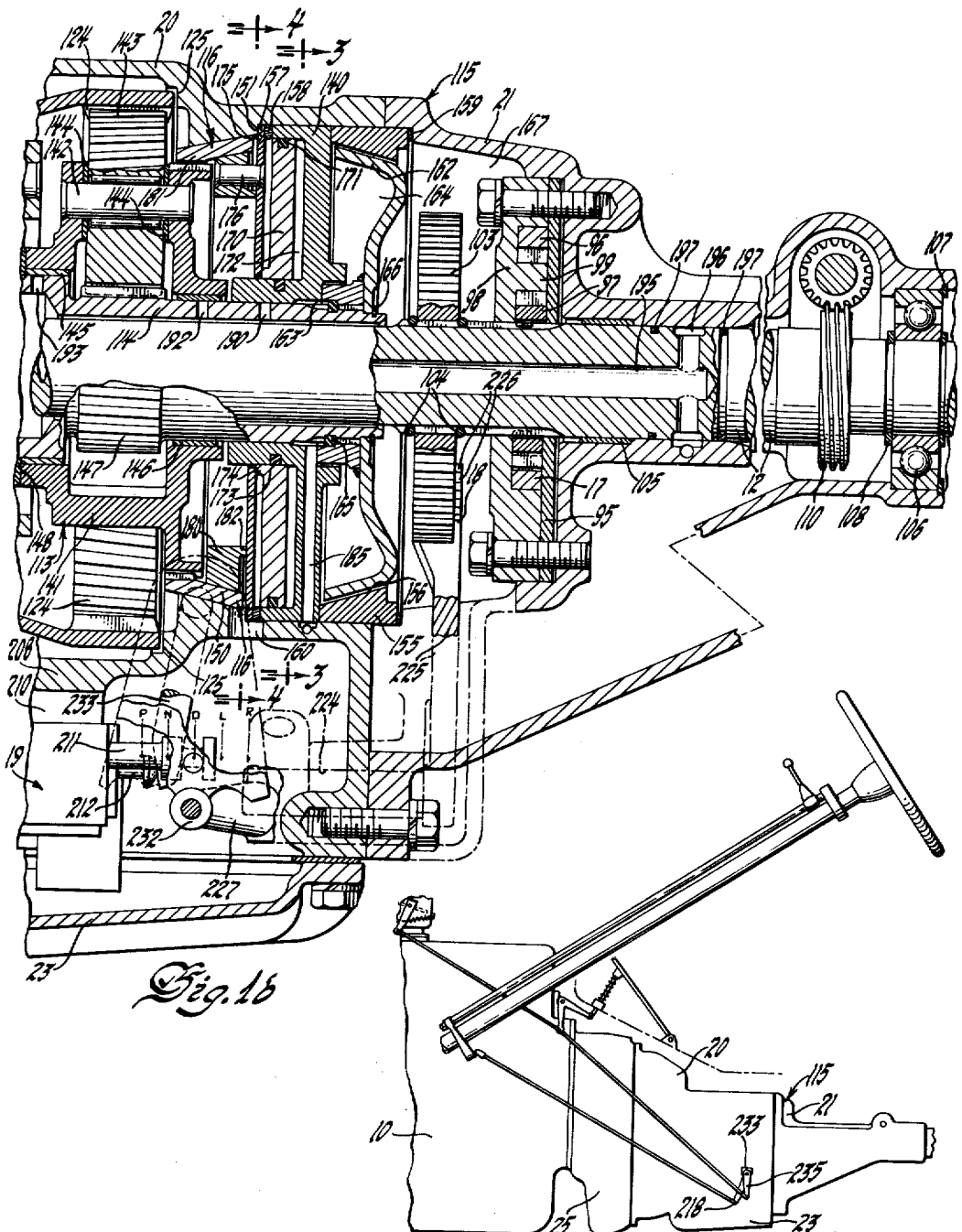

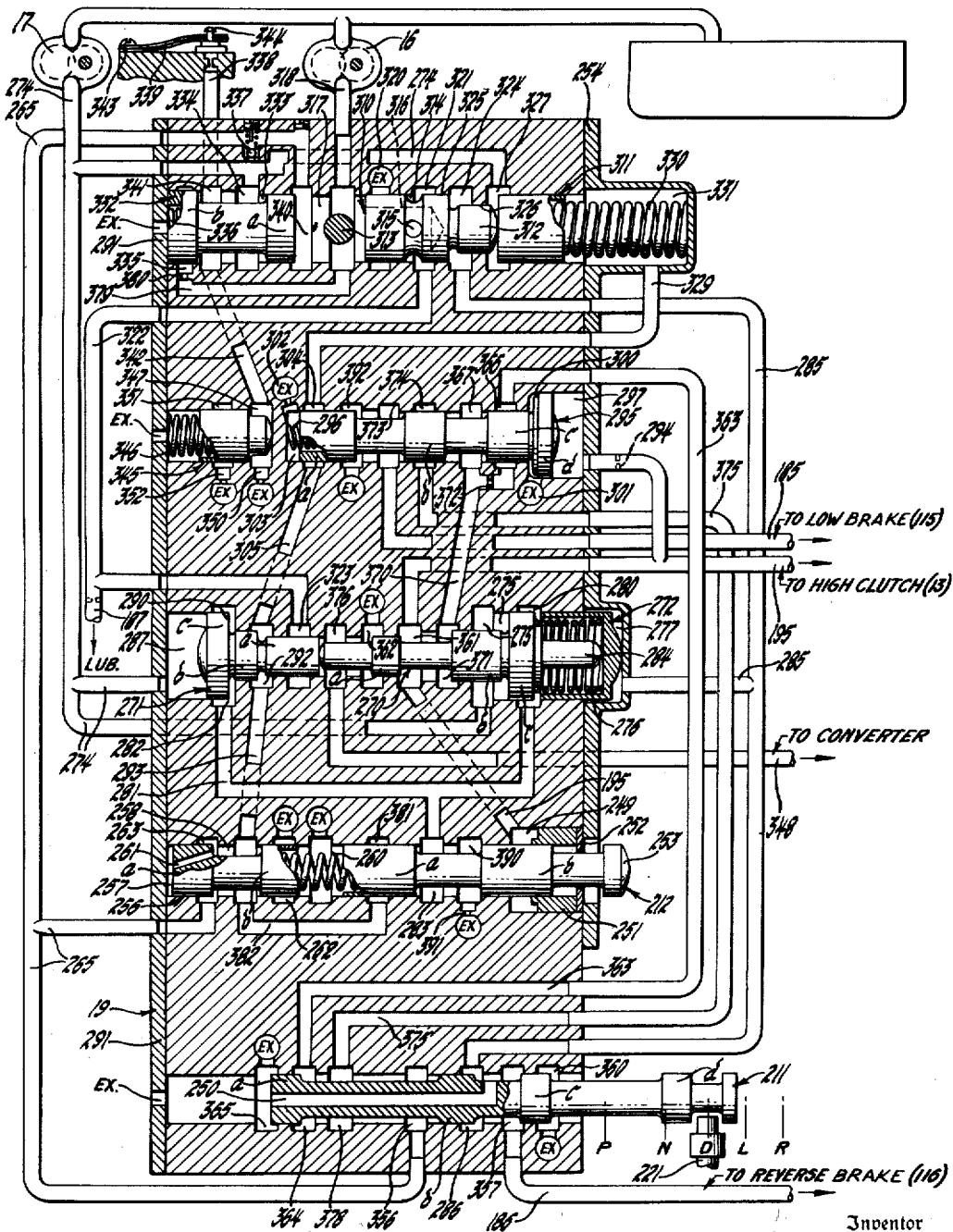

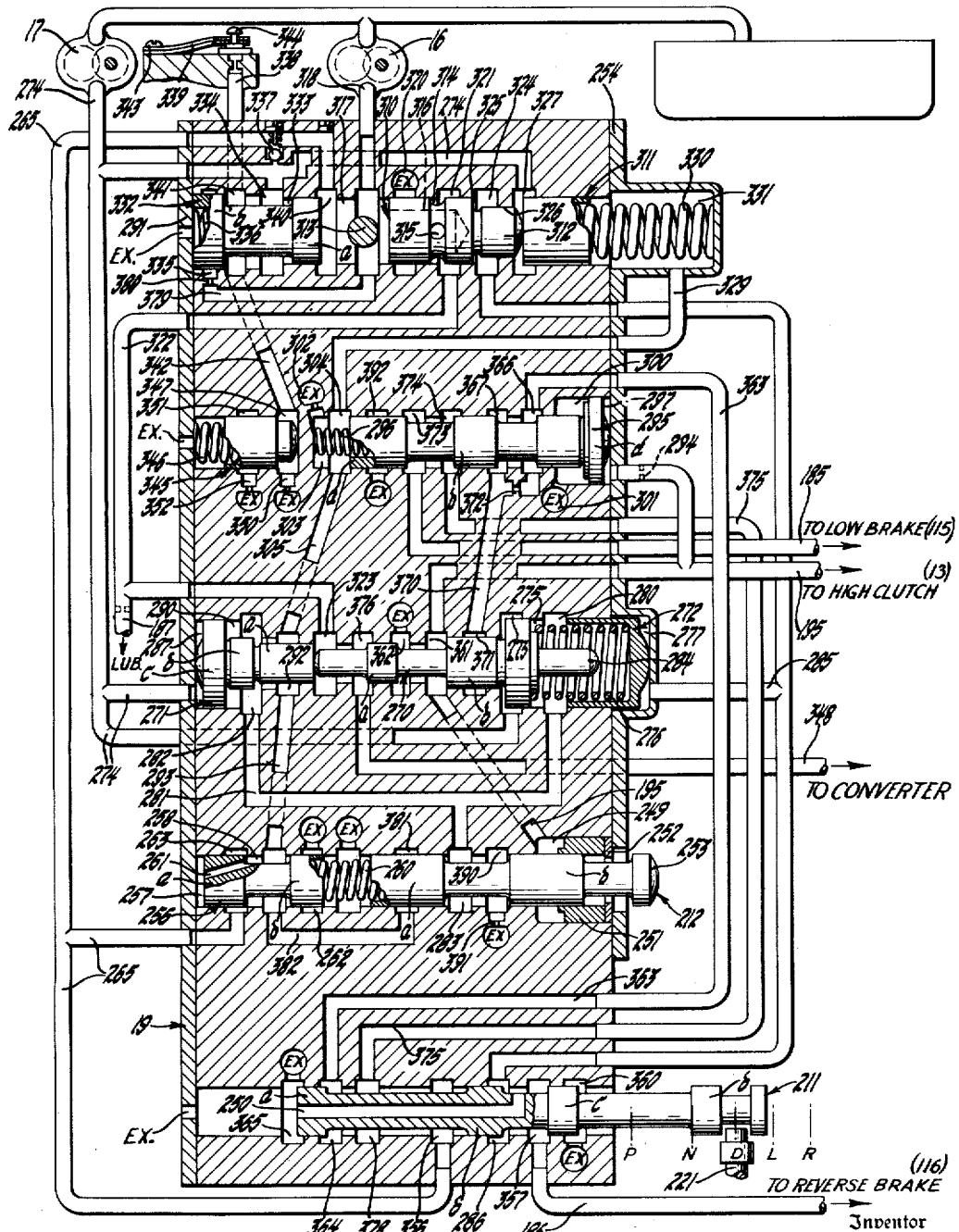

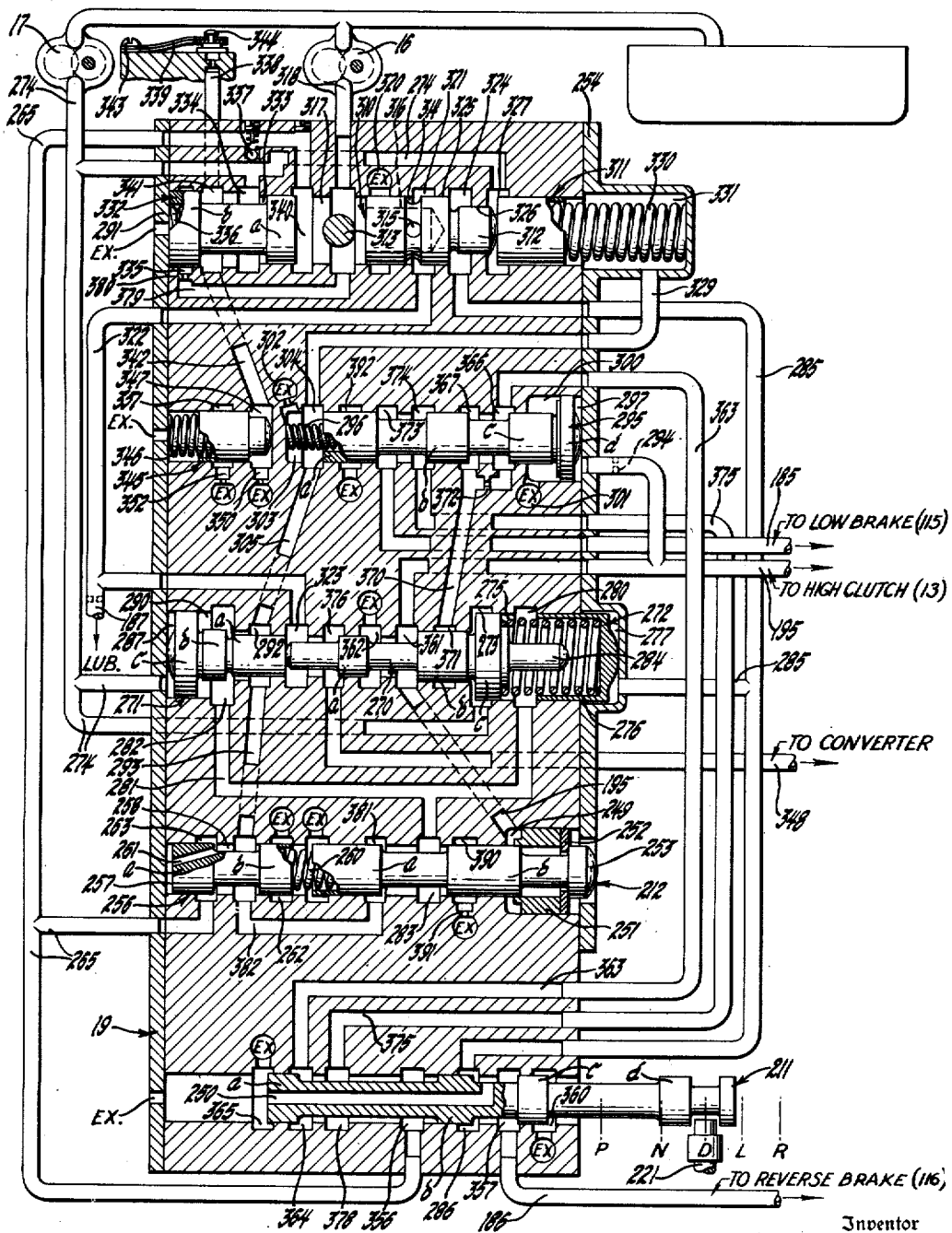

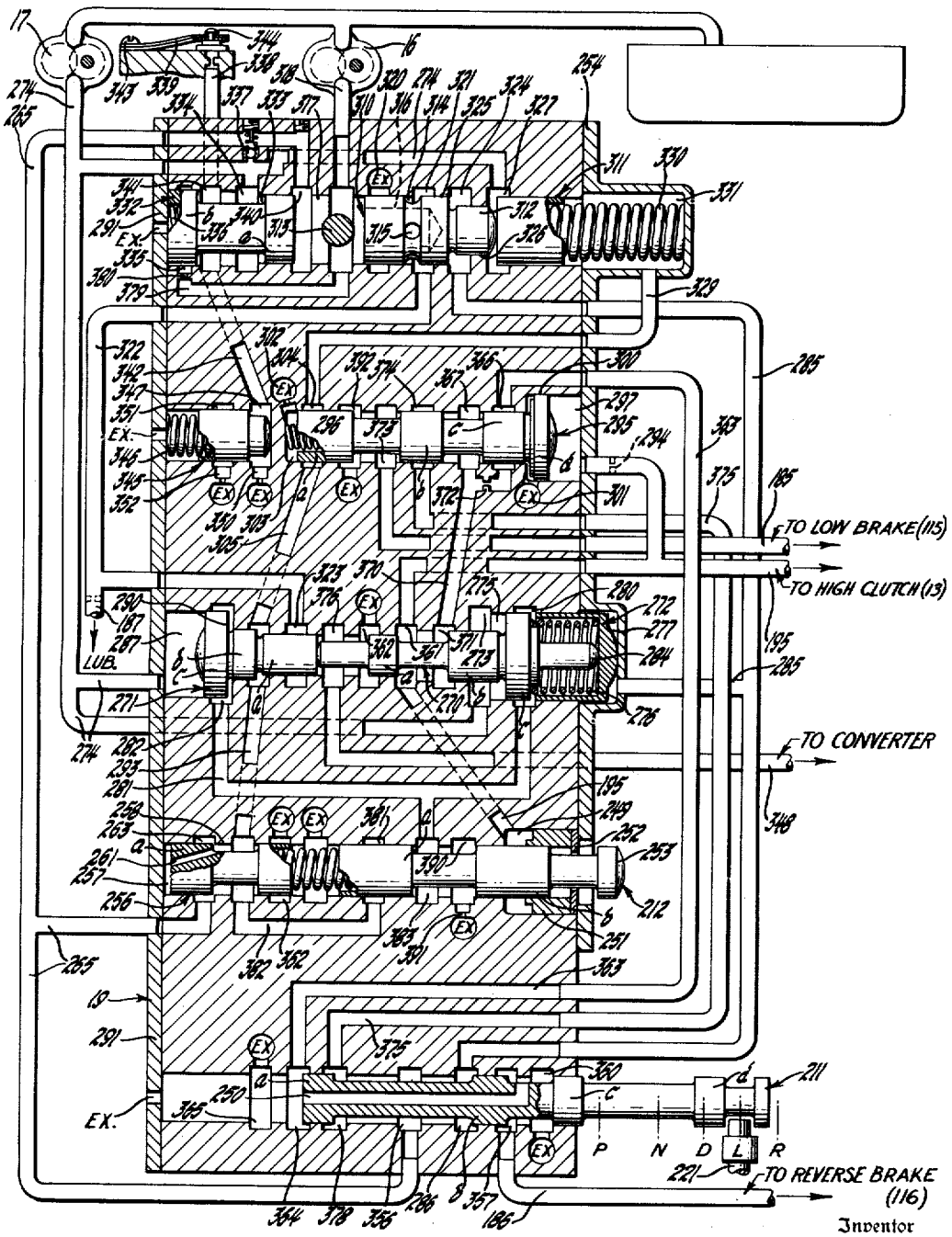

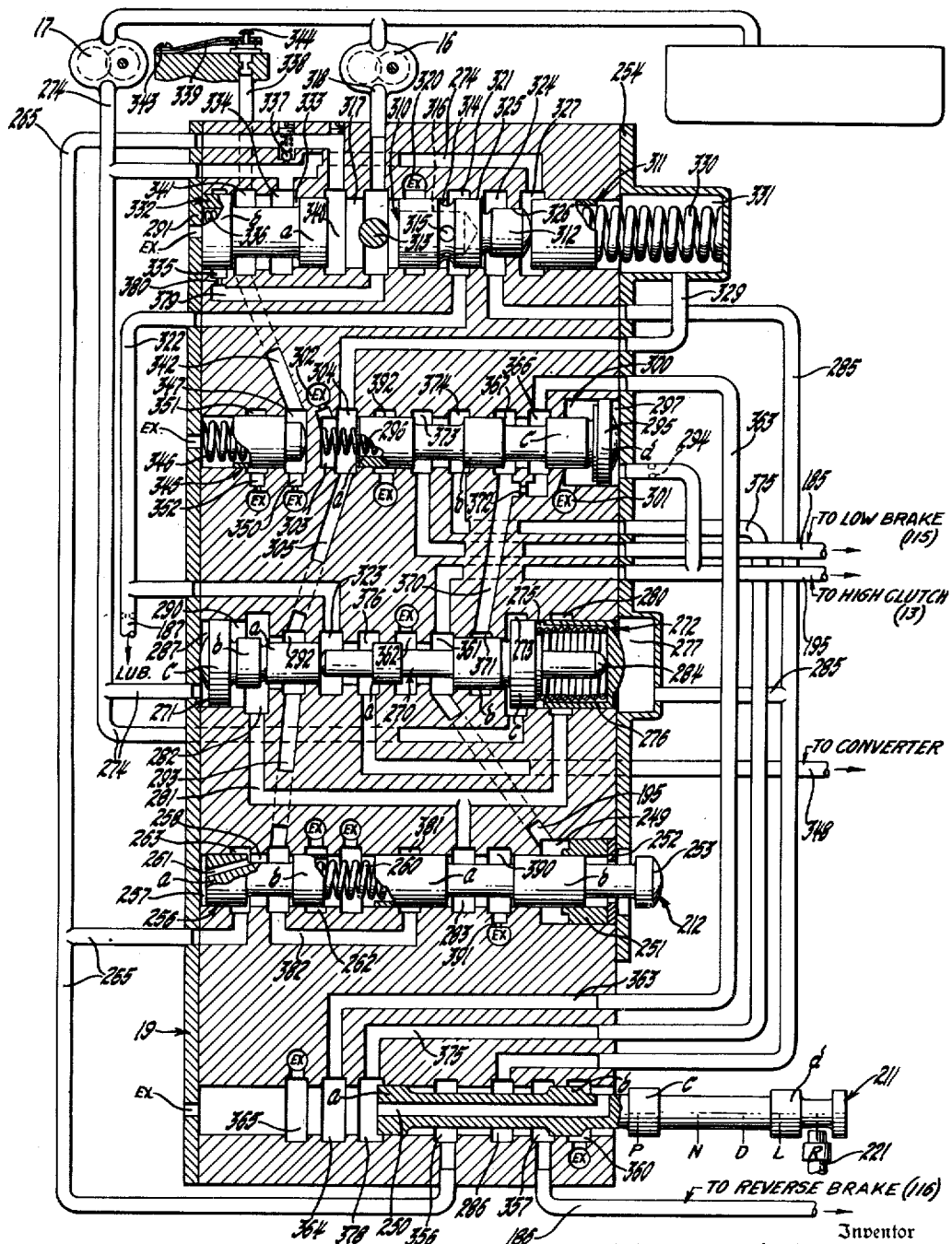

2,792,716
AUTOMATIC TRANSMISSION FOR VEHICLES

Howard W. Christenson, Plainfield, Ind., assignor to General Motors Corporation, Detroit, Mich., a corporation of Delaware Application April 13, 1951, Serial No. 220,902

51 Claims. (Cl. 74—472)

This invention relates to power transmission mechanism and particularly to an improved transmission adapted for use in motor vehicles.

An object of this invention is to combine mechanical and hydraulic features to provide an improved transmission.

A further object of the invention is to provide a transmission which obtains the benefits of smooth starting and rapid acceleration provided by a hydraulic torque converter, and which also obtains the benefits of high gasoline economy and the solid feel which is provided by a gearless direct drive.

Another object of the invention is to provide an improved transmission which is arranged so that only one shift occurs in the transmission gear ratios during acceleration from a standstill to full direct drive.

A further object of the invention is to provide an improved transmission of the type described which is arranged so that a centrifugal governor is not required.

Another object of the invention is to provide a transmission employing an engine driven pump and an output shaft driven pump, the transmission being arranged so that during normal operation the liquid supplied by the output shaft driven pump is employed only to indicate the speed of the output shaft, thereby insuring that this speed will be indicated accurately by liquid supplied by this pump and permitting the output shaft pump to be of small size so that little power is consumed in driving the pump.

A further object of the invention is to provide an improved transmission of the type described which is arranged so that liquid under pressure supplied by the output shaft driven pump is available for operation of elements of the transmission during periods in which the vehicle is being pushed or towed for the purpose of starting the vehicle engine.

Another object of the invention is to provide an improved transmission of the type described which is arranged so that when the vehicle is being towed or pushed for the purpose of starting the vehicle engine, a relatively high pressure is developed at relatively low vehicle speeds on the liquid supplied by the output shaft driven pump so that an effective driving connection is established from the output shaft through the transmission to the engine at relatively low vehicle speeds and the vehicle engine can be started readily.

A further object of the invention is to provide an improved transmission of the type described which is arranged to insure that when the vehicle is being towed or pushed for the purpose of starting the vehicle engine, the direct drive clutch will remain engaged until the engine starts.

Another object of the invention is to provide an improved transmission having friction drive-establishing members which respectively provide low speed drive and high speed or direct drive in which the drive-establishing members are so arranged that the direct drive member (ordinarily a clutch) will at least be partially engaged before the low speed drive-establishing member (ordinarily a brake) is released so that a load is continuously maintained on the engine during this change in the transmission gear ratios, and the engine speed will not increase objectionably, but so that because of the increased load on the engine as a result of engagement of the direct drive clutch, the engine speed will decrease somewhat so as to correspond with the vehicle speed, with the transmission in direct drive, and thereby insure that the shift to direct drive is smooth and gradual.

A further object of the invention is to provide an improved transmission of the type described which is arranged so that the degree of overlap of the low and high speed drive-establishing devices, in shifting from low to high speed, varies in accordance with the position of the vehicle throttle, and therefore in accordance with the torque transmitted through the transmission.

Another object of the invention is to provide an improved transmission of the type described which is arranged so that during changes between low gear and direct drive there is an overlap in the engagement of the low gear and direct drive establishing devices, and so that the operation of the equipment is different in changing from low gear to direct drive than in changing from direct drive to low gear.

A still further object of the invention is to provide an improved transmission of the type described which is arranged so that during shifting of the transmission from direct drive to drive through a gear reduction, the direct drive clutch will become partially released to a predetermined degree before the drive-establishing device controlling governing the reduction gears becomes effectively engaged with the result that during a brief interval there is a reduction in the load on the vehicle engine during which the speed of the engine will increase to drive-establishing more nearly correspond with the vehicle speed upon complete engagement of the device controlling governing the reduction gears, and the shift from direct drive to drive through the reduction gears will take place smoothly.

Another object of the invention is to provide an improved transmission which is arranged so that the drive establishing devices employed therein are operated by liquid at relatively low pressure so that a minimum of power is consumed in driving the pumps which supply the liquid under pressure.

A further object of the invention is to provide an improved transmission which is arranged so that the direct drive clutch is engaged during most of the time the vehicle is being operated, and so that the pressure of the liquid required to operate the direct drive clutch is the minimum value.

Another object of the invention is to provide an improved transmission which is arranged so that the pressure of the liquid employed to operate the drive-establishing devices employed therein is varied in accordance with the throttle opening and the speed of the vehicle, and is also varied in accordance with the torque requirements of transmission as determined by the gear ratio being used.

A further object of the invention is to provide a transmission in which the valve controlled by the position of the throttle is provided with a hydraulic detent for indicating to the operator when the throttle has been moved towards the full open position to the point beyond which movement of the throttle and the associated transmission valve may result in shifting of the transmission to a lower driving ratio.

Another object of the invention is to provide a transmission in which drive through helical reduction gears is effected by engagement of a cone brake in which the engaging force of the stationary and movable brake members is augmented by axail thrust developed by the gears during transmission of power through them.

A further object of the invention is to provide a transmission in which both forward and reverse drive through reduction gears is controlled by hydraulically operated cone devices which are simple and inexpensive to construct and assemble, and which do not require adjustment or attention because of wear during use.

Another object of the invention is to provide a transmission in which both forward and reverse drive through reduction gears is controlled by devices which are constructed so that wear on the engaging surfaces of the devices is automatically taken up by the hydraulic operating means.

A further object of the invention is to provide a transmission in which the gear reduction in both forward and reverse is provided by a planetary gear set which is of simple rugged design.

Another object of the invention is to provide an improved hydraulically controlled transmission of the type described which is arranged so that all forces exerted on the hydraulically operated elements are exerted concentrically of the axis of the transmission elements.

A further object of the invention is to provide an improved transmission of the type described which incorporates improved means for insuring prompt discharge of liquid from the operating chamber of an expansible chamber motor which operates a friction drive-establishing device.

Another object of the invention is to provide an improved transmission of the type described which is arranged so that a limited quantity of air is retained in an operating chamber of an expansible chamber motor during engagement of a friction drive-establishing device operated by such motor so that the friction drive device engages gradually and without shock.

A further object of the invention is to provide an improved manually controlled automatic transmission, the manual control being arranged to insure manual overcontrol of the transmission irrespective of failure of operation of the automatic governor controlled valves effecting automatic control of the transmission.

Another object of the invention is to provide a transmission of the type described and employing a planetary gear set having a driving member in the form of a drum with two internal gears on the inner face thereof, together with two carriers supporting planet gears meshing with the internal gears and with the teeth of two sun gears formed on a single member.

A further object of the invention is to provide a planetary transmission of the type described and which is arranged so that the carriers thereof are rigidly supported and accurately position the associated planet gears.

Another object of the invention is to provide a transmission of the type described which includes means for supplying lubricant under pressure to the area within the drum to lubricate the transmission gears.

A further object of the invention is to provide a transmission of the type described which is arranged so that when the engine is driving the vehicle, lubricant may freely escape from the area within the drum, and so that when the vehicle is driving the engine, escape of lubricant from the area within the drum is restricted so that the pressure on the lubricant within the drum increases, and so that, in addition, the quantity of liquid within the drum is substantially increased, with the result that this lubricant resists rotation of the gears and carriers within the drum to thereby materially increase the braking effect on the vehicle.

Another object of the invention is to provide a transmission having a planetary gear set including a reaction member which is locked to the transmission housing to provide reverse drive by a cone brake having inner and outer engaging surfaces and operated by a hydraulic piston.

A further object of the invention is to provide a transmission of the type described and in which the piston associated with the reverse cone means exerts force thereon through lever mechanism which multiplies the force exerted by the piston.

Another object of the invention is to provide a transmission of the type described and in which the lever mechanism associated with the reverse operating piston is in the form of a Belleville washer which, on release of liquid under pressure from the chamber at the face of the piston, serves to restore the piston to the released position and to disengage elements of the reverse mechanism.

A further object of the invention is to provide a transmission of the type described which is arranged so that when force is transmitted through the planetary gears to drive the vehicle in the forward direction the reverse control device is certain to be disengaged, and so that when force is transmitted through the planetary gears to drive the vehicle in the reverse direction the low forward control device is certain to be disengaged.

Another object of the invention is to provide a transmission of the type described which has an output shaft extending throughout the entire length of the transmission and supported adjacent each end from the transmission housing, the output shaft serving as the support for elements of the planetary gearing.

A further object of the invention is to provide a transmission which is arranged so that the housing is of simple, rugged design, and in which the principal machine work is on circular faces having a common axis.

Another object of the invention is to provide an improved transmission of the type described which is arranged so that the planetary gear mechanism can be substantially completely assembled and thereafter installed in the housing as a unit.

A further object of the invention is to provide a transmission of the type described which incorporates a single plate direct drive clutch of improved construction which has an operating piston with a large effective area.

Another object of the invention is to provide a transmission of the type described in which the direct drive clutch is of such design that the entire clutch can be assembled as a unit and thereafter installed in the remainder of the transmission.

A further object of the invention is to provide a transmission of the type described in which the direct drive clutch piston is subject to the opposing pressures of the liquid in an operating chamber and of the liquid in the torque converter and in which the supply of liquid to the torque converter is cut off and the torque converter chamber is connected to the sump at the same time that the supply of fluid to the operating chamber of the direct drive clutch is initiated to thereby facilitate engagement of the direct drive clutch, to reduce the pressure required to operate this clutch, and to balance the centrifugal oil pressures on both sides of the actuating piston.

A further object of the invention is to provide an improved transmission of the type described which is controlled by levers which can be constructed and assembled readily and economically.

Another object of the type described is to provide an improved transmission which includes a parking brake for locking the output shaft, and which is arranged so that the lever for operating the transmission control valve also operates the parking lock or brake, while the elements of the parking lock or brake serve as a detent to designate the various operating positions of the control valve.

A further object of the invention is to provide an improved transmission incorporating a first fluid pressure operated device for establishing a slow speed drive through the transmission and a second fluid pressure operated device for establishing a faster speed drive through the transmission, together with valve means operative on an increase in the pressure of the fluid in said second device for releasing fluid under pressure from said first device.

Another object of the invention is to provide an improved automatic transmission having a control valve member manually movable from a neutral position to a first drive or a second drive position, the valve member being effective when in the first drive position to supply fluid under pressure to a device to establish slow speed drive through the transmission and being effective when in the second drive position to cause the supply of fluid under pressure to said device to be controlled by means responsive to the speed of the vehicle, the transmission including means for causing the fluid supply to said device to be at a first pressure or at a substantially lower pressure according as said valve member is in its first or its second drive position.

A further object of the invention is to provide an improved automatic transmission incorporating a fluid pressure operated device for establishing drive through helical transmission gears which operate to increase or to decrease the force available to effect engagement of the device according as torque is transmitted through the associated gears from the engine or to the engine, the transmission including means for causing the pressure of the fluid supplied to the device to be at a relatively high value during periods in which operating conditions are such that torque may be transmitted through the associated gears to the engine.

Other objects of the invention and features of novelty will be apparent from the following description taken in connection with the accompanying drawings in which:

Figures 1a and 1b, when placed together with Figure 1b at the right, form a longitudinal sectional view of a transmission embodying this invention.

Figure 2 is a fragmentary rear elevational view of the transmission shown in Figures 1a and 1b, parts being broken away and shown in section to more clearly show other parts.

Figure 3 is a fragmentary sectional view taken substantially along the line 3—3 on Figure 1b, with parts broken away and shown in section to more clearly show other parts.

Figure 4 is a fragmentary sectional view taken substantially along the line 4—4 of Figure 1b.

Figure 5 is a fragmentary sectional view taken substantially along the line 5—5 on Figure 3.

Figure 6 is a fragmentary sectional view taken substantially along the line 6—6 on Figure 3.

Figures 7 and 8 are fragmentary enlarged elevational views showing details of the control levers.

Figure 9 is a fragmentary sectional view showing a modified form of low range control device cone which I may employ.

Figure 10 is a fragmentary sectional view taken substantially along the line 10—10 on Figure 9.

Figure 11 is a fragmentary sectional view taken on line 11—11 of Figure 10.

Figure 12 is a fragmentary elevational view showing the transmission installed in a vehicle.

Figures 14 to 21 are a series of diagrams of the transmission control valves showing the valve elements in the positions which they assume under different operating conditions.

Figure 1A:
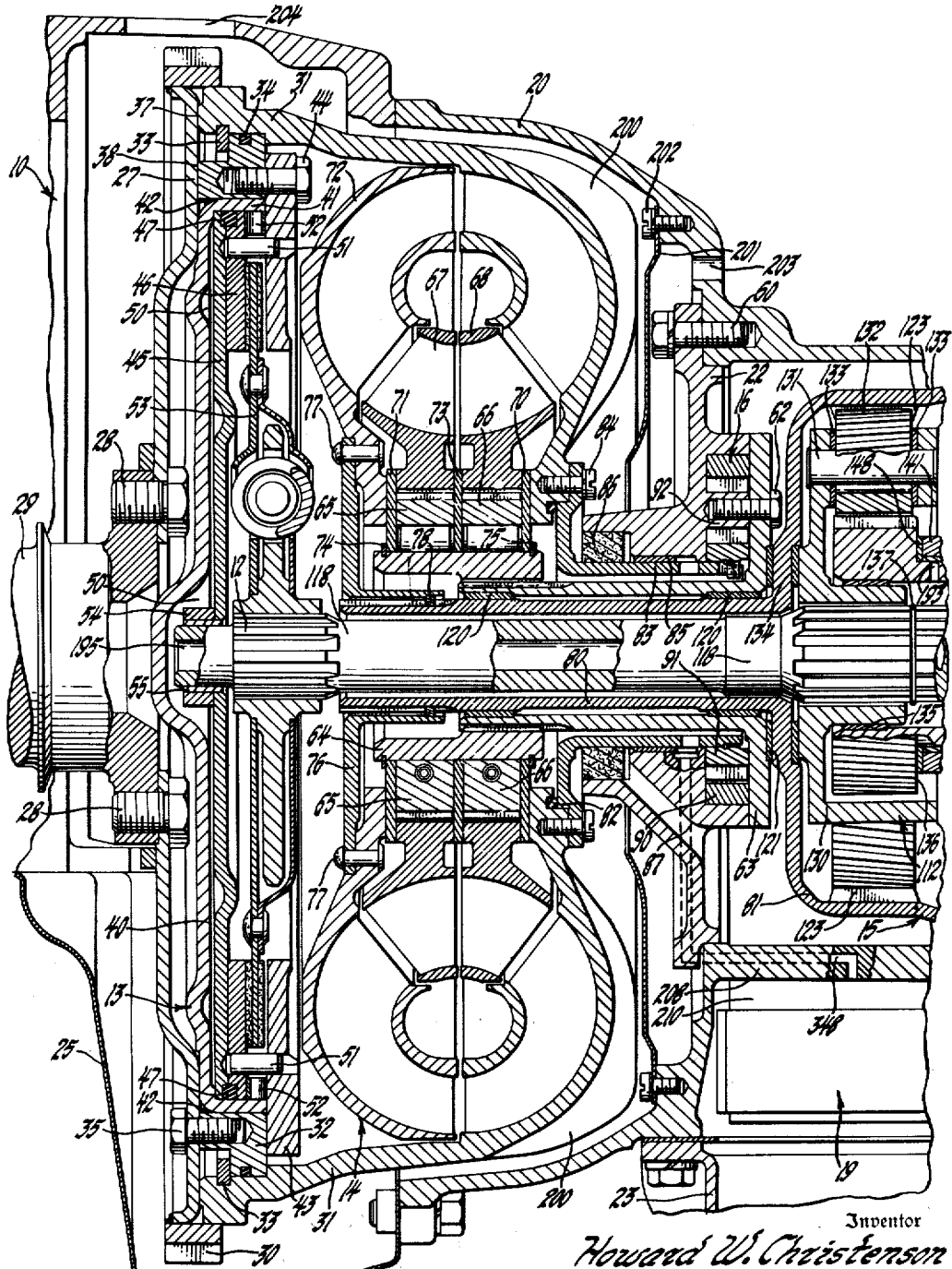

In practicing my invention I provide a transmission including a torque converter which has an input member adapted to be driven from a vehicle engine and which has an output member adapted to drive the input element of a planetary gear unit, while the output element of the planetary gear unit is secured to the transmission output shaft. The planetary gear unit includes two planetary gear sets and is hydraulically controlled to provide neutral, low speed forward, and reverse. The transmission also includes a hydraulically operated direct drive clutch which when engaged connects the engine directly to the transmission output shaft. The input member of the planetary gear unit is in the form of a drum having on its inner face the teeth of two ring gears while the sun gears of both planetary gear sets are formed on a tubular sun gear unit surrounding the output shaft. The planetary gear unit includes two carriers, each of which carries planet gears meshing with a sun gear and a ring gear. One of these carriers is secured on the output shaft, while the other carrier is adapted to at times be locked to the transmission housing by one of the drive-establishing devices to cause the output shaft to be driven in the reverse direction. The sun gear unit is adapted at times to be locked to the transmission housing by another or second drive-establishing device to cause the output shaft to be driven in the forward direction at reduced speed. The gears of the planetary gear sets have helical teeth and are arranged so that when the vehicle is being driven through the low range planetary gear set, the axial thrust on the sun gear unit assists in effecting engagement of the low range drive-establishing device. The open end of the drum forming the planetary gear input unit is normally spaced from a confronting wall of the housing so that lubricant may freely escape from the area within this drum. Under conditions in which the vehicle tends to drive the engine, the drum is moved towards this confronting wall to restrict the escape of lubricant from the area within the drum so that liquid accumulates within the drum and opposes rotation of the planet gears and carriers to thereby materially increase the braking effect on the vehicle.

The transmission includes a front pump driven by the vehicle engine and a rear pump driven by the transmission output shaft. The control valve for the transmission is arranged so that under normal operating conditions the liquid under pressure employed to operate the drive-establishing devices is supplied by the engine driven pump, and so that the liquid supplied by the output shaft driven pump is discharged through orifices to thereby provide a pressure varying with output shaft speed. This pressure is employed to govern a shift control valve which automatically shifts the transmission between low range and direct drive, while this shift control valve is also governed by liquid at a pressure varying with the position of the vehicle throttle so that shifts between low range and direct drive are controlled by both vehicle speed and accelerator pedal position. The control valve is also arranged so that during shifts from low range to direct drive, the low range drive-establishing device remains engaged until the direct drive clutch is engaged an amount varying in accordance with accelerator pedal position, but so that during shifts from direct drive to low range, the low range drive-establishing device remains released until engagement of the direct drive clutch has decreased to a relatively low value.

The control valve includes a manually controlled element which has a neutral position in which the transmission is maintained in neutral; a drive position in which the transmission automatically shifts between low range and direct drive in response to changes in vehicle speed and accelerator pedal position; a low position in which the transmission is maintained in low range; a reverse position; and a parking position in which the transmission is in neutral and the parking lock or brake is applied.

The control valve is also arranged so that under push start conditions, at which time the engine driven pump is inactive, the output shaft driven pump supplies liquid to operate the direct drive clutch, while this pump is controlled so as to build up relatively high pressure at low vehicle speeds to enable the vehicle engine to be rotated at low vehicle speeds.

The control valve is controlled by control levers connected with the vehicle accelerator pedal and with a lever on the vehicle steering column. The control levers are mounted on the transmission housing, while the lever which is conneced to the lever on the steering column also controls the parking brake. The elements for operating the parking brake serve as a detent to designate the various operating positions of the manual control valve.

Referring to Figures 1a and 1b of the drawings I have illustrated my invention in connection with a motor vehicle provided with an engine 10, a portion of which is shown in Figures 1a and 12 of the drawings. The transmission provided by this invention includes an output shaft 12, which is adapted to have connected thereto the vehicle propeller shaft, a lock-up or direct drive clutch 13, a hydraulic torque converter 14, a planetary reduction and reverse gear unit 15, an engine driven pump 16, an output shaft driven pump 17, a parking brake 18, and control valving 19.

The transmission has a housing adapted to be secured to the flywheel housing of the engine 10 and constructed of a plurality of cast iron sections. The housing includes a principal section 20 which is secured to the engine, a rear section 21, a front pump section 22, and a bottom cover plate 23.

The cylinder block of the engine 10 has formed integral therewith an extension which surrounds the upper portion of the engine flywheel, and has secured thereto a stamped sheet metal member 25 which surrounds the lower portion of the engine flywheel. The forward portion of the transmission housing section 20 is substantially cylindrical and has a substantially flat forward face which is secured against the confronting face on the engine cylinder block and on the member 25 to form an enclosure for the engine flywheel, the direct drive clutch 13, and the torque converter 14.

The engine flywheel 27 is in the form of a circular sheet metal stamping which is secured by a plurality of cap screws 28 against the flange on the rear end of the engine crankshaft 29. The member 27 is surrounded by an axially extending flange to which is secured the flywheel ring gear 30. The ring gear 30 is welded to the member 27 and projects a short distance from the rear face of the member 27.

The torque converter 14 is a four element device having a pump or driving element 31 having a flat substantially cylindrical front face which is adapted to engage the rear face of the flywheel 27, and is of such external diameter as to closely fit within the ring gear 30. The member 31 has adjacent its front face a cylindrical bore in which there is mounted a ring 32 which is held in place in the bore in the member 31 by a lock ring 33 mounted in a groove in the member 31. The ring 32 has in the periphery thereof a groove in which there is mounted packing 34 which engages the face of the bore in the member 31 to prevent the escape of liquid from the area within the member 31 through the joint between the ring 32 and the member 31. The ring 32 has on the axially outer face thereof an annular surface 38 which is adapted to engage the face of the flywheel member 27 and in which there are a plurality of circumferentially spaced threaded holes into which extend cap screws 35 which extend through aligned openings in the flywheel member 27 and serve to detachably secure the torque converter 14 and lock-up clutch 13 to the flywheel.

The various parts of the device are constructed and proportioned so that when they are assembled together, the annular surface 37 on the member 31 which engages the rear face of the flywheel member 27 is located in a plane a small distance, such as a few thousandths of an inch, to the left of the plane of the exposed surface 38 on the ring 32. Hence, when the cap screws 35 are tightened to draw the ring 32 towards the flywheel 27, the annular surface 37 on the torque converter member 31 is drawn firmly against the flywheel throughout the circumference of the member 31 and thereby provides an effective driving connection between the flywheel and the torque converter element 31.

A sheet metal diaphragm 40, which is surrounded by an axially extending flange 41, is mounted within the ring 32, and is secured thereto by welding, as indicated at 42. The welding extends throughout the circumference of the ring 42 and forms a liquid tight seal between the diaphragm 40 and the ring 32. The flange 41 is of subtantial axial width and is supported throughout its axial and circumferential extent by the ring 32, the edge of the flange 41 being approximately in the plane of the inner face of the ring 32.

The diaphragm 40 is stiffened by a circumferential rib and by a plurality of radially extending ribs pressed into the material forming the diaphragm, while the central portion of the diaphragm is offset towards the engine to provide clearance for the end of the output shaft 12, and for the hub of the piston mounted on the output shaft.

An annular pressure plate 43 is secured to the inner face of the ring 32 by a plurality of circumferentially spaced cap screws 44. The cap screws 44 are located in a circle of substantially the same diameter as the circle in which the cap screws 35 are located, but the cap screws 44 are spaced circumferentially so as to be located intermediate the cap screws 35.

The radially inner face of the flange 41 on the diaphragm 40 is machined or finished to provide a bore in which there is mounted a piston 45 which is in the form of a sheet metal disc having secured to the rear face thereof an annular wearing plate 46. The plate 46 may be secured to the piston 45 in any suitable manner, while a groove is formed in the periphery of the piston and has mounted therein packing 47 which serves to prevent the escape of liquid under pressure from the chamber 50 between the piston 45 and the diaphragm 40. The face of the piston 45 confronting the pressure plate 43 has therein a plurality of circumferentially spaced holes in which there are rigidly secured drive pins 51 which project from the face of the piston and are slidable in aligned holes in the pressure plate 43. The drive pins 51 insure that the piston 45 rotates with the pressure plate 43, but permit the piston 45 to move towards and away from the pressure plate.

The drive pins 51 are located a short distance radially inwardly of the periphery of the piston 45, and a clutch release spring 52 is located between the piston 45 and the pressure plate 43 in the area radially outwardly of the drive pins 51. The clutch release spring 52 is formed of flat spring wire bent into a circle and having a plurality of offsets therein so that the spring yieldingly urges the piston 45 away from the pressure plate 43, but permits the piston to move towards the pressure plate on an increase in the pressure of the liquid in the chamber 50.

The direct drive or lock-up clutch 13 includes a driven plate 53 of conventional construction and having a hub splined on the output shaft 12, while the peripheral portion of the driven plate 53 extends between the piston 45 and the pressure plate 43.

The piston 45 serves as the support for the forward end of the output shaft 12. The piston 45 has therein a centrally located opening, while a cylindrical hub member 54 surrounding this opening is secured on the face of the piston confronting the diaphragm 40. A bushing 55 is mounted in the opening in the piston 45 and in the hub member 54 and is adapted to receive the cylindrical end portion of the output shaft 12 so as to permit relative rotation between the output shaft 12 and the piston 45, and to also permit the piston 45 to move axially relative to the output shaft 12. The bushing 55 is of substantial axial extent and closely fits the surface on the output shaft 12 so that there is very little leakage of liquid under pressure from the chamber 50 through the joint between the shaft 12 and the bushing.

The piston 45 provides an effective support for the forward end of the output shaft 12 as the piston 45 is firmly supported within the diaphragm 40 which is mounted within and rigidly attached to the ring 32, while the ring 32 is rigidly secured to the flywheel 27.

In addition, it will be seen that the direct drive clutch 13 is arranged so that the piston 45 will not rotate relative to the flywheel, but is driven with the flywheel so that the piston is effective to transmit driving torque to the driven plate 53. The piston 45 is driven by the pin 51 from the pressure plate 43 which is secured to the ring 32, while the ring 32 is rigidly secured to the flywheel 27.

The direct drive clutch is also arranged so that it can be readily assembled and installed as a complete unit. The piston 45, the driven plate 53, and the release spring 52 may be placed in position in the bore in the diaphragm 40, after which the pressure plate 43 may be secured to the ring 32 which is permanently secured to the diaphragm 40. Thereafter, the entire assembly may be placed in position in the torque converter element 31, after which the lock ring 33 is installed to hold the assembly in place. Subsequently, the torque converter element, together with the direct drive clutch assembly, may be secured to the flywheel 27 by installing the cap screws 35.

The direct drive clutch is arranged to minimize leakage from the chamber 50 at the face of the piston of the direct drive clutch and from the torque converter. The diaphragm 40 which forms one wall of the chamber 50 at the face of the piston 45, and which also forms the cylinder in which the piston 45 is mounted, is a continuous member without openings therein so there is no possibility of the escape of liquid from the chamber 50 through the member 40 or through the joint between the member 40 and other elements of the clutch assembly. Furthermore, the member 40 is welded to the ring 32 and cooperates with the ring 32 to provide a leak-proof wall across the front of the torque converter element 31.

In addition, it will be seen that the piston 45 of the direct drive clutch is of relatively large diameter, this piston being somewhat larger in diameter than the driven plate 53. Furthermore, the entire area of the piston, except for the area of the small central hole for the end of the output shaft 12, is acted upon by liquid under pressure in the chamber 50. Because of the large effective area of the piston 45, the piston exerts on the driven plate 53 pressure sufficient to transmit to the plate 53 the full torque of the engine when the pressure of the liquid in the chamber 50 is at a relatively low value, thereby reducing to the minimum the power required to drive the pump which supplies the liquid under pressure.

The front pump section 22 of the transmission housing is a substantially circular member which is detachably secured by a plurality of cap screws 60 against a flat face on the housing section 20 at the rear of the flywheel and torque converter chamber. The housing section 22 has detachably secured thereto by means of cap screws 62 the ground sleeve member 63 of the torque converter. The ground sleeve member 63 has a relatively large diameter flange which is attached to the housing section 22, and has a relatively long cylindrical sleeve portion which extends through the central opening in the housing section 22 and projects into the torque converter chamber in the housing section 20.

The front pump section 22 and the ground sleeve member 63 cooperate to form a forward wall which extends transversely across the transmission housing and is provided with a substantially central opening through which the output shaft 12 extends.

The free end of the sleeve portion of the ground sleeve member 63 is externally splined and has mounted thereon the internally splined inner race member 64 of the overrunning brakes 65 and 66 associated with the stators 67 and 68 of the torque converter. Each of the stators 67 and 68 has associated therewith the outer race of the associated overrunning brake. The overrunning brakes 65 and 66 may be of any well-known construction and operate to permit the stators 67 and 68 to turn relative to the ground sleeve 63 in the same direction as the flywheel 27 and the torque converter driving element 31, and to lock the stators 67 and 68 to the ground sleeve 63 so as to prevent rotation of the stators in the direction opposite to that of the flywheel 27 and of the torque converter element 31.

A thrust washer 70 is mounted between the radially inner portion of the converter element 31 and the stator 68, and a similar thrust washer 71 is mounted between the radially inner portion of the converter driven element or turbine 72 and the stator 67, while a similar thrust washer 73 is mounted between the stators 67 and 68. The hub portions of the stators 67 and 68, which are engaged by the thrust washers, are slightly thicker than the axial length of the overrunning brakes so that the overrunning brakes operate freely without interference by the thrust washers. The thrust washers 70 and 71 are held on the inner race member 64 by lock rings 74 and 75.

The elements 31, 67, 68 and 72 of the torque converter 14 are constructed of cast aluminum, and the driving and driven elements 31 and 72 are designed so that their radially inner portions extend radially inwardly far enough to overlie the thrust washers 70 and 71. The radially inner portions of the torque converter driving and driven elements have formed thereon flat surfaces adapted to engage the thrust washers 70 and 71, respectively. The material of which the torque converter elements are constructed is a good bearing material and the arrangement illustrated and described makes unnecessary the provision of thrust surfaces of special material on the torque converter elements for the purpose.

The torque converter driven member 72 has secured thereto a hub 76 which has internal splines and is adapted to be received by the splined end on the sleeve portion 80 of the drum 81 of the planetary unit 15. The hub 76 is formed of suitable material, such as steel, and has a flange which is secured to the body of the torque converter driven element 72 by rivets 77 located radially outwardly of the surface engaged by the thrust washer 71. A seal ring 78 is mounted in a groove in the splines on the member 80 and restricts flow of liquid from the area between the torque converter elements 31 and 72 to the area within the member 80. Hence, liquid under pressure supplied as hereinafter explained to the area outwardly of the ground sleeve 63 flows to the area between the hub portions of the torque converter members 31 and 72, and then flows radially outwardly over the faces of the thrust washers 70, 71 and 73 to the radially outer portion of the torque converter.

The torque converter driving element 31 has secured thereto a hub member 83 having a sleeve portion of such diameter as to surround the ground sleeve 63 and to be spaced therefrom a short distance. The hub member 83 has a flange which is secured to the torque converter element 31 by a plurality of cap screws 84, while the sleeve portion of the hub member 83 is supported from the transmission housing section 22 by a bushing 85 which also serves as a seal to prevent the escape of liquid from the torque converter supply passage through the joint between housing member 22 and the hub member 83. A gasket 82 is clamped between the members 31 and 83. As shown in Figure 1a of the drawings, the torque converter supply passage 348 leading from the control valve 19 is formed in the front pump section 22 and opens to the groove between the bushing 85 and the front pump 16, while the hub 83 has a plurality of openings therein so that liquid supplied through the passage may flow to the area within the hub 83 and thence to the area within the torque converter. A shaft sealing unit 86 of a conventional design is supported by the housing member 22 so as to surround the hub member 83 at a point intermediate the bushing 85 and the torque converter, while the area between the bushing 85 and the shaft seal 86 is connected by a drain passage 87 with the oil sump provided by the cover plate 23.

The front or engine driven pump 16 is of a well-known construction, and as shown in Figure 1a of the drawings, the pump comprises an internal gear 90 driven by a spur gear 91, the gears 90 and 91 being mounted in a chamber formed by the housing section 22 and the ground sleeve member 63, and being separated throughout a portion of their circumference by an arcuate baffle 92. The inlet port of the pump 16 is connected through a passage, not shown, formed in the transmission housing sections 20 and 22 with the sump or reservoir provided by the bottom cover plate 23, while the discharge or exhaust port, not shown, of the pump 16 is connected through another passage formed in the transmission housing sections 20 and 22 with the control valve 19. The spur gear 91 of the front pump 16 is mounted on the end of the sleeve portion of the hub member 83, the gear 91 and the hub member 83 having inter-engaging driving means so that the hub member 83 drives the gear 91. The hub member 83 is secured to the torque converter driving element 31 which is secured to the engine flywheel 27 so that the hub member 83 drives the gear 91 of the front pump 16 whenever the vehicle engine operates, and causes the gear 91 to turn at the same speed as the engine.

The rear or output shaft driven pump 17 is similar in construction to the pump 16 and has an internal gear 96 driven by a spur gear 97, the gears 96 and 97 being mounted in a chamber formed by plates 95 and 98 which are secured to the transmission housing section 21. The gears 96 and 97 are separated throughout a portion of their circumference by an arcuate baffle 99. The gear 97 is splined internally and is mounted on a splined portion of the output shaft 12 so that the gear 97 is driven by the output shaft and operates at the speed of the output shaft. The inlet port of the rear pump 17 is connected with the sump or reservoir through a passage, not shown, formed in the transmission housing section 21 and 20. Similarly, the exhaust or discharge port of the rear pump 17 is connected with the control valve 19 by another passage, not shown, formed in the transmission housing sections 21 and 22.

The gear 103 of the parking brake 18 is secured on the splined portion of the output shaft 12 directly in front of the rear pump 17, the gear 103 being secured against axial movement on the shaft 12 by lock rings 104.

The output shaft 12 is supported from the transmission housing section 21 by a bushing 105 and by a ball bearing 106. The outer race of the ball bearing 106 is secured between a lock ring 107 and a shoulder on the housing, while the inner race of the ball bearing 106 is secured between lock rings 108 on the shaft 12. Hence, axial movement of the ball bearing 106 relative to the housing section 21 is prevented, and axial movement of the shaft 12 relative to the ball bearing 106 is prevented, so the ball bearing 106 serves to prevent axial movement of the shaft 12. The shaft 12 has secured thereon the gear 110 which is employed in the usual manner to drive the vehicle speedometer.

The planetary unit 15 of the transmission includes the drum 81, a front planet carrier assembly indicated generally by the reference numeral 112, a rear planet carrier assembly indicated generally by the reference numeral 113, a sun gear unit 114, a low speed or sun gear drive establishing or control device indicated generally by the reference numeral 115, and a reverse or rear planet carrier control device indicated generally by the reference numeral 116.

As previously explained, the drum 81 has a sleeve portion 80, this sleeve portion being of such diameter and length as to extend through the ground sleeve 63. The forward end of the sleeve portion 80 of the drum 81 has secured on the splined portion thereof the torque converter output or driven element 72 so that the drum 81 is driven from the engine through the torque converter. The sleeve portion 80 of the drum 81 surrounds the output shaft 12, the inner diameter of the bore in the sleeve portion 80 being such that the surface of the bore in the sleeve portion is spaced a short distance from the surface of the output shaft. The output shaft 12 has thereon a relatively long shoulder 118 which is of such diameter as to closely fit within the bore in the sleeve 80 and thereby restrict the escape of lubricant from the torque converter chamber through the area within the sleeve 80.

The sleeve portion 80 of the drum 81 is supported from the ground sleeve 63 by spaced bushings 120, while a thrust washer 121 is mounted between the flange on the ground sleeve 63 and the forward face of the drum 81.

The drum or input unit 81 has formed on the inner face thereof adjacent the closed end of the drum, the teeth of a first ring or orbit gear 123, and also has formed on the inner face thereof adjacent the open end of the drum, the teeth of a second ring or orbit gear 124. The gear 123 is somewhat smaller in diameter than the gear 124 so that the tips of the teeth of the gear 124 are located radially outwardly on the bottoms of the spaces between the teeth of the gear 123.

The gears 123 and 124 are helical gears, the teeth of each of these gears being arranged so that the end of each tooth toward the closed end of the drum 81 is rotatively in advance of the opposite end of the tooth, assuming that the drum 81 rotates in the customary direction, that is in the clockwise direction as viewed from the end towards the engine.

The drum 81 rotates in a substantially cylindrical chamber formed in the transmission housing section 20, the various parts being arranged and proportioned so that when the drum 81 presses the thrust washer 121 firmly against the ground sleeve member 63, the end face of the wall of the drum at the open end of the drum is spaced a short distance, such as one-sixteenth of an inch, from an annular surface 125 formed on the housing section 20. The chamber in which the drum 81 is mounted is open to the sump through holes, not shown, in the bottom wall of the chamber so that oil escaping from the drum 81 may freely flow from this chamber to the sump.

The front planet carrier assembly 112 comprises a carrier member 130 having an internally splined hub portion mounted on counterpart splines on the output shaft 12. The member 130 has adjacent its periphery spaced annular portions which are joined at intervals by integral web portions, the forward annular portion being integral with the hub portion of the member. The annular peripheral portions of the member 130 have therein three sets of aligned openings at points uniformly spaced apart circumferentially of the member. Each set of openings has secured therein a pin 131 on which there is mounted a planet gear 132, each planet gear being supported by a suitable needle roller bearing. Thrust washers 133 are located at the ends of each planet gear, while each of the pins 131 may be held in position by a shoulder on one end of the pin and by heading over the other end of the pin. As is clearly shown in Figure 1a of the drawings, the planet gears 132 mesh with the ring gear 123, and also with a sun gear formed on the sun gear unit 114.

The hub portion of the carrier member 130 extends between or within the planet gears 132 substantially the entire axial extent of the planet gears and supports the planet gears 132 from the shaft 12 in the plane of the ring gear 123 so that the planet gears 132 are accurately held in alignment with the ring gear 123 and will run quietly.

A thrust washer 134 is located between the carrier member 130 and the drum 81, while a lock ring 137 limits movement of the carrier member 130 on the output shaft 12.

The sun gear unit 114 is a tubular member surrounding the output shaft 12, the internal diameter of the sun gear unit 114 being slightly larger than the external diameter of the output shaft 12 throughout most of the length of the sun gear unit. The internal diameter of the forward end of the sun gear unit 114 is larger than the internal diameter of the remainder of the sun gear unit and has therein a bushing 135 which operates on the outer diameter of the hub portion of the carrier member 130 of the front planet carrier assembly 112.

The forward end of the sun gear unit 114 is of relatively large diameter and has formed on the exterior thereof the helical sun gear 136, the teeth of which mesh with the planet gears 132 associated with the front planet carrier assembly 112. As the forward end of the sun gear unit 114 is supported from the hub of the carrier member 130 by the bushing 135, which is located radially inwardly of the sun gear 136 and extends substantially the entire axial length of the sun gear 136, the gear 136 is rigidly and accurately supported relative to the planet gears 132 and these gears operate quietly. The sun gear 136 is a helical gear and the gear teeth are arranged so that the end of each tooth at the forward or left-hand end of the gear is rotatively in advance of the opposite end of the tooth, that is so that the gear 136 has a left-hand helix angle.

The rearward end of the sun gear unit 114 extends through and is supported in a bore in the central portion of the diaphragm member 140 which is rigidly supported from the transmission housing section 20, and is in effect a wall extending transversely across the transmission housing. The diaphragm member 140 is constructed of material, such as aluminum, which provides a good bearing surface and the central portion of the member 140 is of substantial axial extent so that the rear end of the sun gear unit 114 is rigidly supported.

The rear planet carrier assembly 113 comprises a carrier member 141 having spaced annular portions connected at intervals by integral web sections and having therein a plurality of sets of aligned holes in which there are mounted pins 142. Each of the pins 142 has mounted thereon a planet gear 143 which is supported on the pin by a suitable needle roller bearing. Each of the pins 142 is held in position in the carrier member 141 by heading over the projecting ends of the pin, while thrust washers 144 are mounted between the ends of each planet gear 143 and the faces of the sides of the carrier member 141. The planet gears 143 are somewhat larger in diameter than the planet gears 132 and mesh with the ring gear 124 on the drum 81 and also with a sun gear formed on the sun gear unit 114.

The forward portion of the carrier member 141 has a hub portion having therein a bore in which there is mounted a bushing 145 which runs on a bearing surface formed on the sun gear unit 114. This bearing surface on the sun gear unit 114 is of smaller diameter than the sun gear 136, but of larger diameter than the remainder of the sun gear unit.

The rear portion of the carrier member 141 has a hub portion having therein a bore in which there is mounted a bushing 146 which runs on a bearing surface formed on the sun gear unit 114, while the sun gear unit 114 has formed thereon between the bearing surfaces engaged by the bushings 145 and 146 the teeth of the sun gear 147 which meshes with the planet gears 143 of the rear planet carrier assembly 113. The sun gear 147 has helical teeth, each of which is arranged so that the end thereof adjacent the sun gear 136 is rotatively in arrears of the opposite end of the tooth. It will be seen that the second carrier member 141 is supported from the sun gear unit 114 on opposite sides of the sun gear 147 with the result that the planet gears 143 are rigidly and accurately supported and will operate quietly.

A thrust washer 148 is mounted on the sun gear unit 114 between the forward end face of the carrier member 141 and a shoulder at the rear face of the sun gear 136.

The elements of the low speed or sun gear control device 115, and of the reverse or rear planet carrier control device 116, are mounted in a bore in the transmission housing section 20, this bore being substantially concentric with the sun gear unit 114 and the output shaft 12. The principal portion of this bore is cylindrical, but the bore has at the forward end a conical portion having a conical surface 150, the larger end of which is towards the rear of the transmission housing, the conical surface 150 being separated from the remainder of the bore by a narrow shoulder 151.

As is best shown in Figures 3 and 4 of the drawings, the transmission housing section 20 has drilled therein a hole which extends into the shoulder 151, the center of this hole being located a short distance radially outwardly of the face of the cylindrical surface of the bore in the housing section 21 so that the hole forms a groove in the wall of this bore. This hole is of relatively small diameter so that the hole does not extend into the conical surface 150. A locating pin 152 is mounted in the hole in the housing section and is of such length as to extend substantially to the joint between sections 20 and 21, while the pin 152 is of such size that a portion of the pin is located radially inwardly of the face of the cylindrical bore in the housing section 20.

The elements of the low speed or sun gear control device 115 include a cup 155 of such external diameter as to closely fit the cylindrical bore in the housing section 20, this cup having a conical inner surface 156, the cup being mounted in the housing 20 so that the end of the surface 156 of larger diameter is towards the front of the transmission.

The diaphragm 140 is mounted in the bore in the housing section 20 in front of the cup 155, while a thrust diaphragm 157 is located in front of the diaphragm 140. The thrust diaphragm 157 is in the form of a Belleville washer and engages the shoulder 151, while a spacing ring 158 is located between the diaphragm 140 and the diaphragm 157. The various parts of the equipment are proportioned so that the cup 155 projects from the rear face of the housing section 20 a short distance and is received by a bore in the front face of the housing section 21 so that the cup 155 serves to align the transmission housing sections 20 and 21. A sealing ring 159 is located between the cup 155 and the housing section 21, and the various parts are proportioned so that when the housing sections 20 and 21 are secured together, the thrust diaphragm 157 is rigidly held against the shoulder 151. Each of the diaphragms 140 and 157, as well as the cup 155 and the spacing ring 158, has a notch or recess in its periphery which is adapted to receive the portion of the pin 152 which extends within the cylindrical bore in housing section 20 so that the pin 152 prevents rotation of the diaphragms 140 and 157 and the cup 155 in the housing. The pin 152 also serves to accurately position the diaphragm 140 rotatively relative to the housing section 20 so that passages in the diaphragm 140 register with passages in the housing section 20. The area at the forward face of the diaphragm 140 is vented to the sump through an opening 160.

The rear end of the sun gear unit 114 projects through the diaphragm 140. The projecting end of the sun gear unit 114 is splined and has mounted thereon the cone 162 of the sun gear or low range control device 115. The cone 162 comprises an internally splined hub portion to which is rigidly secured a stamped sheet metal member having a conical peripheral flange, the outer surface of which is of substantially the same size and shape as the surface 156 on the cup 155 so that the cone 162 will engage the surface 156 on the cup 155 throughout the circumference of the cup 155 and also throughout the entire axial extent of the surface 156. As hereinafter explained, the cone 162 is movable axially towards and away from the cup 155. The various parts of the equipment are arranged and proportioned so that when the cone 162 is moved away from the cup 155 the maximum amount, the outer surface of the cone 162 is spaced from the inner surface 156 of the cup 155 only a relatively small distance, on the order of a few thousands of an inch.

The inner surface of the conical surface on the cup 155 is coated with a suitable friction material, such as sintered bronze, while the surface of the cone 162 is finished steel or iron alloy.

The diaphragm 140 has on its rear face a centrally located bore adapted to receive the hub of the cone 162 of the sun gear control device. This bore is of slightly larger diameter than the hub of the cone 162, the bore being larger than the hub by a few thousandths of an inch, as shown in exaggerated scale in Figure 5 of the drawings. The hub of the cone 162 extends into the bore in the diaphragm 140 for a substantial distance so that there is a relatively long passage of limited flow capacity connecting the chamber 163 between the diaphragm 140 and the face of the hub of the cone 162, and the chamber 164 between the diaphragm 140 and the portion of the cone 162 radially outwardly of the hub.

An annular groove is formed in the splines on the external face of the sun gear unit 114 and a sealing ring 165 is mounted in this groove. The forward end of the hub of the cone 162 is bored out to the external diameter of the sealing ring 165 so that the hub of the cone surrounds the sealing ring 165, and the ends of the splines on the inner face of the hub of the cone 162 form a shoulder engaged by a face of the sealing ring 165. The splines are loose and short so the cone may seat easily.

The various parts of the equipment are arranged so that the sealing ring 165 closely fits the groove in the sun gear unit 114 and closely engages the inner face of the hub of the cone 162 to thereby substantially prevent flow of liquid under pressure through the joint between the sun gear unit and the cone.

As hereinafter explained, the sun gear unit 114 at times moves axially towards the rear of the transmission. On this movement of the sun gear unit 114 force is transmitted from the shoulder at the end of the splines on the sun gear unit to the cone 162 to press the cone 162 against the surface 156 on the cup 155. A lock ring 166 is mounted in a groove adjacent the end of the sun gear unit 114 and holds the cone 162 in position on the sun gear unit.

The diaphragm 140 has on its forward face an annular bore in which there is mounted an annular piston 170. The piston has in its periphery a groove in which there is mounted a packing ring 171 which serves to prevent escape of fluid around the periphery of the piston from the chamber 172 between the piston and the diaphragm 140. The central portion of the diaphragm 140 has therein a groove in which there is mounted a packing ring 173 which is engaged by the piston 170 in all positions of the piston and serves to prevent escape of fluid from the chamber 172.

The radially inner portion of the piston 170 has on the forward face thereof a narrow annular shoulder 174 which is engaged by the radially inner portion of the thrust diaphragm 157.

The thrust diaphragm 157 is in the form of a Belleville washer and is constructed from a disc of sheet steel. As shown in Figure 4 of the drawings the diaphragm 157 has therein a plurality of slots extending radially outwardly from the central hole in the diaphragm so that there are formed a plurality of arms joined together at their outer ends. The forward face of the diaphragm has therein a shallow groove 175 located adjacent the periphery of the diaphragm and extending completely around the diaphragm. The diaphragm 157 is formed so that when no force is exerted on the diaphragm, its central portion is offset a small amount, such as ¼ of an inch, to the rear relative to its peripheral portion. As a result, the central portion of the diaphragm exerts force tending to move the piston 170 towards the diaphragm 140, while on movement of the piston 170 by fluid under pressure in the chamber 172, the force exerted by the diaphragm and opposing the piston gradually decreases.

The diaphragm 157 has two small holes therein located near the outer edge of the diaphragm. Pins 176 extend through these holes and also through holes in the inner element 180 of the rear planet carrier control device 116. The ends of the pins 176 are riveted over to secure the diaphragm 157 and the element 180 together. The element 180 is an annular ring having a conical outer face adapted to engage the conical inner face of the cone 181 of the control device 116. The rear face of the element 180 has thereon adjacent its radially inner edge a narrow shoulder 182 which is engaged by the forward face of the diaphragm 157.

The cone 181 has a conical outer surface which is adapted to engage the conical surface 150 formed on the transmission housing section 20. The small end of the cone 181 is splined internally, these splines being received by counterpart splines on the outer face of the carrier 141 of rear planet carrier assembly 113 so that the cone 181 rotates with the carrier 141, but so that the carrier 141 and the cone 181 may move axially relative to each other. The forward face of the element 180 is located adjacent the rear face of the carrier 141 and is engaged by the carrier on rearward axial movement of the carrier. The various parts of the transmission are proportioned so that on movement of the carrier 141 towards the rear, the rear face of the carrier 141 engages the element 180 and moves the element 180 away from the cone 181. Hence, the element 180 is moved away from the cone 181 on initial rearward axial movement of the carrier 141.

On the supply of liquid under pressure to the chamber 172, the shoulder 174 on the piston 170 presses against the radially inner portion of the diaphragm 157 and causes the thrust diaphragm 157 to press against the shoulder 182 on the element 180 and thereby exert force to press the element 180 against the cone 181 and to press the cone 181 against the surface 150 on the transmission housing section 20. The force exerted by the piston 170 is multiplied by lever action in the diaphragm 157 since the radially inner portion of the diaphragm 157 moves farther than the portion of the diaphragm engaged by the shoulder 182 on the element 180. Hence, with liquid at moderate pressure in the chambr 172, relatively great force is exerted by the piston 170 to clamp the cone 181 between the element 180 and the surface 150. As previously explained, the thrust diaphragm 157 is secured against rotation by the locating pin 152, while the pins 176, assisted by frictional engagement between the diaphragm 157 and the shoulder 182 on the element 180, prevent rotation of the element 180 relative to the diaphragm 157. When the cone 181 is clamped between the non-rotating surfaces on the housing and on the element 180, the cone 181 is prevented from turning and holds the carrier 141 stationary.

When rotation of the rear planet carrier 141 is arrested by the cone 181, and the drum 81 is driven by the engine, the planet gears 143 are driven by the ring gear 124 with the result that the planet gears 143 rotate on the pins 142 and cause the sun gear unit 114 to rotate in the opposite direction to the drum 81, and at a relatively high speed. At this time, the ring gear 123 exerts force on the planet gears 132, tending to drive the carrier 130 of the front planet unit 112 in the same direction as the drum, but the gear 136 of the sun gear unit 114 exerts force on the planet gears 142 to drive the carrier 130 in the opposite direction. The relative sizes of the ring and sun gears of the rear and front planet units are such that when the carrier 141 of the rear planet unit is held by the associated control device, the planet gears of the front planet unit are driven in the reverse direction by the sun gear unit at a more rapid rate than they are driven in the forward direction by the ring gear 123. Hence, the carrier 130 of the front planet unit turns in the direction opposite to the drum 81 and at a rate determined by the difference in the speeds of the two driving forces exerted on the planet gears 132. As the carrier 130 is splined on the output shaft 12, reverse rotation of the carrier 130 causes reverse rotation of the output shaft 12.

When the sun gear unit 114 is driven by the planet gears 143 of the rear planet unit 113, a forward axial thrust is developed on the planet gears 143 and these gears exert forwardly directed force on the carrier 141 so that this carrier tends to move away from the cone 181 and does not interfere with engagement of this cone with the transmission housing, nor with engagement of the member 180 with the cone 181.

In addition, when the rear planet carrier 141 is held by the associated control device and the drum 81 is driven by the engine, force is exerted to urge the sun gear unit 114 forwardly, while the sun gear unit 114 exerts force through the lock ring 166 to draw the cone 162 of the low speed control device 115 away from the surface 156 on the cup 155. Forward movement of the sun gear unit 114 is limited by engagement of the forward face of the hub portion of the cone 162 with the diaphragm 140.

As engagement of the rear planet carrier control device 116 to effect reverse drive causes the sun gear unit 114 to move forward axially, and thus move the cone 162 of the low speed control device 115 away from the cup 155, the low speed control device 115 is certain to be disengaged when the reverse or rear planet carrier control device 116 is engaged.

As a result of engagement of the helical teeth of the ring gears 123 and 124 with the planet gears, a forwardly directed axial thrust is exerted on the drum 81 to press the thrust washer 121 against the surface on the member 63 with the result that the annular surface surrounding the open end of the drum is spaced from the surface 125 on the housing section 20. Hence, lubricant supplied to the interior of the drum 81 may escape therefrom and will not interfere with rotation of the planet gears and carriers.

The diaphragm 140 has formed therein passages 185 and 186 through which liquid under pressure may be supplied to and released from the control devices 115 and 116, and a passage 187 through which lubricant under pressure may be supplied to portions of the transmission. The passages in the diaphragm 140 register with connecting passages in the wall of the transmission housing section 20 and leading from the control valve 19.

Referring to Figures 1b, 3, 5 and 6 of the drawings it will be seen that the diaphragm 140 has therein a passage 185 leading to the chambers 163 and 164 of the low speed or sun gear control device 115, a passage 186 leading to the chamber 172 of the reverse or rear planet carrier control device 116, and a lubricant supply passage 187.

The low range control device control passage 185 extends through the diaphragm 140 and opens into the central bore in the diaphragm at a point adjacent the end of the bore nearest the hub of the cone 162 as is shown in Figures 1b and 5. As is best shown in Figure 5 of the drawings, the portion of the central bore of the diaphragm 140 with which the passage communicates is of slightly larger diameter than the remainder of this bore and of the exterior of the sun gear unit 114 so that liquid may flow freely between the passage 185 and the chamber 163 at the face of the hub of the cone 162. The principal portion of the bore in the diaphragm 140 is of such diameter as to closely surround the sun gear unit 114 and act as a seal with regard to liquid supplied to the chamber 163.

In operation, liquid under pressure supplied through the passage 185 flows to the chamber 163 at the face of the hub of the cone 162 and increases the pressure of the liquid in this chamber. On this increase in the pressure of the liquid in the chamber 163 liquid flows therefrom through the narrow space between the hub of the cone 162 and the inner face of the bore in the diaphragm 140. The flow capacity of this space is limited so the pressure of the liquid in the chamber 163 builds up to a substantial value, and, even though the hub of the cone 162 is of relatively small diameter, force of appreciable magnitude is exerted on the end of the hub of the cone 162 to move the cone away from the diaphragm 140 and press the outer face of the cone 162 against the face 156 of the cup 155.

The force exerted on the cone 162 by liquid under pressure in the chamber 163 is sufficient to press the cone 162 lightly into engagement with the face 156 of the cup 155 and thus initiate engagement of the sun gear or low range control device 115. In addition, when the cone 162 is pressed into engagement with the cup 155 by force exerted by liquid under pressure in the chamber 163, the joint between the cone 162 and the cup 155 is sealed to substantially prevent the escape of liquid from the chamber 164 around the cone 162 to the area 167, at the opposite face of the cone, which area is constantly open to the sump.

On the continued supply of liquid under pressure through the passage 185 to the chamber 163 liquid flows therefrom and thence to the chamber 164 so that the pressure of the liquid in the chambers 163 and 164 gradually increases to the full pressure of the source from which liquid is supplied to the passage 185. On this increase in the pressure of the liquid in the chambers 163 and 164 there is an increase in the force effective to press the cone 162 against the cup 155, the increase in this force being substantial because of the relatively large area of the cone 162 acted upon by liquid under pressure in the chamber 164.

As heretofore explained, the cup 155 is secured by the pin 152 against rotation in the transmission housing section 20. Accordingly, when the cone 162 is pressed against the cup 155, the cone 162 is prevented from rotating, and as the cone is splined on the sun gear unit 114, when the cone 162 is held stationary, the sun gear unit 114 is prevented from turning.

When the cone 162 secures the sun gear unit 114 against rotation, and the sun gear unit is serving as a reaction member so that power is transmitted from the engine through the front planet carrier assembly 112 to the output shaft 12, the helical teeth on the planet gears 132 of the front planet carrier and on gear 136 of the sun gear unit cause force to be exerted on the sun gear unit 114 tending to move the sun gear unit axially towards the rear of the transmission and thus cause the sun gear unit 114 to exert force on the cone 162 to press the cone 162 against the cup 155. The force exerted by the sun gear unit 114 on the cone 162 varies in accordance with the power transmitted to the output shaft 12, so the degree of engagement of the sun gear or low speed control device 115 is increased in accordance with increases in the force required to hold the sun gear unit 114.

Although this invention is not limited to a specific value of force exerted on the cone 162 by the axial thrust of the sun gear unit 114, in a preferred design the force exerted on the cone 162 by axial thrust of the sun gear unit 114 at times when torque of maximum value is transmitted through the front planetary unit 112 is approximately twice as great as the force exerted on the cone 162 by liquid under pressure in the chambers 163 and 164. The force exerted on the cone 162 by axial thrust of the sun gear unit 114 reduces the pressure required to be maintained on the liquid supplied to the chambers 163 and 164, and correspondingly reduces the power required to drive the pumps which supply this liquid. The self-energizing or self-engaging characteristic of the cone 162 helps to seal the joint around the periphery of the cone when liquid under pressure is present in chamber 163 and the liquid pressure is building up in chamber 164.

When the sun gear unit 114 is held by the control device 115, and the drum 81 is driven by the engine, the carrier 130 is driven in the same direction as the drum 81, but at a somewhat slower speed. As the carrier 130 is splined on the output shaft 12, the shaft 12 is driven at the same speed as the carrier 130.

Although this invention is not limited to any specific gear ratio, in a preferred embodiment of the invention the ring gear 123 and the sun gear 136 are proportioned so that the ring gear 123 turns about 1.6 times as fast as the carrier 130 when the sun gear 136 is braked.

When the control device 115 is engaged and the ring gear 123 drives the planet gears 132, a forwardly directed axial force is exerted on the drum 81 so the thrust washer 121 is pressed against the member 63, while the annular surface surrounding the open end of the drum 81 is spaced from the surface 125 on the housing member 20. Accordingly, lubricant supplied to the interior of the drum 81 may freely escape therefrom and will not interfere with rotation of the planet gears and the planet carriers.

As previously explained, the cone 162 is rigidly secured, both axially and rotatively, on the sun gear unit 114. Hence, on axial movement of the cone 162 by liquid under pressure in the chambers 163 and 164, the sun gear unit 114 is moved to the rear. The sun gear unit is free to move axially, and on movement of the sun gear unit towards the rear of the transmission, force is exerted through the thrust washer 148 to move the carrier 141, while this movement of the carrier 141 insures release of the rear planet carrier control device 116 by forcing the reverse actuating cone 180 to the rear away from the reverse cone 150.

On release of liquid under pressure from the passage 185, liquid flows thereto from the chambers 164 and 163 and there is a reduction in the pressure on the liquid in the chambers 164 and 163, with a corresponding reduction in the force exerted by the fluid under pressure on the cone 162 to press the cone against the cup 155. On this reduction in the force holding the cone 162 against the cup 155 at a time when the sun gear unit is serving as the reaction member of the front planetary gear unit, there is a reduction in the power transmitted through the front planetary gear unit and a corresponding reduction in the force exerted by the sun gear unit 114 to press the cone 162 against the cup 155. The reduction in the force exerted by the sun gear unit 114 to press the cone 162 against the cup 155 is particularly rapid if, at the time liquid is released from the chambers 163 and 164 of the sun gear control device 115, the direct drive clutch 13 is being engaged so the output shaft 12 drives the carrier 130 of the front planetary gear unit with the result that the function of the sun gear unit 114 as a reaction member is eliminated. On the release of liquid from the chambers 163 and 164 of the sun gear control device 115, the cone 162 ceases to be pressed against the cone 155 so the cone 162 ceases to prevent rotation of the sun gear unit 114.

As soon as the cone 162 moves out of engagement with the cup 155, liquid in the chamber 164 may escape therefrom around the periphery of the cone 162 to the area 167 and thus to the sump. Hence, as soon as the cone 162 is disengaged from the cup 155, there is a rapid reduction in the force exerted on the cone and there is no danger that the cone will partially engage the cup 155 with resultant wear on the cone and cup when the sun gear unit 114 rotates following engagement of the direct drive clutch 13.

In Figures 9, 10 and 11 of the drawings there is shown a modified form of low range control device construction which I may employ. In this modified construction the cone 162a is a casting and has a hub portion which is received by a bore in the face of the diaphragm 140a. The external face of the hub portion of the cone 162a is surrounded by a groove in which there is mounted a packing ring 188 to prevent flow of liquid from the chamber 163 through the joint between the hub of the cone and the face of the bore in the diaphragm.

The splined portion of the sun gear unit 114 has therein a groove in which there is mounted a sealing ring 165 which engages the face of the bore in the hub portion of the cone 162a and serves to prevent flow of liquid from the chamber 163 through the joint between the sun gear unit and the cone.

The splines on the interior of the cone 162a extend only a portion of the length of the hub of the cone and the ends of the splines on the cone form a shoulder which is engaged by a lock ring 168 which is mounted in a groove in the splines on the sun gear unit. Hence, on axial movement of the sun gear unit 114 to the right, as viewed in Figure 9 of the drawings, force is transmitted from the sun gear unit 114 through the lock ring 168 to the cone 162a to press the cone to the seated position. A snap ring 166 secures the cone 162a on the sun gear unit.

The splines on the interior of the cone 162a are of limited axial extent, while the splines on the sun gear unit 114 extend throughout only a portion of the length of the splines on the cone. Hence, the cone 162a is movable relative to the sun gear unit and the cone can adjust itself to firmly engage the seat on the housing.

As is clearly shown in Figure 9 of the drawings, the passage 185a leads to the chamber 163 at the face of the hub of the cone 162a, while a branch 185b of this passage of restricted flow capacity is connected to the chamber 164 at the face of the cone 162a.

The cone 162a has associated therewith valve means for permitting flow of air to the chamber 164 on release of the low range control device. The web of the cone 162a has a hole 205 extending therethrough, the hole being located somewhat farther than one-half the distance from the center to the periphery of the cone 162a, the opposite ends of the hole being about equally distant from the center of the cone. As is clearly shown in Figure 10 of the drawings, the hole 205 extends through the web of the cone 162a at an angle to the axis of the cone 162a so that the end of the hole 205 opening to the chamber 164 is rotationally behind the opposite end of the hole, assuming that the cone 162a is rotated oppositely to the vehicle engine. The portion of the hole 205 opening to the chamber 164 is of larger diameter than the other end portion of the hole, while a ball valve element 206 is mounted in the hole 205 and is adapted to engage the shoulder separating the two portions of the hole. A pin 207 extends across the hole 205 and holds the ball in the chamber provided by the hole.

In operation, when the low range control device is disengaged and the sun gear element 114 is driven in the reverse direction by the engine, the cone 162a rotates and the ball valve element 206 is carried by the cone 162a. If liquid under pressure is now supplied through passage 185a, liquid will flow to the chamber 163 and increase the pressure therein so that the cone 162a is moved into engagement with the surface 156 on the cup 155 with the result that the speed of rotation of the cone 162a is reduced. The pressure of the liquid in the chamber 163 builds up first since the chamber 164 and as the passage 185b leading to the chamber 164 has limited flow capacity. When rotation of the cone 162a is retarded, the momentum of the ball valve element 206 causes this element to advance in the hole 205 and seat on the shoulder to prevent escape of fluid from the chamber 164. Hence, on the supply of liquid through the branch 185b to the chamber 164, the pressure of the fluid within the chamber increases and exerts force to press the cone 162a against the cup 155. On an increase in the pressure of the fluid in chamber 164, the ball valve element 206 is held in the seated position by the fluid in chamber 164 so that the valve element 206 remains seated after the cone 162a stops rotating. On initial movement of the cone 162a against the cup 155, the face of the cone 162a is lightly pressed against the cup and air in the chamber 164 may escape therefrom through the joint between the cone 162a and the cup 155. However, as the force acting to press the cone 162a to the seated position increases, the escape of air from the chamber 164 decreases and on final engagement of the cone 162a there remains in the chamber 164 a substantial volume of air under pressure which serves to cushion engagement of the cone 162a and make the action of this control device very smooth and gradual. The air under pressure in the chamber 164 acts directly upon the cone 162a and on the liquid in the chamber 164 and therefore is more effective to cushion engagement of the low range control device than would be the case if this air were present in a chamber remote from the chamber 164.

When the passage 185a is subsequently connected to the sump to release the low range control device, liquid flows from the chambers 163 and 164 to the passage 185a so that there is a reduction in the pressure in the chambers 163 and 164 and the cone 162a will not be held in engagement with the cup 155. When the cone 162a starts to rotate in the reverse direction, the inertia of the ball valve element 206 will cause this valve element to become unseated so that air can flow from chamber 167 to chamber 164. This permits the oil in chamber 164 to flow therefrom through the passage 185b, and around the periphery of the cone 162a after the cone becomes disengaged from the cup 155 so that on release of the low range control device the chamber 164 is promptly substantially completely drained of oil. Hence, on subsequent engagement of the low range control device, even though this engagement occurs soon after release of the control device, a cushion of air will be present in the chamber 164 and operation of the low range control device will be smooth, and will be uniform regardless of the frequency of engagement.

As is best shown in Figures 3 and 6 of the drawings, the portion of passage 186 in the diaphragm 140 and leading to chamber 172 of the rear planet carrier control device 116 is relatively short and extends through the wall of the bore in the diaphragm 140 in which the piston 170 is mounted so as to open to the portion of the chamber 172 adjacent the closed end of the bore. Hence, liquid may flow freely to and from the chamber 172 regardless of the position of the piston 170 in this chamber.

The lubricant supply passage 187 opens to the portion of the bore in the diaphragm 140 which forms a bearing for the sun gear unit 114. As is clearly shown in Figure 5 of the drawings, the passage 187 opens to this bore at a point intermediate the ends of the bore. As will be apparent from Figures 2 and 5, the end of the passage 187 is adjacent the hole or port 190 which extends through the wall of the sun gear unit 114. The lubricant supplied through the passage 187 lubricates the bearing surfaces on the exterior of the sun gear unit 114 and the interior of the diaphragm 140. In addition, lubricant may be supplied to these surfaces through the hole 190 from the area within the sun gear unit and outside the output shaft 12.

As hereinafter explained in detail, at all times during operation of the vehicle engine, except when the direct drive clutch 13 is engaged, lubricant under pressure is supplied to the chamber within the torque converter. From this chamber lubricant flows through the area between the output shaft 12 and the sleeve portion 80 of the drum 81 and through the splines on the shaft 12 and the carrier 130 to the area between the shaft 12 and the sun gear unit 114. The restricted area between the shoulder 118 on the shaft 12 and the inner face of the sleeve 80 offers substantial resistance to the flow of liquid from the converter so a substantial pressure is maintained on the liquid in the torque converter and within the sleeve 80. However, a substantial volume of liquid flows from the torque converter, and liquid from the area within the sleeve 80 flows between the thrust washer 134 and the drum 81, and between the washer 134 and the carrier 130 to the area within the drum 81.

Lubricant which flows through the splines on the shaft 12 and on the carrier 130 to the area within the sun gear unit 114, may flow therefrom through the port 193 to lubricate the bushing 145 and the thrust washer 148, and through the port 192 to lubricate the bushing 146. The oil which flows through the port 193, and a part of the oil which flows through the port 192, flows to the interior of the drum 81 and helps to lubricate the parts within this drum. Lubricant from the area within the sun gear unit 114 also flows through the port 190 to the bearing surface on the diaphragm 140, while lubricant escapes from the area within the sun gear unit through the open end at the rear of this unit.

It will be seen that during operation of the transmission, lubricant under pressure is supplied to the area within the drum 81 through several paths. This lubricant serves to thoroughly lubricate the transmission gears and bearings and normally flows through the open end of the drum 81 and thence to the sump.

When the vehicle is being operated in low gear, that is when the sun gear control device 115 is engaged, and the vehicle speed exceeds the engine speed, as is the case when the vehicle is descending a steep grade and the engine is being employed as a brake, the reaction of the helical ring gear 123 and the helical planet gears 132 is such that rearwardly directed axial thrust is exerted on the drum 81 with the result that the annular surface surrounding the open end of the drum 81 is pressed firmly against the annular surface 125 formed on the transmission housing section 20. This restricts the flow of lubricant from the area within the drum 81, and on the continued supply of lubricant under pressure to the area within the drum, the drum becomes filled with lubricant and the pressure on this lubricant builds up to an appreciable value, this pressure being dependent upon the pressure of the source from which the lubricant is supplied and also upon the rate of escape of lubricant through the joint between the end of the drum 81 and the annular surface 125, through the splines between the carrier 141 and the cup 181, and also around the periphery of the cup 181.

The rear planet carrier 141 forms a substantially liquid tight barrier over most of the area within the annular surface 125. The splines on this carrier and on the cone 181 fit snugly and are of substantial axial extent so as to restrict flow of lubricant through the joint between the carrier 141 and the cone 181. In addition, the space between the exterior of the cone 181 and the surface 150 is relatively narrow and of substantial axial extent so as to have limited flow capacity. Furthermore, the surface surrounding the open end of the drum 81, and the surface 125 on the housing section 20, are located radially outwardly of the forward portion of the surface 150. Lubricant is thrown by centrifugal force to the outer part of the drum 81 so there is a relatively thick layer of lubricant within the drum which cannot escape through the joints between the carrier and the element 181, and between the element 181 and the surface 150.

Under these conditions the planet gears 132 and 143, and the carriers 130 and 141 rotate, but their movement is substantially resisted by the lubricant under pressure in which they are immersed so these elements substantially augment or supplement the braking force available to retard the vehicle.

It will be seen that this supplemental braking force is developed automatically under the conditions in which this force is desirable, namely when the low range control device is engaged and the vehicle speed exceeds the engine speed. Similarly, this braking force is automatically discontinued when conditions are such that this force is unnecessary and undesirable.

As soon as the vehicle speed ceases to exceed the engine speed, or when the low range control device 115 is released, the force exerted on the drum 81 to press the drum against the annular surface 125 is discontinued so the lubricant within the drum 81 escapes to the sump and the gears and carriers within the drum can again rotate freely.

The output shaft 12 has therein a centrally located passage 195 through which liquid under pressure may be supplied to and released from the chamber 50 of the direct drive clutch 13. The passage 195 opens on the forward end of the shaft 12, and this end of the shaft 12 is located in the chamber 50. The passage 195 communicates with a groove 196 in the shaft 12, while the shaft 12 has on both sides of the groove 196 grooves in which are mounted packing rings 197 which engage the inner face of the bore in the transmission housing section 21 to prevent the escape of liquid under pressure from the groove 196. The transmission housing sections 21 and 20 have formed therein an extension of the passage 195 which connects the groove 196 with the control valving 19.

The torque converter 14 is arranged so that during its operation it is cooled by air circulated over its exterior surface. As is clearly shown in Figure 1a of the drawings, the torque converter driving member 31 has formed on its rearward face a plurality of radially extending ribs 200, each of which is of substantial axial width and also of substantial radial extent.

An annular baffle or shroud 201 is secured by a plurality of screws 202 against an annular surface on the transmission housing section 20 outwardly of the front pump section 22. The baffle 201 is spaced from the face of the front pump section 22, and is also spaced from the rear edges of the ribs 200 on the torque converter, while the baffle 201 has a central opening of substantially larger diameter than the projection on the pump housing section 22. The area at the rear of the baffle 201 is open to the atmosphere through a plurality of openings 203 through the wall of the housing section 20. Similarly, the area in front of the baffle 201 is open to the atmosphere through a plurality of openings 204 through the wall of the flywheel housing section.

In operation, when the engine rotates, the torque converter member 31 rotates and the ribs 200 thereon cause the air in the chamber within the housing section 20 to rotate with the torque converter member 31. The inner face of the housing section 20 radially outwardly of the ribs 200 on the torque converter element 31 is smooth and concentric with the external surface of the torque converter element 31 so that the air within the housing section 20 will be freely and quietly rotated by the ribs 200.

When the air within the housing section 20 is rotated centrifugal force causes the air to flow radially outwardly and to flow from the chamber through the openings 204. As a result of the flow of air radially outwardly in the chamber in the housing section 20, there is a reduction in the pressure in the central portion of this chamber so air from the atmosphere flows to this area through the openings 203 and through the space between the baffle 201 and the pump housing section 22.

Accordingly, during rotation of the vehicle engine there is a continuous flow of air from the atmosphere through the openings 203 to the central portion of the chamber enclosing the torque converter, and therefrom over the surface of the torque converter driven element 31 and to the atmosphere through the openings 204. When the air passes over the surface of the torque converter element 31, the air absorbs heat therefrom so the torque converter and the liquid contained therein are cooled. The ribs 200 are formed integral with the body of the torque converter element 31 and increase the heat transfer surface.

The control valving 19 is similar in physical construction to the valves customarily employed for this purpose and comprises a metal body secured against the lower face of a wall 208 of the transmission housing section 20. A plate 210 is mounted between the body of the valving 19 and the wall of the housing section. The plate 210 has grooves in its upper and lower faces to provide passages connecting ports in the valve body with passages in the transmission housing section 20.

The control valving 19 includes a valve element 211 which is manually movable to a plurality of different positions including a parking position P, a neutral position N, a high or drive position D, a low position L, and a reverse position R. The control valving 19 also includes a valve element 212 which is controlled in accordance with the position of the vehicle accelerator pedal or the throttle of the vehicle to vary the pressure of the liquid supplied to portions of the control valving, as hereinafter explained, to thereby provide liquid at a pressure which varies in accordance with the torque load on the vehicle engine. This transmission includes lever mechanism for actuating the valve elements 211 and 212, and for also controlling the parking brake.

Referring to Figure 2 of the drawings, it will be seen that the transmission housing section 20 has in a side wall thereof at a point above the control valving 19, and in the rear of the rear face of the control valving, a substantially horizontally extending opening which is threaded adjacent its outer end. A relatively long bushing 215 with suitable external threads is secured in this opening, the inner end of the bushing extending beyond the inner face of the wall of the housing section 20, and the outer end of the bushing having a head which engages a locating surface on the outer face of the wall of the housing section.

A sleeve 216 is mounted in the bushing 215, the inner end of the sleeve having welded or otherwise rigidly secured thereto the cam plate 217, one face of which engages the inner end of the bushing 215. The outer end of the sleeve 216 has rigidly clamped thereon the lever or arm 218, the free end of which is adapted to be connected by linkage with a manually movable lever on the steering column of the vehicle as shown in Figure 12 of the drawings. A flat washer 219 is mounted between the hub of the lever 218 and the head of the bushing 215, while a sealing ring 220 is mounted in a groove in the head of the bushing 215 and prevents escape of lubricant through the joint between the sleeve 216 and the bushing 215.

The arrangement just described provides an efficient and economical means for accurately supporting the control levers. The transmission housing section 20 is a casting, and the boss or projection in which the bushing 215 is mounted is formed integral with the rest of the casting. Castings of this type cannot be made to a high degree of accuracy, and machining of the inner face of the boss or projection in which the bushing 215 is mounted would be an expensive procedure, but finishing of the outer surface of the housing against which the bushing is tightened, can be readily and economically done. The bushing 215 is accurately made as to length and the inner end of the bushing projects beyond the inner face of the housing 20 so that the inner and outer ends of the bushing provide accurate surfaces for locating the operating levers transversely of the housing 20.

The cam plate 217 extends downwardly from the sleeve 216 and has projecting from its inner face a pin 221 which is received by a groove in the end of the valve element 211. When the lever 218 is moved, the sleeve 216 is turned so the cam plate 217 is turned and the pin 221 moves the valve element 211. The various parts are arranged so that the pin 221 remains in the groove in the valve element 211 throughout the entire range of movement of the cam plate 217.

The cam plate 217 has in its radially outer edge or face a plurality of notches or cam surfaces which cooperate with spring actuated detent means to designate the various positions of the valve element 211 and to operate the parking brake. Figure 7 is a diagram showing the contour of the cam surfaces on the cam plate 217, and in this figure of the drawings it will be seen that there are four arcuate notches which determine the reverse, low, drive, and neutral positions of the valve element 211, these notches being identified by the letters R, L, D, and N, respectively, at the ends of radial lines extending through the mid-points of the notches. In addition, there is at one side of the neutral notch N a flat surface identified by the letter P, this flat surface being located radially outwardly of the points separating the notches R, L, D, and N, and being connected with the notch N by an inclined surface. The position of the center of the operating groove of the valve element 211 in the various operating positions is indicated by the letters P, N, D, L, and R connected by lead lines with points on the center line of the valve element.

As is best shown in Figures 1b and 2 of the drawings, the rear wall of the transmission housing section 20 has extending therethrough a bore, the axis of which is substantially parallel to the axis of the output shaft 12. This bore is located approximately in the horizontal plane of the valving 19, and is above the lower edge of the forward face of the transmission housing section 21 so that the bore opens into the chamber or area 167 in which the gear 103 of the parking lock 81 is mounted.

A shaft 224 is mounted in the bore in the rear face of the housing section 20, this shaft having formed integral therewith an arm 225 which has adjacent its free end teeth 226 which are adapted to mesh with teeth of the gear 103.

The end of the shaft 224 which projects from the front face of the rear wall of the housing section 20 has rigidly clamped thereon an arm 227, the free end of which has rotatably supported thereon a roller 230 which engages the cam surfaces on the cam plate 217. The end of the arm 227 has a hole therein, and one end of a coil spring 231 is secured in this hole, while the other end of the coil spring 231 extends over the bushing 215 so that the spring 231 yieldingly holds the roller 230 in engagement with the cam surfaces on the cam plate 217. A flat washer 232 is mounted on the arm 227 between the end of the spring 231 and the roller 230 and holds the roller in position on the arm.

When the arm 218 turns the cam plate 217, the cam surfaces on the cam plate move over the roller 230, the end of the arm 227 being moved against the spring 231 as the projections between arcuate recesses in the cam surfaces pass over the roller. The roller 230 cooperates with the arcuate notches in the cam surfaces on the cam plate 217 to determine the positions of the valve 211, and to hold the cam plate 217 and the valve element 211 in the position to which the plate 217 and the valve element 211 have been moved manually by the vehicle operator. In addition, the resistance to movement of the cam plate 217 offered by the spring biased arm 227 shows the vehicle operator when the position of the valve element 211 is being changed. The various parts of the equipment are arranged and proportioned so that when the cam plate 217 is in one of the positions in which it is held when the roller 230 is in one or the other of the arcuate recesses, the pin 221 will hold the valve element 211 in the position corresponding to that of the recess.

During movement of the arm 227 because of movement of the cam surfaces on the cam plate 217 over the roller 230, the arm 225 is moved and the teeth 226 on the free end of the arm 225 move towards and away from the teeth on the gear 103. The various parts are arranged so that when a high point between arcuate recesses on the cam surfaces passes over the roller 230, the teeth 226 on the arm 225 move towards the gear 103, and so that when the roller 230 enters one of the arcuate recesses the teeth 226 move away from the gear 103. The various parts of the equipment are also arranged so that when the projections separating the arcuate recesses in the cam plate 217 pass over the roller 230, the teeth 226 are moved close to the teeth on the gear 103, but are not moved far enough to engage the teeth on the gear. In addition, the various parts of the equipment are arranged so that when the cam plate 217 is moved to the parking position P, in which the flat surface P on the cam surfaces engages the roller 230, the arm 227 will be moved against the spring 231 far enough to cause the teeth 226 on ahe arm 225 to be moved into engagement with the teeth on the gear 103 and thus prevent rotation of the output shaft 12 to thereby prevent movement of the vehicle. Under these conditions, if the gear 103 attempts to move, thus exerting force on the free end of the arm 225 tending to move the teeth 226 away from the gear 103, the roller 230 will be pressed against the flat surface on the cam plate 217 so that the arm 225 cannot move and the teeth 226 will remain in engagement with the teeth on the gear 103. Hence, the parking lock, when engaged, is certain to remain engaged and prevent movement of the vehicle until the vehicle operator intentionally releases the parking brake.

The flat cam surface which engages the roller 230 in the position P of the cam plate 217 is farther from the axis of the cam plate than the other portions of the cam surfaces on the cam plate so the spring 231 must be stretched farther in moving the cam plate to the position P than is required during movement of the cam plate to any of its other positions. Extra force is required to stretch the spring 231 this additional amount, and the extra force required to move the cam plate to the position P to apply the parking lock prevents inadvertent application of the parking lock and insures that the parking lock will be applied only when intended by the operator.

When the operator moves the cam plate 217 away from the position P, the spring 231 moves the free end of the lever 227 upwardly far enough to cause the teeth 226 on the arm 225 to move out of engagement with the teeth on the gear 103 and thus release the parking brake.

The cam plate 217 has associated therewith suitable stop means which limits movement of the cam plate beyond the positions R and P. Engagement of the pin 221 with the end face of the valve body 19 limits movement of the cam plate 217 in the clockwise direction as viewed in Figures 1b and 7, while movement of the cam plate 217 in the opposite direction is limited by engagement of the cam plate with the rear wall of housing section 20.

As previously stated the control valve 19 includes the valve element 212 which is controlled in accordance with the position of the vehicle accelerator pedal, while the lever mechanism of this transmission includes means for controlling the valve element 212.

Referring to Figure 2 of the drawings it will be seen that mounted within the sleeve 216 is a shaft 233, the inner end of which is curved and extends into alignment with the end of the valve element 212. The extreme end of the shaft 233 is flattened, as indicated at 234, in the area engaged by the rounded end of the valve element 212. The other end of the shaft 233 extends from the sleeve 216 and has rigidly secured thereto an arm 235 to which is connected linkage leading from the vehicle accelerator pedal as shown in Figure 12. A cotter pin 236 extends through a hole in the shaft 233 and engages one end of the sleeve 216 to prevent outward movement of the shaft 233 relative to the sleeve 216. Similarly, a cotter pin 237 extends through a hole in the shaft 233 and secures a washer 238 against the end of the sleeve 216 to prevent inward movement of the shaft 233. The cotter pins serve to accurately position the shaft 233 and insure that the end 234 of the shaft 233 will be in alignment with the valve element 212. A sealing ring 239 is mounted in a groove in the end of the bushing 216 and prevents leakage of lubricant through the joint between the shaft 233 and the bushing 216.

As hereinafter explained, the valve element 212 has associated therewith a spring which presses the valve element against the surface 234 on the shaft 233. The valve element 212 is moved against this spring when the shaft 233 is turned in one direction by the arm 235, while the valve element 212 is returned by the spring when the shaft 233 is moved in the other direction.

The arrangement described above for manually operating elements of the control valve 19 is advantageous as it permits the control valve 19 to be installed or removed without disturbing the control levers. The valve body is secured against the wall 208 by cap screws, not shown, and when these are removed the valve body is readily removed as the groove in the valve element 211 enables this valve element to be disconnected from the pin 221, while the valve element 212 is freely movable relative to the member 233. When the valve body is being installed, it is necessary only to make certain that the pin 221 extends into the groove in the valve element 211.

As is clearly shown in Figure 2 of the drawings, the transmission housing section 20 has on the right-hand side thereof a substantially vertical tubular projection 242 which is open at its upper end. Pressed in this projection is a cylindrical tube 245 open at both ends, the bottom of which extends to a point slightly above the bottom of housing 20. The top of this tube 245 extends slightly above the projection 242. Once inserted this tube is not readily removed from the housing 20. Through this tube lubricant may be added to the transmission. In order that air may escape from the transmission during the filling operation, a hole is located near the top of the tube and is indicated at 246. The opening at the upper end of the tube 245 is closed by a filter or breather cap 243 to which there is attached a dip stick 244 which is of such length as to extend into the lubricant in the transmission sump and which provides means for determining the level of the lubricant in the sump.

The wall 208 of housing section 20 terminates at a point at the right of valve 19, as viewed in Figure 2 of the drawings, so that the chamber in which the drum 81 is mounted is open to the sump and oil discharged from the open end of the drum 81 may freely flow to the sump.

The transmission is supplied with a quantity of lubricant such that when the vehicle is idle the lubricant fills the chamber in the housing section 20 above the bottom cover plate 23 to a level above the lower portion of the drum 81. In addition, the quantity of lubricant supplied to the transmission is such that during operation of the vehicle, the control valve 19 is immersed in lubricant so that discharge of lubricant from ports in the valve body does not cause foaming of the lubricant.

It will be seen that this transmission is arranged so that no adjustment of the parts is required during initial assembly or as a result of wear during use. The elements of the planetary gear units are accurately manufactured and merely require assembly. The clutches or control devices have wearing surfaces, but any variation in these surfaces on initial assembly, and any wear on these surfaces during use, is compensated for by changes in the amount of movement of the operating pistons of the control devices. The cylinders in which the operating pistons of the control devices are mounted are proportioned so that the pistons have sufficient range of movement to accommodate variations in the wearing surfaces, while the control system is arranged so that differences in the volume of liquid under pressure required by the pistons because of differences in their range of movement has no effect on the operation of the transmission.

*Construction of control valve body assembly*

This transmission includes the control valving which is indicated generally by the reference numeral 19 and comprises a valve body which is secured against a generally horizontally extending wall of the transmission housing section 20. As previously explained, a plate 210 is secured between the valve body and the wall 208 of the transmission housing. The plate 210 has grooves in its faces which provide passages or communication between various ports in the valve body, and also between the ports in the valve body and passages in the transmission housing section 20 communicating with the lock-up clutch 13, the low range or sun gear control device 115, the rear planet carrier or reverse control device 116, the lubricant supply passage 187, the torque converter, and the front and rear pumps 16 and 17.

The control valve body is in the form of a metal block in which there are a plurality of substantially parallel horizontal bores, some of which extend completely through the valve body, and others of which open on one end only of the valve body. Some of these bores have portions of different diameters. Each bore is surrounded at intervals by grooves to which are connected passages controlled by the valve element mounted in the bore. Selected ones of these grooves and passages are connected to the exhaust or sump, these grooves and passages being designated "EX" in the drawings. Similarly, the ends of some of the bores are open to the sump through ports designated "EX".

Figure 13:
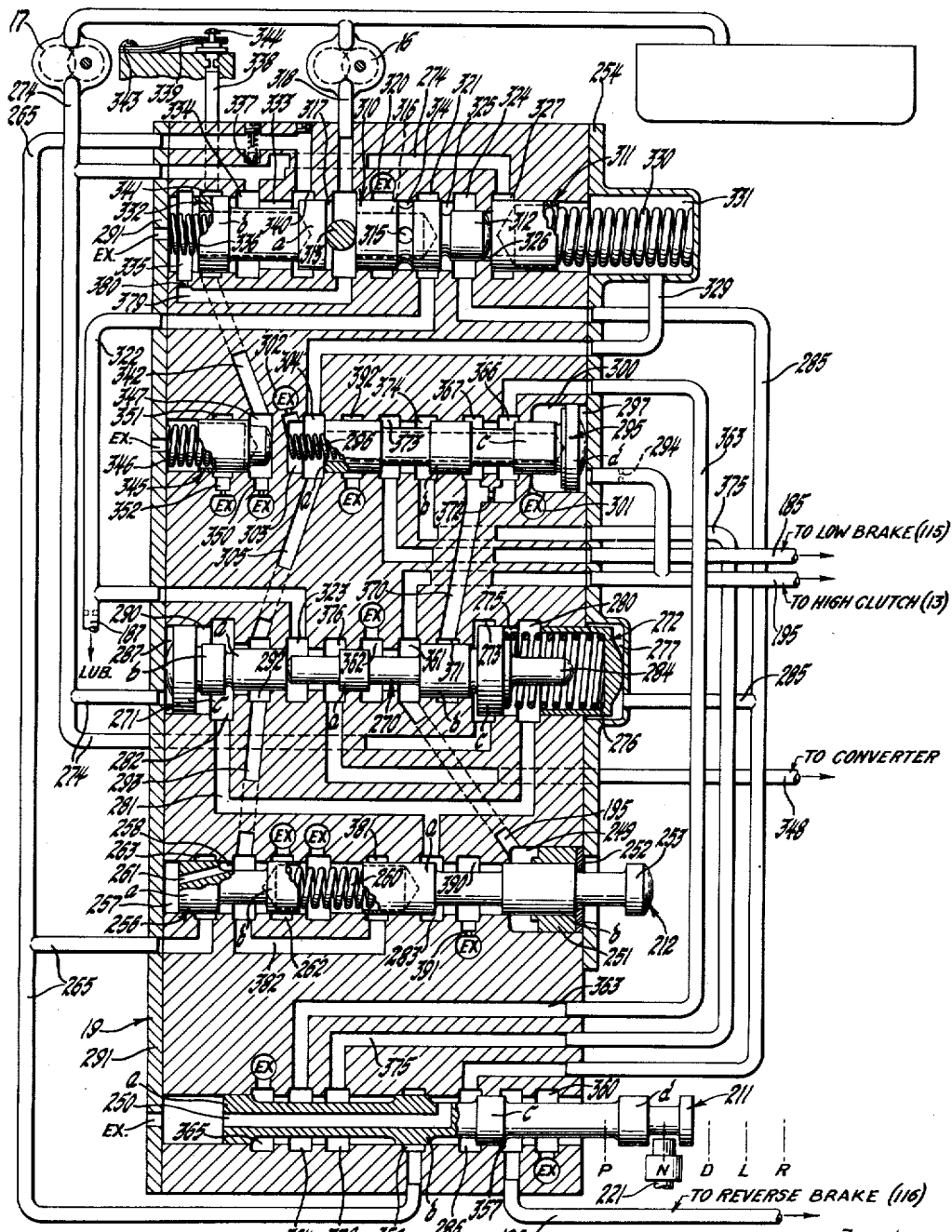
Figure 13 is a diagram showing the control valves for the transmission, the elements of the control valves being shown in the positions which they assume when the vehicle and the vehicle engine are at rest, the accelerator is released, and the manual control valve is in the neutral position.

Referring to Figure 13 of the drawings, it will be seen that the bores in the valve body have mounted therein valve elements, each of which is substantially cylindrical. Where required, each valve element has portions of different diameter to fit the bore in which the valve element is mounted. In addition, most of the valve elements have thereon lands which are separated by portions of reduced diameter.

The manual control valve element 211 has lands *a*, *b*, *c*, and *d*, as well as a groove which is adapted to receive the pin 221 on the cam plate 217. In addition, the valve element 211 has therein a central passage 250 which connects the area between lands *b* and *c* to an end of the valve element and thus to the sump.

The throttle valve element 212 has associated therewith an annular piston 251 which is subject to the pressure of the fluid in a chamber 249 to which is connected a branch of the passage 195 leading to chamber 50 of the lock-up or direct drive clutch 13. The throttle valve element has adjacent its exposed end a portion of reduced diameter on which there is secured a washer 252 which is engaged by the head 253 of the valve element on movement of the valve element to the left as viewed in Figure 13 of the drawings. A cover plate 254 on the end of the valve body prevents movement of the washer 252, the piston 251, and the valve element 212, out of the bore in which they are mounted. The valve element 212 has lands *a* and *b* which are connected by an area of reduced diameter.

The valve element 212 also has associated therewith a throttle valve, hereinafter designated the T-V valve and incorporating a relay valve element 256 which is subject to the opposing pressures of the fluid in a chamber 257 and of a coil spring 260 which extends between the valve elements 212 and 256. The valve element 256 has lands *a* and *b* which are separated by a chamber 258 in the form of an area of reduced diameter which is open to the chamber 257 through a passage 261 in the valve element.

The T-V relay valve element 256 operates to supply to the area or chamber 258 between its lands *a* and *b*, and also to the connected passages and chambers, fluid at a pressure which varies in accordance with the amount by which the vehicle accelerator pedal is moved from the closed towards the throttle open position. This fluid under pressure is hereinafter designated T-V pressure and is a measure of the load on the vehicle engine. The valve elements 256 and 212 and the associated apparatus are arranged so that when the vehicle accelerator pedal is in the released or throttle closed position, the valve element 212 is held in the position determined by the washer 252, the right shoulder of land b of Figure 13, and the cover plate 254, while the spring 260 holds the valve element 256 in the position in which land b cuts off communication between the area or chamber 258 between lands a and b and a groove 262 which is open to the sump. In addition, at this time land a of valve element 256 cuts off communication between the chamber 258 or area between lands a and b and the grooves 263 to which is connected a branch of the supply passage 265 leading from the front and rear pumps.

At this time, therefore, both the supply of liquid under pressure to and the release of liquid under pressure from the chamber 258 or area between the lands a and b of valve element 256 are cut off and this chamber is substantially at atmospheric pressure, as is the connected chamber 257.

When the accelerator is depressed to open the vehicle throttle, the member 233 exerts force to move the valve element 212 to the left as viewed in Figure 13 of the drawings so that force is transmitted through the spring 260 to move the valve element 256 to the left so that the land a opens communication from the groove 263 to the area or chamber 258 between lands a and b. Hence, assuming the liquid under pressure is present in passage 265, liquid flows therefrom to the area or chamber 258 between lands a and b, and thence through passage 261 to chamber 257, as well as to other connecting passages, and increases the pressure of the liquid present therein. On an increase in the pressure of the liquid in chamber 257, force is exerted to move the valve element 256 against the spring 260 which is compressed. On this movement of the valve element 256, the land a tends to cut off and therefore meter the supply of liquid under pressure from the passage 265 so the pressure developed in chamber 257 is that required to compress the spring 260 enough to cause the valve element 256 to return to its regulating position. This pressure is dependent upon the amount of movement of the valve element 212 and therefore on the amount of movement of the accelerator.

Similarly, on release of the accelerator, the force exerted by the spring 260 on the valve element 256 is reduced, and the liquid under pressure in chamber 257 moves the valve element 256 to the position in which land a blocks groove 263, and in which land b opens communication between the area or chamber 258 between lands a and b and the groove 262 which is open to the exhaust or sump. Hence, liquid escapes from the area or chamber 258 between lands a and b, and also from chamber 257, so the pressure of the liquid in chamber 257 reduces and permits the spring 260 to move the valve element 256 to the position in which land b again blocks groove 262.

From the foregoing it will be seen that the relay valve element 256 operates to maintain in the area or chamber 258 between its lands a and b liquid at a pressure which varies in accordance with the position of the accelerator pedal. As hereinafter explained, the area between the lands a and b of the valve element 256 is connected to chambers which at times are open to the sump through small orifices so there is flow of liquid from the area between lands a and b of the valve element 256. However, the capacity of the valve is great enough to maintain the desired pressure in the area between the lands a and b and also in the connected passages and chambers.

The valve body has therein a bore in which there is mounted the shift control valve element 270 which has at one end thereof the shift modulator valve element 271, and which has at the other end thereof the shift blocker valve element 272. As hereinafter explained, the shift control valve element 270 determines whether the low speed control device 115 or the high speed or lock-up clutch 13 is engaged.

The shift control valve element 270 is provided with a land a of relatively small diameter, a land b of somewhat larger diameter, and a head c of relatively large diameter. The face of the head c adjacent the land b, that is the area outwardly of the land b is subject to the pressure of the liquid in a chamber 273 to which is connected a branch of the passage 274. The other face of the head c is subject to the pressure of the liquid in the chamber 275, and of a compression spring 276 which extends between the head c and the shift blocker valve element 272.

The shift blocker valve element 272 is a cup-shaped member, the closed end of which has a projection which is adapted to engage the cover plate 254 to limit movement of the valve element 272 by the spring 276. The valve element 272 is subject on one face to the spring 276 and to the liquid under pressure in the chamber 275, and is subject on the other face to the liquid under pressure in the chamber 277. The chamber 275 is surrounded by a groove 280 which is connected by a passage 281 with a groove 282 surrounding the bore in which the shift modulator valve element 271 is mounted, while a branch of the passage 281 is connected to a groove 283 surrounding the bore in which the throttle valve element 212 is mounted. When the valve element 272 is in the position in which the head of the valve element 272 engages the cover plate 254, the groove 280 is open to the chamber 275, but on movement of the valve element 272 against the spring 276 into engagement with the projection 284 on the end of the valve element 270, communication is cut off between the groove 280 and the chamber 275.

The chamber 277 at one face of the valve element 272 is constantly connected by a passage 285 with a groove 286 surrounding the bore in which the manual control valve element 211 is mounted.

The shift modulator valve element 271 has a land a of small diameter, a land b of somewhat larger diameter, and a head c of relatively large diameter. One face of the head c is subject to the pressure of the liquid in the chamber 287 to which is connected a branch of the passage 274, while the other face of the head c is subject to the pressure of the liquid in the chamber 290 which is surrounded by the groove 282. The head c of the valve element 271 has a central projection which is adapted to engage the cover plate 291 to limit movement of the valve element in one direction, while movement of the valve element 272 in the other direction is limited by engagement of the projection 284 on the valve element 270 with the valve element 272. When the valve element 271 is in the position in which the projection on the head c engages the cover plate 291, the land b permits communication between the chamber 290 and the groove 292 which surrounds the land a of the valve element 271 and is connected by a passage 293 with the chamber 258 of the T-V relay valve. When the valve element 271 moves to the right, as viewed in Figure 13, the land b cuts off communication between the groove 292 and the chamber 290.

The control valve 19 includes a shift relay valve element 295 which is controlled by the shift control valve element 270 and cooperates with the shift control valve element 270 to control the direct drive or lock-up clutch 13, while the valve element 295 controls the low range control device 115. The shift relay valve element 295 has spaced lands a, b and c of substantially equal diameter, and a head d of relatively large diameter. The valve element 295 has therein a central bore which is closed at the end adjacent the head of the valve element and which opens on the other end of the valve element. A long coil spring 296 is mounted in this bore, one end of the spring engaging the closed end of the bore in the valve element, and the other end of the spring engaging the closed end of the bore in the valve body in which the valve element 295 is mounted. The spring 296 yieldingly urges the valve element 295 to the position in which a projection on the head d of the valve element engages the cover plate 254. The head d of the valve element 295 is subject to the pressure of the fluid in a chamber 297 to which is connected through an orifice 294 a branch of the passage 195 leading to the direct drive or lock-up clutch 13. The chamber 300 at the other face of the head d of the valve element is constantly open to the sump or exhaust through a port 301.

The end of the bore in the valve body in which the valve element 295 is mounted is connected to the sump through a passage 302 which has a small orifice therein. The passage 302 communicates with the chamber 303 at the end of the valve element 295 adjacent the land a. The chamber 303 is surrounded by a groove 304 so that the groove 304 is open to the chamber when the valve element 295 is in its right hand or low speed position, and so that on movement of the valve element 295 to the left against the spring 296 to the high speed or direct drive position, the land a of the valve element 295 cuts off communication between the groove 304 and the chamber 303. The groove 304 is connected by the passage 305 with the groove 292 of the shift modulator valve, and therefrom through the passage 293 with the chamber 258 of the T-V relay valve.

The control valve 19 includes regulating valve means for regulating the pressure of the liquid supplied to the control devices. This valve means comprises a primary regulator valve element 310 and a secondary regulator valve element 311 which are mounted in a bore in the valve body. This bore has intermediate its ends a portion of reduced diameter through which extends the reduced end portion 312 on the valve element 310. Movement of the valve element 310 to the left as viewed in Figure 13 of the drawings is limited by a stop pin 313 which extends transversely across the bore in which the valve element 310 is mounted.

The valve element 310 is surrounded intermediate its ends by a groove 314 which is connected by a plurality of ports 315 with a central bore 316 in the valve element 310. The bore 316 opens on the end of the valve element 310 adjacent the pin 313 so that this bore is open to the supply chamber 317 to which is constantly connected the passage 318 leading from the front or engine driven pump.

The bore in which the valve element 310 is mounted is surrounded by a groove 320 which is constantly open to the sump, and by a groove 321 which is connected by a passage 322 to a groove 323 surrounding the bore in which the shift control valve element 270 and the shift modulator valve 271 are movable. In addition, the bore in which the primary regulator valve element 310 is mounted is surrounded by a groove 324 to which is connected a branch of the passage 285 leading to the chamber 277 at a face of the shift blocker valve element 272 so that the chamber 325 at the face of the valve element outwardly of the end portion 312 is subject to the pressure of the liquid supplied to the chamber 277 of the shift blocker valve element.

The end face of reduced end portion 312 of the valve element 310 is subject to the pressure of the liquid in the chamber 326 which is surrounded by a groove 327 to which is connected a branch of the passage 274 leading from the output shaft driven pump 17.

The secondary regulator valve element 311 is subject to the opposing forces of the liquid in the chamber 326, and of a spring 330 together with the liquid in the chamber 331 which is connected by a passage 329 with the groove 304 of the shift relay valve and thus to the chamber 258 of the T-V valve. The spring 330 extends between the valve element 311 and the base of an offset formed in the cover plate 254, while the chamber 331 is formed by the bore in the valve body and by the offset in the cover plate 254.

The push start valve element 332 is mounted in the same bore as the primary regulator valve element 310 but is on the opposite side of the pin 313. The valve element has a land a of one diameter, and a land b of slightly larger diameter, while the governor chamber 333 between the lands a and b is surrounded by a groove 334 to which is connected a branch of the passage 274 leading from the rear or output shaft driven pump 17 so that the liquid under pressure supplied by the output shaft pump 17 exerts force on the valve element on the area by which the area of land b exceeds the area of land a. The valve element 332 is urged towards the pin 313 by a coil spring 336 which extends between the valve element 333 and the cover plate 291, and is mounted in a chamber 335 which is constantly open to the sump. The valve element 332 is moved against the spring 336 by the liquid under pressure in the chamber 317, and also by the liquid in the chamber 333. The passage 274 leading from the output shaft driven pump 17 is connected to the groove 334, while a branch of the passage 274 is connected to the passage 265 through a check valve which includes a ball valve element 337 and which serves to permit liquid to flow from the passage 274 to the passage 265 and to prevent flow of liquid in the opposite direction.

The bore in which the push start valve element 332 is mounted is surrounded by a groove 340 to which the supply line or passage 265 is connected, and is also surrounded by a groove 341 to which is connected a passage 342. The grooves 340 and 341 are located so that when an end of the valve element 332 engages the pin 313, the land a of valve element 332 cuts off communication between the chamber 317 and the groove 340, while the land b cuts off communication between the chamber 333 and the groove 341. The various parts of the equipment are also arranged so that on movement of the valve element 332 against the spring 336, the land b opens communication between the chamber 333 and the groove 341 before the land a opens communication between the chamber 317 and the groove 340, but so that on a substantial movement of the valve element 332 against the spring 336, the grooves 340 and 341 are both open and remain open on movement of the valve element 332 into engagement with the cover plate 291. In addition, when the valve element 332 engages the pin 313, land a opens communication between chamber 333 and groove 340, but on movement of the valve element 332 against the spring 336, communication is cut off between groove 340 and the chamber 333 before communication is established between chamber 317 and groove 340.

The bore in which the push start valve element 332 is mounted has connected thereto a pipe or passage 379 leading from chamber 317 and thus from the front or engine driven pump 16. This passage 379 has an orifice 380 therein, and communicates with the bore in which the push start valve is located at a point such as to be open to the chamber 335 at the spring side of the valve element 332, and thus to the sump, when the valve element 332 engages the pin 313. When the valve element 332 is moved against the spring 336 into engagement with the end plate 291, land b of the valve element blocks flow from the passage 379. The passage 379 provides means for the escape of liquid supplied by the pump 16 under extremely low engine speeds, and prevents liquid supplied at such times from moving the valve element 332 against the spring 336. The various parts of the valve device 19 are arranged so that on movement of the valve element 332 against the spring 336 communication is established from chamber 333 to groove 341 before communication through passage 379 is cut off. As hereinafter explained, this facilitates operation of the transmission under push start conditions.

The groove 341 surrounding the bore in which the push start valve element 332 is mounted is connected by a passage 338 with a face of the valve body, the passage 338 having therein an orifice which limits the rate of flow of liquid through the passage. A bi-metal member 339 has one end rigidly secured to the face of the valve body by a screw 343 and has in its other end a small hole in which there is loosely secured a member 344 having a relatively large flat surface adapted to engage the face of the valve body surrounding the end of the passage 338. The bi-metal member 339 is mounted on the valve body and therefore is immersed in the lubricant employed in the transmission. The bi-metal member 339 is arranged so that when the lubricant in the transmission is relatively cold, as for example at a temperature less than 90° Fahrenheit, the member 344 is held away from the face of the valve body to permit free flow of liquid through the passage 338. The bimetal member 339 is also arranged so that when the lubricant in the transmission is relatively warm, and thus is about 90° Fahrenheit, the member 344 is firmly pressed against the face of the valve body to substantially prevent flow of liquid through the passage 338. The thermostatic valve means just described serves to release some of the lubricant supplied by the output shaft driven pump 17 when the lubricant is cold and its viscosity is high. The thermostatic valve means thereby serves to make the pressure of the lubricant supplied by the output shaft driven pump 17 substantially independent of changes in the viscosity of the lubricant.

The governor valve element 345 operates during normal operation of the vehicle to regulate the pressure of the liquid supplied by the rear or output shaft driven pump 17, and thus regulate the pressure of the liquid in the passage 274 and in the connected chambers. The valve element 345 is mounted in a bore in the valve body and is subject to the opposing forces of a coil spring 346 and of the liquid in a chamber 347 to which is constantly connected the passage 342 leading from the groove 341 governed by the push start valve element 332. The spring 346 extends between the valve element 345 and the cover plate 291 and is mounted in a chamber which is constantly open to the sump through a passage in the cover plate. The chamber 347 is constantly connected to the sump through a passage 350 which has interposed therein an orifice limiting the rate of flow of liquid through the passage. The bore in which the valve element 345 is mounted is surrounded by a groove 351 which is connected to the sump through a passage 352 which has interposed therein an orifice limiting the rate of flow of liquid through the passage.

The push start valve element 332 serves to detect operation of the engine driven pump 16, as manifested by the presence of liquid under pressure in the chamber 317, and at such times the valve element 332 establishes communication between the supply chamber 317 and the supply passage 265, and to also establish communication between the governor chamber 333 and the groove 341 so that the pressure of the liquid supplied by the output shaft driven pump 17 is regulated by the governor valve element 345. Under conditions in which the vehicle is in motion and the engine is not running, as manifested by the absence of liquid under pressure in the chamber 317, the valve element 332 serves to maintain the liquid supplied by the output shaft driven pump 17 to the chamber 333 and to the connected passages, at a relatively high value, such as 80 pounds to the square inch.

*Operation of transmission and control valve*

The transmission mechanism is shown in Figs. 1a and 1b of the drawings, and the elements of the control valve are shown in Figure 13 of the drawings in the condition which they assume when the vehicle engine is not running, the vehicle is standing still, the manual control lever is in the neutral position, and the accelerator pedal is released.

As the engine is not running, the front or engine driven pump 16 is not supplying oil under pressure to passage 318 and the primary regulator valve element 310 is held against the pin 313 by the spring 330, while the push start valve element 332 is held against the pin 313 by the spring 336.

As the vehicle is assumed to be standing still, the rear or output shaft driven pump 17 is not operating and does not supply oil under pressure to the passage 274 with the result that chamber 333 of the push start valve is not under pressure, and the passage 274 and the connected chambers are not under pressure. As the accelerator is released, the T-V relay valve element 256 cuts off communication between passage 265 and chamber 258, and the chamber 258 and the connected passages and chambers are not under pressure. Hence, the shift control valve element 270 and the shift modulator valve element 271 are held by spring 276 in the positions shown.

As the control lever is in its neutral position, the parking brake is not applied, and the manual control valve element 211 is in its neutral position in which land $b$ blocks groove 356 to which is connected the supply line or passage 265.

At this time the chamber 277 at one face of the shift blocker valve element 272 is connected to the sump through passage 285, groove 286, the area between lands $b$ and $c$ of valve element 211, and passage 250, while chamber 325 at a face of the primary regulator valve element 310 is also connected to the sump.

When the manually operated valve element 211 is in the neutral position, the passage 186 leading to the chamber 172 of the reverse control device 116 is open to the sump through groove 357, the area between lands $c$ and $d$ of valve element 211, and the end of the bore in which the valve element is mounted, and also through groove 360 which is constantly connected to the sump. Accordingly, the reverse cone control device is released.

As the shift control valve element 270 is held by spring 276 in the left-hand or downshift position, the passage 195 leading to the chamber 50 of the direct drive or lock-up clutch 13 is connected to the sump through groove 361, the area between lands $a$ and $b$ of valve element 270, and groove 362 which is constantly connected to the sump. Hence, the lock-up clutch 13 is disengaged, while chamber 249 at a face of piston 251 of the throttle valve, and chamber 297 at a face of the head $d$ of the shift relay valve element 295 are at atmospheric pressure.

As the manual control valve element 211 is in its neutral position, the passage 363, which is connected to groove 364 surrounding the bore in which the valve element 211 is mounted, is connected to the sump through the area between lands $a$ and $b$ of valve element 211 and thence through the groove 365 which is constantly connected to the sump. The passage 363 is connected to groove 366 surrounding the bore in which the shift relay valve element 295 is mounted. This bore is also surrounded by a groove 367 which is connected by a passage 370 with a groove 371 surrounding the bore in which the shift control valve element 270 is mounted. When the shift relay valve element 295 is in its right hand or low speed position, the grooves 366 and 367 are connected together through the area between lands $b$ and $c$ of valve element 295. The grooves 366 and 367 and the associated passages 363 and 370 are constantly connected together through a choke or orifice 372 of limited flow capacity. As the passage 363 is connected to the sump when valve element 211 is in the neutral position, the connected passage 370 is also connected to the sump.

When the shift relay valve element 295 is in its right-hand or low speed position, the area between lands $a$ and $b$ of the valve element 295 establishes communication between groove 373, to which is connected the passage 185 leading to the chambers 163 and 164 of the low speed control device 115, and groove 374, to which is connected passage 375. The passage 375 is connected to groove 378 surrounding the bore in which the valve element 211 is mounted. When the valve element 211 is in the neutral position, the groove 378 is connected through the area between lands *a* and *b* to groove 365, and thus to the exhaust or sump. Hence, the chambers of the low cone control device 115 are connected to exhaust and this control device is disengaged.

As the pumps are not active and are not supplying oil under pressure, oil is not available to supply the torque converter so no pressure is maintained on the oil therein, while oil may escape therefrom to the sump through the area within the sleeve 80.

Figure 14:
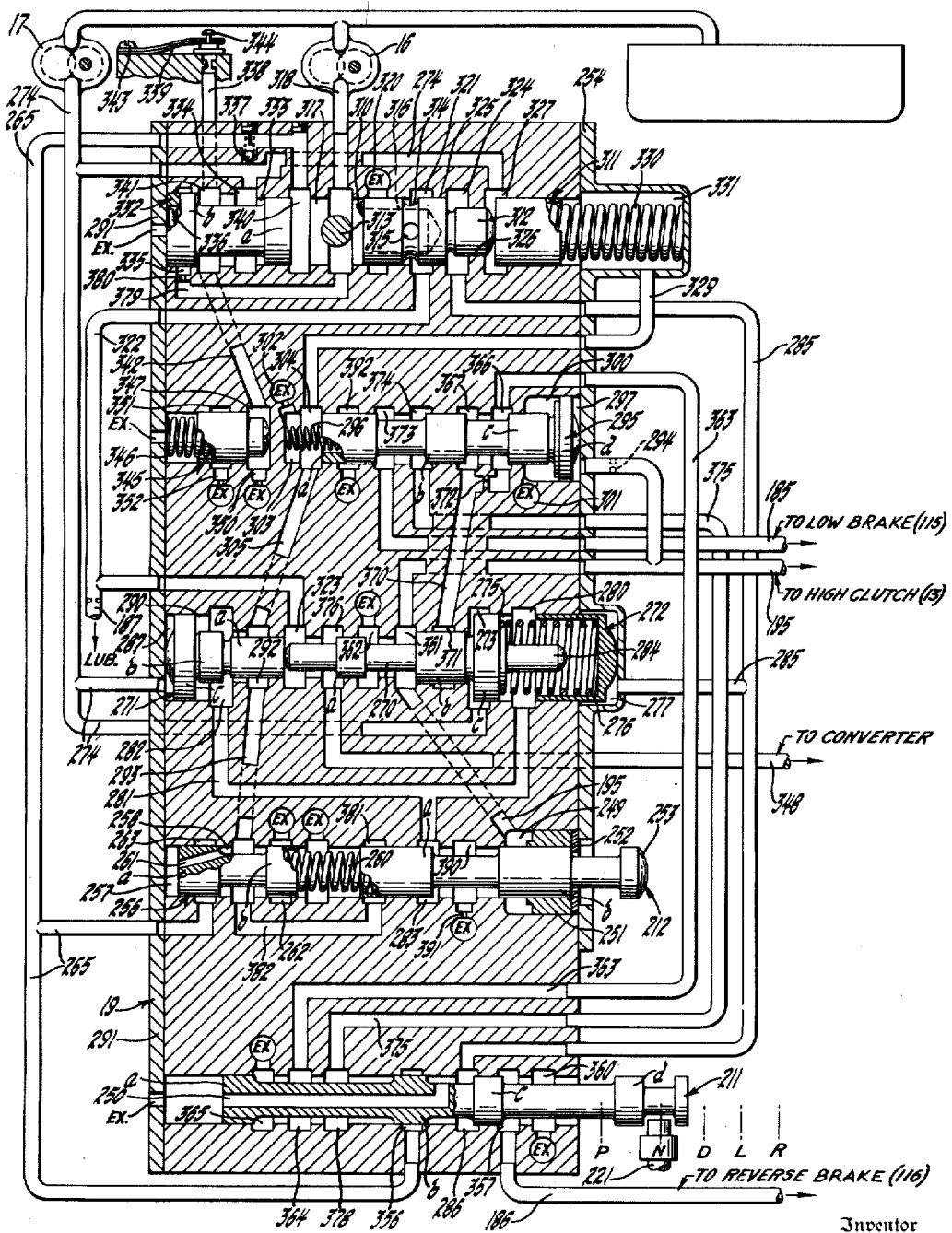

*Engine running manual control valve in neutral—Figure 14*

When the vehicle engine is started, the front or engine driven pump 16 operates at a synchronous, to wit the same or proportional, speed to engine shaft 29 and supplies lubricant under pressure to the passage 318, and thus to chamber 317 at the faces of the push start valve element 332 and of the primary regulator valve element 310. On an increase in the pressure of the liquid in the chamber 317, the push start valve element 332 is moved to the left against the spring 336 to establish communication between chamber 317 and the groove 340 so that oil supplied by pump 16 to chamber 317 flows to supply line or passage 265. In addition, the valve element 332 connects chamber 333 with the governor valve 345 and with passage 338 so that on movement of the vehicle and operation of pump 17 at a synchronous, to wit the same or proportional, speed to output shaft 12, the pressure of the liquid supplied by pump 17 will be regulated by the governor valve 345. Furthermore, at this time, land *b* of valve element 332 blocks the passage 379 controlled by choke 380 so that liquid supplied by pump 16 is not released from chamber 317 through passage 379.

The push start valve element 332, and the associated spring 336 are proportioned so that relatively little pressure must be developed on the liquid in chamber 317, and acting against the entire end face of the valve element 332, to move the valve element 332 against the spring 336 far enough to open communication between the chamber 317 and groove 340 so that liquid supplied by the front pump 16 may flow to the supply line 265, and to also move the valve element 332 far enough to connect chamber 333 with the groove 341, and thus with the governor valve 345. In addition, on this movement of the valve element 332, flow of liquid from the pump 16 through the passage 379 which includes choke 380 is cut off.

As previously explained, when the valve element 211 is in the neutral position, land *b* blocks the supply passage 265. Hence, on the supply of liquid from the pump 16 there is an increase in the pressure of the liquid in passage 265, and also in chamber 317.

On an increase in the pressure of the liquid in chamber 317, the valve elements 310 and 311 are moved against the spring 330 so that the groove 314 is moved into registration with the groove 321 with the result that liquid from chamber 317 flows through the central bore 316 and the ports 315 in valve element 310 to the grooves 314 and 321 and thence to passage 322. Lubricant supplied to passage 322 flows to groove 323, through the area at the left of land *a* of shift control valve element 270 to groove 376 and thence to passage 348 leading to the torque converter. Liquid supplied to the torque converter may escape therefrom through the area between the output shaft 12 and the sleeve 80, but the restrictions on flow of liquid from the torque converter are such that a substantial pressure is maintained on the liquid in the torque converter as long as the supply of liquid to the torque converter is continued.

The valve elements 310 and 311 and the associated spring 330, are arranged and proportioned so that under engine idling conditions, at which time the accelerator pedal is released so that the T-V relay valve element 256 does not cause liquid under pressure to be supplied to chamber 331, the force required to move the valve element 310 against the spring 330 far enough to cause the groove 314 to register with the groove 321 is somewhat more than the force required to move the valve element 332 far enough to open communication from the chamber 317 to the groove 340.

The lubricant supply passage 187 is connected to the passage 322 through which liquid is supplied to the torque converter so that on the supply of lubricant under pressure to the torque converter, lubricant is supplied through the passage 187 to lubricate portions of the transmission. Hence, whenever the engine operating, lubricant is supplied to the transmission by discharge from the torque converter and also through the passage 187 so that the transmission is certain to be adequately lubricated.

Since an appreciable pressure must be established on the liquid in chamber 317 before the valve element 310 is moved far enough to permit supply of fluid to the torque converter, it follows that liquid under pressure will be available to operate the control devices before liquid is supplied to the torque converter. This insures that at low engine speeds, at which time the pump output is small, there will be sufficient liquid at a sufficient pressure to satisfactorily operate the control devices before liquid is supplied to the torque converter, and that liquid for the torque converter is available only after the requirements of the control device controls have been satisfied.

If the quantity of liquid supplied by the pump 16 is such that the pressure of the liquid in chamber 317 continues to increase after supply to the torque converter, the primary regulator valve element 310 will be moved against the spring 330 so as to permit liquid to flow from chamber 317 to the groove 320 and thus to the sump, thereby limiting the degree of increase in the pressure of the liquid in chamber 317.

As previously explained, the low speed, the direct drive or lock-up, and the reverse control devices are released. Hence, the vehicle is certain to remain stationary since no connection is established to transmit engine torque to the output shaft 12.

If the accelerator is depressed to increase the speed of the engine, the pump 16 will operate at a more rapid rate, with the result that there is an increase in the supply of liquid to chamber 317. On this increase in the supply of liquid to chamber 317, the valve element 310 is moved to the right against the spring 330 to release fluid from the chamber 317 to the sump through the groove 320 and thus limit the amount of the increase in the pressure of the liquid in the chamber 317. At this time the T-V valve 256 operates to supply liquid under pressure to chamber 258, and thus to chamber 331 of the secondary regulator valve. Hence, the degree of increase in the pressure 317 is dependent on the extent of opening of the throttle.

As the control devices are released, the increase in the speed of the engine cannot cause movement of the vehicle.

Figure 15:
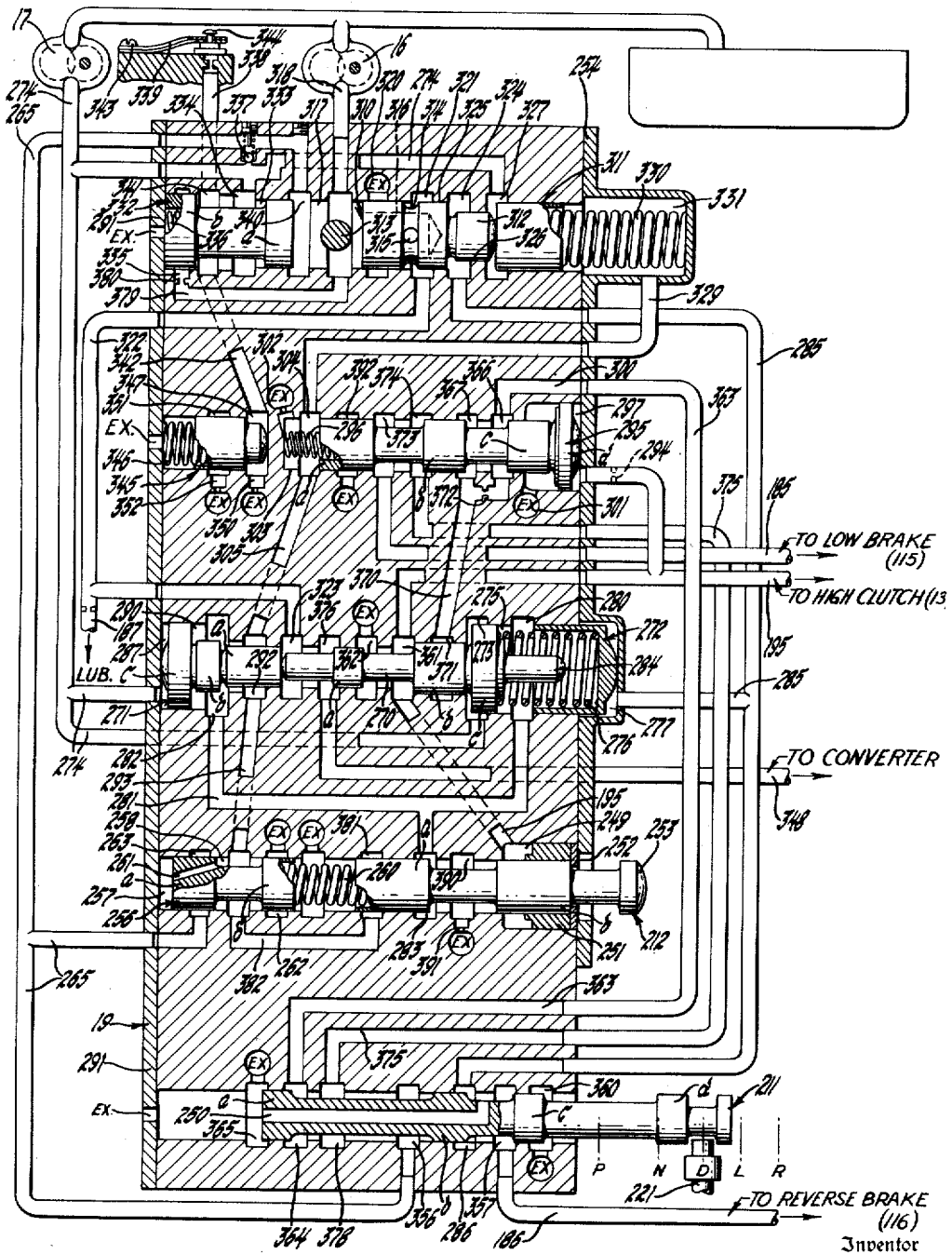

*Engine running-manual control valve element in drive position D—vehicle standing still—Figure 15*

The major portion of all driving of a vehicle equipped with this transmission is done with the control lever in the drive position D which causes the manually operated control valve element 211 to occupy the position D, as shown in Figure 15 of the drawings. When the valve element 211 is in this position, the transmission is caused to start the vehicle in the transmission low range in which the engine torque is transmitted to the output shaft 12 through the torque converter in series with a gear reduction provided by the planetary gearing, the low range of the transmission being established by engagement of the low range control device 115. On a suitable increase in the speed of the vehicle, depending on the accelerator pedal position, the low range control device 115 is released and the direct drive clutch 13 is engaged so that the output shaft is driven directly from the engine, the torque converter and the planetary gearing being inactive. If the car speed decreases sufficiently, the direct drive clutch will be released and the low range control device will be engaged to restore drive through the transmission low range until the vehicle speed again increases to a suitable rate.

On movement of the valve element 211 from its neutral position N to its drive position D, the land $a$ of valve element 211 cuts off communication between passages 363 and 375 and the exhaust groove 365, while land $b$ of valve element 211 opens communication from supply line or passage 265 to the passages 363 and 375. In addition, in this position of the valve element 211 the passage 285 remains connected to the sump through passage 250, while land $c$ cuts off communication between passage 186 and groove 360, but causes reverse control device control passage 186 to be connected to the sump through the passage 250.

On movement of the valve element 211 to the position D, liquid flows from the supply passage 265 to the groove 364, to passage 363, and flows therefrom through the grooves 366 and 367 associated with shift relay valve element 295 to the passage 370. However, as the shift control valve element 270 is in its downshift position, liquid cannot flow from passage 370 to the direct drive clutch control passage 195 leading to the direct drive clutch 13. Accordingly, as long as the shift control valve element 270 remains in the downshift position, the direct drive clutch 13 remains released.

When the manual control valve 211 is moved to the position D, liquid flows from supply passage 265 to passage 375, and thence through the area between lands $a$ and $b$ of shift relay valve element 295 to the low range control passage 185 leading to the chambers 163 and 164 of the low speed control device 115. Accordingly, there is an increase in the pressure of the liquid in chamber 163 at the face of the hub portion of the cone 162 and this cone, along with the sun gear unit 114, is moved axially so that the conical surface on the cone 162 engages the surface 156 on the cup 155 to resist rotation of the sun gear unit 114, and to provide a seal to prevent the escape of liquid from chamber 164. After the pressure increases in chamber 163, liquid flows therefrom to chamber 164 to increase the force exerted to press the cone 162 to the engaged position, while this force is further augmented by axial force exerted by the sun gear unit 114 when torque is transmitted from the engine through the carrier 130 to the output shaft 12.

When the cone 162 engages the surface 156 on the cup 155, the sun gear unit 114 is locked to the transmission housing and is prevented from rotating. Hence, when torque is transmitted from the engine to the torque converter driven member 76, and thus to the drum 81 so that the drum turns, the planet gears 132 travel around the sun gear 136 and cause the carrier 130 to turn at a speed somewhat slower than the speed of the drum 81. The carrier 130 is secured on the output shaft 12 so the carrier drives the output shaft.

As long as the accelerator remains released, and the engine remains at the idling speed, the torque converter does not transmit sufficient torque to move the vehicle. However, as soon as the accelerator is depressed to increase the engine speed, the torque transmitting capacity of the torque converter increases and sufficient torque is transmitted from the torque converter driven element 76 to the planetary gear unit input member or drum 81 to cause the carrier 130 to turn the output shaft 12 and thus drive the vehicle.

In addition, when the accelerator is depressed, the T-V valve operates to cause the pressure of the liquid in the chamber 258, and in the connected chambers and passages to increase in accordance with the extent of opening of the vehicle throttle. On this increase in the pressure of the liquid in the chamber 258, there is a similar increase in the pressure of the liquid in the chamber 331 at the face of the secondary regulator valve element 311 with the result that there is an increase in the force opposing movement of the primary regulator valve element 310 by the liquid under pressure in chamber 317. Hence, the pressure on the liquid in the chamber 317 must increase to a higher value before the valve element 310 is moved to the position to open the relief groove 320. As a result, there is an increase in the pressure maintained on the liquid in chamber 317, and also in the pressure of the liquid supplied through passage 322 to the torque converter, and through supply passages 265, 375 and 185 to the low speed control device 115 so that the torque transmitting capacity of the torque converter and of the low speed control device are increased when the accelerator is depressed to increase the torque output of the engine.

Furthermore, as previously explained, when the sun gear unit 114 is held by the low speed control device 115 and serves as the reaction member of the planetary unit, the axial thrust exerted on the sun gear unit increases in accordance with the torque transmitted through the planetary gear unit and correspondingly increases the force holding the cone 162 in engagement with the surface on the transmission housing. Accordingly, the low speed control device is certain to be fully engaged and to hold the sun gear unit without slippage.

In addition, on the increase in the pressure of the liquid in the chamber 258 of the T-V valve, there is an increase in the pressure of the liquid in the chamber 290 at the face of the piston $c$ of the shift modulator valve element 271, in chamber 275 at a face of the head $c$ of the shift control valve element 270, and in the chamber 303 at the end face of the land $a$ of the shift relay valve element 295.

On the supply of liquid under pressure from chamber 258 of the T-V valve through passage 293 to groove 292, and thence to chamber 290 of the shift modulator valve, liquid flows from chamber 290 through passage 281 to groove 280 and thus to chamber 275 on the spring side of the piston or head $c$ of the shift control valve element 270. A branch of the passage 281 is connected to groove 283 surrounding the bore in which the T-V valve element 212 is mounted. In all positions of the T-V valve element 212, except the position to which the valve element is moved when the accelerator pedal is fully depressed, that is moved beyond the position established by the hydraulic detent or piston 251 associated with the valve element 212, the groove 283 is connected through the area between lands $b$ and $c$ of valve element 212 to the groove 390 which is constantly open to the sump through an orifice 391 of limited flow capacity. Hence, under normal operating conditions, liquid constantly flows from passage 281 through orifice 391 to the sump, but the flow capacity of the orifice 391 is to small that as long as the shift modulator valve element 271 is in its left-hand or downshift position, in which liquid is freely supplied from T-V valve to chamber 290, passage 281, and chamber 275, the pressure of the liquid in these chambers and passage is maintained substantially at the full pressure of the liquid supplied by the T-V valve.

Accordingly, the liquid under pressure in chamber 290, and acting on an area equal to the difference between the area of the head of piston $c$, and of the land $a$, exerts force to move the shift modulator valve element 271 to the left. This force is augmented by the force exerted by liquid under pressure supplied to the converter and acting on the end face of the land *a* of valve element 271, while this liquid exerts on an area of valve element 270 equal to the diameter of land *a* a force tending to move the valve element against the spring 276 and against the liquid under pressure, in chamber 275. At the same time, valve element 270 is urged to the left by the spring 276, and by liquid under pressure in chamber 275, this liquid being at the pressure supplied by the T-V valve. The liquid supplied by the T-V valve is at a somewhat lower pressure than the liquid supplied to the torque converter, but the area of the piston or head *c* of shift control valve element 270 subject to liquid under pressure in chamber 275 is much larger than the area of the valve element subject to the pressure of the liquid supplied to the torque converter. Furthermore, the spring 276 exerts force on the valve element 270 so that the valve element 270 remains in the left-hand or downshift position until the pressure of the liquid supplied from the output shaft driven pump 17 increases to a sufficient value, as hereinafter explained.

In like manner, on the supply of liquid from the T-V valve to the chamber 303 at the end of the shift relay valve element 295, liquid flows therefrom at a restricted rate through the orifice 302. However, the rate of flow of liquid through the orifice 302 is so small that as long as the shift relay valve element 295 remains in its right-hand or downshift position, the pressure of the liquid in the chamber 303 is maintained substantially at the full pressure of the liquid supplied from the T-V valve. The liquid under pressure in chamber 303 exerts force on the valve element 295 to assist the spring 296 in maintaining the valve element 295 in the right-hand or downshift position.

On the initial increase in the engine speed above the idling speed, the speed reduction and torque multiplication in the torque converter are the maximum so the vehicle is started smoothly and quickly and the vehicle accelerates promptly. As the vehicle speed increases the torque multiplication and speed reduction in the torque converter gradually decrease so that the torque multiplication and speed ratio in the torque converter gradually approach unity, but the speed reduction and torque increase in the planetary gearing continues.

As soon as the vehicle starts to move the output shaft driven pump 17 operates and supplies liquid through the passage 274 to chamber 333 of the push start valve, and also to chamber 287 at a face of the head *c* of valve element 271 and to chamber 273 at a face of the head *c* of valve element 270. As the engine driven pump 16 is operating the push start valve element 332 has been moved to the left against the spring 336 and opens communication between chamber 333 and the groove 341 so that liquid supplied by the pump 17 flows to the governor valve 345 and escapes through the orifice in passage 350. The volume of liquid supplied by the pump 17 varies in accordance with the rate of operation of the output shaft 12, and therefore with the speed of the vehicle. The rate of flow of liquid through the orifice in passage 350 varies in accordance with the square of the pressure on the liquid in the chamber 333. Accordingly, as the volume of liquid supplied by the pump 17 increases, the pressure on the liquid in chamber 333 increases so that the rate of escape of liquid through the orifice in passage 350 increases to equal the rate of supply of liquid by the pump. As a result, as the speed of the vehicle increases, there is an increase in the pressure of the liquid in the chamber 333, and in the connected passages and chambers.

On this increase in the pressure of the liquid supplied to the governor valve, the valve element 345 is moved against the spring 346, and on a sufficient increase in this pressure, the valve element 345 is moved far enough to open communication through the groove 351 and the associated passage 352 which is controlled by an orifice of small flow capacity. When the groove 351 is opened, there is a substantial increase in the rate at which liquid may escape from the chamber 333 so there is a decrease in the rate at which the pressure of the liquid in chamber 333 increases above the pressure required to move valve element 345 far enough to open groove 351. Accordingly, the pressure of the liquid in the chamber 333 builds up at a relatively rapid rate until this pressure is high enough to move the governor valve element 345 against the spring 346 far enough to open the groove 351, whereupon the pressure of this liquid increases slowly until a fairly high vehicle speed, such as 50 miles an hour, is attained, at which time the pressure of the liquid supplied by the pump 17 increases relatively rapidly. The initial further increase in the pressure of the liquid in chamber 333 is determined largely by the force required to move the valve element 345 against the spring 346 to permit flow of liquid to the groove 351, while subsequent further increases in this pressure is determined largely by the rate of flow of liquid through the orifices in passages 352 and 350.

The various parts of the equipment are arranged and proportioned so that under all normal operating conditions, and at all usual operating speeds, the pressure of the liquid in the chamber 333 of the push start valve is less than the pressure of the liquid in the supply passage 265. Hence, the pressure of the liquid in chamber 333 is not affected by flow therefrom past the ball check valve 337 to the passage 265, but is regulated solely by the governor valve. The ball check valve 337 provides a path for the release of liquid from chamber 333 under abnormal conditions, such as extremely high vehicle speed, or in push starting the vehicle.

On the increase in the pressure of the liquid in the chamber 333, there is a corresponding increase in the pressure of the liquid in the chamber 287 at a face of the piston or head *c* of the shift modulator valve element 271, and in the chamber 273 at a face of the piston or head *c* of the shift control valve element 270. Increases in the pressure of the liquid in these chambers increases the force tending to move the valve elements 271 and 270 to the right to their upshift positions. The value to which the pressure of the liquid supplied from the rear or output shaft driven pump 17 to the chambers 273 and 287 must increase before the shift control valve element 270 and the shift control modulator valve element 271 are moved to the right to their upshift positions is dependent on the opposing force of the spring 276 and of T-V pressure in chambers 275 and 290.

The various parts of the equipment are arranged and proportioned so that when the accelerator is released, at which time there is no T-V pressure so that movement of the shift valve element 270 is opposed almost entirely by the output shaft driven pump 17 to the chambers 287 and 273 is high enough to cause movement of the valve element 270 to the upshift position when the vehicle reaches a relatively low rate of speed, such as 15 miles per hour.

On the other hand, when the accelerator is depressed to the point at which further movement of the accelerator is resisted by the hydraulic detent or piston 251 associated with the T-V valve, at which time the throttle valve is substantially fully open, and at which time the pressure of the liquid supplied by the T-V valve is substantially at the maximum value, the pressure of the liquid supplied by the pump 17 to the chambers 287 and 273 is not effective to cause movement of the valve elements 270 and 271 to the upshift position until the vehicle reaches a relatively high range of speed, such as 55 miles per hour.

At intermediate positions of the vehicle throttle, the T-V pressure is at an intermediate value, and the pressure of the fluid supplied by the pump 17 will be effective to move the shift valve elements 270 and 271 to the upshift position at intermediate vehicle speeds.

On movement of the shift valve element 270 to the upshift position, the shift modulator valve element 271 moves to the right with the result that land b of the valve element cuts off the supply of liquid from the T-V valve to the chamber 290, and thus through passage 281 to the chamber 275. At this time the chambers 290 and 275 are connected to the sump through the orifice 391 in the passage leading from groove 390 associated with the T-V valve. Accordingly, as soon as the supply of liquid from the T-V valve to the chambers 290 and 275 is cut off by movement of the shift modulator valve element 271, the pressure of the liquid in these chambers quickly reduces to atmospheric pressure so there is a substantial decrease in the force opposing movement of the shift valve element 270 to the upshift position and tending to move this valve to the downshift position. The land b of valve element 271 is effective to cut off the supply of T-V pressure to chambers 290 and 275 on movement of the valve elements 271 and 270 a portion of their total range of movement from the downshift to the upshift position. Accordingly, there is a reduction in the pressure of the liquid in the chambers 290 and 275 as soon as the shift modulator valve element 271 moves a short distance so that land b cuts off the supply of T-V pressure to the chamber 290. On movement of the shift valve element 270 towards the upshift position, the spring 276 is compressed and exerts gradually increasing resistance to movement of the shift valve element. However, the reduction in the force opposing movement of the shift valve element 270 to the upshift position, which occurs when land b of valve element 271 cuts off the supply of T-V pressure to the chambers 290 and 275, is so much greater than the increase in force occasioned by compression of the spring 276 that if the valves 271 and 270 move far enough away from the downshift position to cut off the supply of T-V pressure to chambers 290 and 275, these valves are certain to rapidly complete their movement to their upshift positions.

Figure 16:
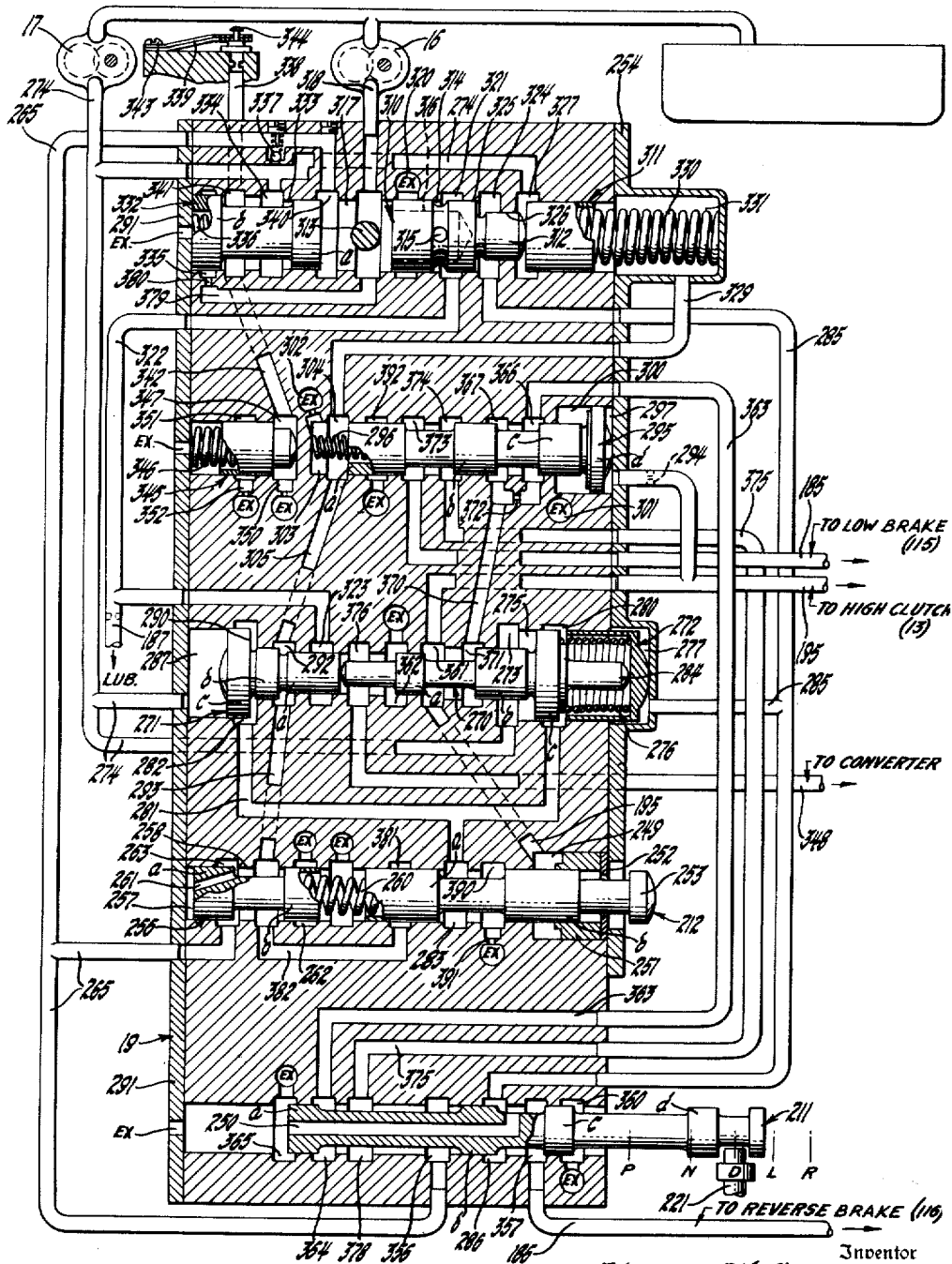

When the valve elements 270 and 271 complete their movement to their upshift positions, the various parts of the control valve are substantially in the positions shown in Figure 16 of the drawings.

When the valve elements 270 and 271 complete their movement to their upshift position, land a of valve element 271 cuts off communication between grooves 323 and 376, and thus cuts off the supply of liquid under pressure to passage 348 leading to the torque converter. In addition, at this time, land a of valve element 270 opens communication from groove 376 to groove 362 so that the torque converter is open to the sump. However, the volume of the liquid in the torque converter is so great, and the liquid present therein is thrown outwardly by centrifugal force so that the torque converter continues to be effective to transmit torque after the supply of lubricant under pressure thereto is cut off. Hence, the vehicle continues to be driven by torque transmitted through the torque converter and the planetary gears after movement of the shift control valve element 270 to its upshift position. The reduction in the pressure of the liquid in the torque converter reduces the force opposing movement of the piston 45 of the clutch 13 to effect engagement of this clutch so the pressure of the liquid required to engage the direct drive clutch is held to the minimum.

On movement of the valve element 270 to its upshift position, its land a cuts off communication between the passage 195 leading to the direct drive or lock-up clutch 13, and the groove 362, which is open to the sump. In addition, on movement of the valve element 270 to the upshift position, its land b opens communication between grooves 371 and 361 so that fluid is supplied to the direct drive or lock-up clutch 13 through the path which includes the supply passage 265, area between lands a and b of valve element 211, passage 363, area between lands b and c of valve element 295 in parallel with the choke 372, passage 370, areas between lands a and b of valve element 270, and passage 195 leading to chamber 50 of the lock-up clutch 13. Accordingly, there is an increase in the pressure of the liquid in the chamber 50 with the result that the piston 45 exerts force to deflect release spring 52 and to press the driven plate 53 against the pressure plate 43. Accordingly, force is transmitted from the flywheel through the driven plate 53 to the output shaft 12 to drive the vehicle, the magnitude of the force transmitted through the driven plate 53 varying in accordance with the pressure of the liquid in the chamber 50 of the direct drive clutch 13.

Furthermore, on movement of valve element 270 to its upshift position, liquid under pressure in the area between lands a and b of the valve element exerts on the area of land b outwardly of land a force tending to hold the valve element in the upshift position. The pressure of the liquid in the small chamber between lands a and b of valve element 270 builds up quickly on movement of the valve element to the position in which land b opens groove 371. Hence, there is an appreciable increase in the force tending to move valve element 270 to the upshift position as soon as groove 371 is opened and the valve element thereupon rapidly completes its movement to the upshift position.

On the increase in the pressure of the liquid in the chamber 50 of the lock-up clutch 13, there is a corresponding increase in the pressure of the liquid in chamber 297 of the shift relay valve element 295 as this chamber has a branch of the passage 195 connected thereto. When the pressure of the fluid in chamber 297 builds up to a sufficient value, the force exerted on the head d of valve element 295 is great enough to move the valve element 295 to the left to its upshift position against the opposing force of the spring 296 and of T-V pressure in chamber 303 and acting on the end face of the land a.

On movement of valve element 295 to its upshift position, its land a opens communication from passage 185 leading to the low speed control device 115, and groove 392 which is open to the sump. In addition at this time, land b of the valve element 295 cuts off communication between passage 375 and the low speed control passage 185 so that at this time the supply of liquid under pressure to the low speed control device is cut off and the low speed control device is connected to the sump with the result that the low speed control device becomes released or disengaged.

Furthermore, on movement of the shift relay valve element 295 to its upshift position, land c of the valve element blocks communication between the grooves 366 and 367 so that the flow of liquid under pressure to the direct drive clutch 13 is restricted to flow through the orifice 372 which has a limited flow capacity. As a result, the rate of increase in the pressure of the liquid in the chamber 50 of the direct drive clutch is substantially reduced.

In addition, on movement of the shift relay valve element 295 to its upshift position, land a cuts off communication between groove 304 to which is connected passage 305 leading from the T-V valve, and chamber 303. The chamber 303 is constantly connected to the sump through the passage 302 so that when the supply of liquid from the T-V valve to the chamber 303 is cut off, the pressure of the liquid in chamber 303 quickly reduces to atmosphere and there is a reduction in the forces opposing movement of the valve element 295 to its upshift position and tending to move this valve element to its downshift position.

After movement of the shift relay valve element 295 to the left to its upshift position, the various parts of the control valve are substantially in the positions in which they are shown in Figure 17 of the drawings.

From the foregoing it will be seen that the shift valve elements 270 and 271 are urged to the upshift position by liquid supplied by the output shaft driven pump 17, the pressure of this liquid increasing as the speed of the output shaft increases, and that movement of the shift valve element 270 to the upshift position is opposed by liquid under pressure supplied by the T-V valve, and by spring 276, this pressure increasing as the accelerator is depressed. Hence, the vehicle speed at which the shift valve element 270 moves to the upshift position increases as the accelerator is depressed. When the shift valve elements 270 and 271 move to their upshift positions, liquid under pressure is supplied to the lock-up or direct drive clutch 13 at a rapid rate until there is developed in the operating chamber of the clutch an intermediate pressure which is effective to cause the shift relay valve element 295 to move to its upshift position. This movement of the shift relay valve element 295 is opposed by T-V pressure in chamber 303 and spring 296 so that the pressure which must be built up in the operating chamber 50 of the direct drive clutch 13 before the shift relay valve element 295 moves to the upshift position to release the low speed control device and reduce the rate of increase in the degree of application of the lock-up clutch increases as the accelerator pedal is depressed, and therefore as the load on the engine is increased. Hence, during an upshift in the transmission, the extent or duration of the overlap in the engagement of the low speed control device and direct drive clutch varies in accordance with the load on the vehicle engine.

The initial supply of liquid under pressure to the chamber 50 of the lock-up clutch 13 at a rapid rate enables the pressure of the liquid in this chamber to rapidly build up so as to move the piston 45 against the associated release spring 52, and against the opposing force of the liquid under pressure in the chamber of the torque converter, and to lightly press the driven plate 53 against the pressure plate 43 to establish a limited transmission of torque through the driven plate 53 to the output shaft 12. Thereafter, the rate of supply of fluid to the chamber 50 of the direct drive clutch 13 is reduced so that the rate of increase in the pressure of the fluid in the chamber 50, and the rate of increase in the degree of engagement of the direct drive clutch, are correspondingly reduced and the direct drive clutch becomes engaged smoothly and gradually.

As previously pointed out, the degree of engagement of the low speed control device 115 is dependent in part on the magnitude of the torque transmitted through the gearing controlled by this control device. On initial engagement of the direct drive clutch 13 and resultant application of torque through this clutch to the output shaft 12, there is a gradual reduction in the torque transmitted to the output shaft 12 through the gearing controlled by the low speed control device 115 so that there is a gradual reduction in the degree of application of the low speed control device. Accordingly, during the period in which the low speed control device and direct drive clutch are both engaged, there is a gradual transfer of torque transmission from the gearing controlled by the low speed control device to the direct drive clutch. As previously explained, the duration of the period during which the low speed control device and direct drive clutch are both engaged varies in accordance with the amount the accelerator has been depressed, and therefore in accordance with the load on the vehicle engine, so that as the total torque transmitted to the output shaft increases, there is a corresponding increase in the length of the period during which the transmission of torque to the output shift is transferred from the gearing controlled by the low speed control device to the direct drive clutch.

As the torque transmitted to the output shaft through the gearing controlled by the low speed control device is reduced by gradual increase in the torque transmitted through the direct drive clutch, there is an accompanying reduction in the torque transmitted through the torque converter with the result that there is a gradual reduction in the degree of torque multiplication and speed reduction in the torque converter. Hence, the torque converter gradually drives the drum 81 at a lesser rate so as to tend to cause torque to be applied in diminishing magnitude through the carrier 130 to the output shaft 12 as the speed of the output shaft increases because of the application of torque thereto through the direct drive clutch.

In addition, as the direct drive clutch 13 becomes engaged and is increasingly effective to transmit torque from the engine to the output shaft, there is an increase in the load on the vehicle engine because the direct drive clutch drives the output shaft 12 at engine speed instead of at a reduced speed, as is the case of torque transmitted through the low speed gears and the torque converter. Hence, the engine speed is reduced by the gradual application of increased load thereon, while the vehicle speed is increased because of the driving force applied to the vehicle through the direct drive clutch. The decrease in the engine speed, and the increase in the vehicle speed, continues throughout the period during which the low speed control device and direct drive clutch overlap or are both engaged, and as this period increases as the accelerator is depressed, and therefore as the load on the engine and also the engine speed increase, the period during which the engine and vehicle speeds are brought into synchronism varies as the difficulty of making them synchronize increases.

Accordingly, the operation of the equipment is such that during an upshift of the transmission, at which time the low speed control device and direct drive clutch are simultaneously engaged, the engine speed is gradually reduced and the vehicle speed is gradually increased so that by the time the upshift has advanced to the stage at which the low speed control device is fully released, the engine and vehicle speeds are substantially in synchronism and the vehicle will not be suddenly accelerated by subsequent full engagement of the direct drive clutch, as would occur if the engine speed substantially exceeded the vehicle speed, nor will the direct drive clutch be slipped to an objectionable extent when the low speed control device is released. Instead, the upshift takes place gradually and smoothly without sudden changes in the speed of either the vehicle or the engine.

At the time the shift relay valve element 295 moves to its upshift position, the passage 185 connected to chamber 163 of the low speed control device 115 is connected to the sump, so liquid is released from this chamber with the result that liquid flows at a restricted rate from chamber 164 to chamber 163 and thence to the sump. As a result, there is a gradual reduction in the pressure of the liquid in these chambers and a gradual reduction in the force tending to hold the cone 162 against the seat on the housing. Finally, the force exerted by the liquid in chambers 163 and 164 is insufficient to press the cone 162 against the housing firmly enough to prevent rotation of the cone 162 and of the sun gear unit 114 so the low speed control device 115 is ineffective to cause torque to be transmitted through the associated gears, and the gears cease to cause axially directed thrust to be applied to the sun gear unit 114 to cause engagement of the cone 162. Hence, the cone 162 moves away from the surface on the housing and the liquid remaining in chamber 164 may escape around the periphery of the cone 162 and thence to the sump, while liquid in chamber 163 continues to escape to the sump through the passage controlled by the shift relay valve element 295. At the time of the upshift, the low planetary gear system is being driven by the carrier 130 attached to shaft 12 rather than by the input ring gear 81. Therefore the axial thrust due to the gears is reversed and is now acting to pull the cone 162 away from the cup 156.

At the time the shift relay valve element 295 moves to its upshift position to release the low speed control device 115 and to reduce the rate of supply of liquid to the direct drive clutch, the direct drive clutch 13 is not fully engaged, the degree of engagement varying with the extent of depression of the accelerator pedal. The various parts of the equipment are arranged and proportioned so that the degree of engagement of the lock-up or direct drive clutch 13 at the time of release of the low speed control device 115 will be great enough to transmit the engine torque without objectionable slippage. Hence, on release of the low speed control device, the lock-up clutch is capable of assuming the entire engine load, while the degree of engagement of the lock-up clutch 13 is thereafter gradually increased so that the lock-up clutch 13 becomes fully engaged and transmits the engine torque without slipping.

As previously stated, the piston 45 of the direct drive clutch is of relatively large diameter and has a large effective area so that a relatively low pressure on the liquid in the operating chamber 50 will cause sufficient force to be exerted to press the driven plate 53 against the pressure plate 43 firmly enough to prevent slipping of this clutch disc. Accordingly, the regulator valve portion of the control valve is arranged so that the pressure maintained in the system during operation of the vehicle at substantial speeds is reduced to the value necessary for operation of the clutch 13. This pressure is somewhat lower than is required by the low speed and reverse control devices, and the reduction in the pressure maintained in the system during engagement of the lock-up clutch reduces the power consumed by the pump 16 which provides this liquid under pressure.

The piston 45 of the clutch 13 is exposed to the liquid in the chamber of the torque converter, the force exerted on the piston 45 by the liquid in the torque converter chamber opposing engagement of the clutch 13. As heretofore explained, when the shift valve elements 270 and 271 move to their upshift positions, the supply of liquid under pressure to the chamber of the torque converter is cut off and this chamber is connected to the sump. Hence, during engagement of the lock-up clutch, the liquid in the torque converter chamber does not increase the pressure which must be developed in the chamber 50 to cause adequate engagement of the clutch.

A branch of the passage 274 leading from the output shaft driven pump 17 is connected to the chamber 326 between the faces of the reduced end portion 312 of the primary regulator valve element 310 and the end face of the secondary regulator valve element 311. As heretofore explained, the pressure of the liquid supplied by the pump 17 varies with the output shaft speed, being low at low vehicle speeds and increasing as the vehicle speed increases. Accordingly, when the pressure of the liquid in the passage 274 increases, there is an increase in the pressure of the liquid in the chamber 326 and force is exerted on the valve element 311 and opposing the force exerted by the spring 330 and by T-V pressure in chamber 331, while force is exerted on the end portion 312 of valve element 310 to supplement the force exerted by the spring 330 and the T-V pressure. As the area of valve element 311 subject to liquid under pressure in chamber 326 is larger than the area of the end portion 312 of valve element 310, the effect of the supply of liquid under pressure to chamber 326 is to reduce the force exerted on valve element 310 by the amount equal to the force exerted by liquid under pressure acting on an area equal to the area by which the area of valve element 311 exceeds the area of the head portion 312 of the valve element 310. On this reduction in the force exerted on the valve element 310, there is a reduction in the pressure of the liquid in chamber 317 which is required to move the valve element 310 to release liquid from the chamber 317 through the groove 320 so there is a reduction in the pressure maintained on the liquid in the chamber 317, and in the connected passages and chambers including chamber 50 of the lock-up clutch. At this time the T-V pressure supplied to chamber 331 continues to influence the pressure maintained in the system so the force effective to maintain engagement of the lock-up clutch varies in accordance with the torque transmitted through the clutch. This arrangement reduces the pressure maintained on the liquid in the supply passage throughout the range of vehicle speeds in which most of the vehicle operation occurs, and thus reduces the force consumed in driving the pump 16 which supplies this liquid.

After release of the low speed control device 115, the input gear 81 of the planetary gear set has very little load imposed thereon so this gear is driven by the driven element 72 of the torque converter even though the chamber of the torque converter is connected to the sump. The liquid retained in the torque converter by centrifugal force is effective to transmit to the torque converter driven element 72 the limited amount of torque required to drive the drum 81 at this time so the drum 81 is driven substantially at engine speed.

In addition, the carrier 130 is driven at the speed of the output shaft 12, and therefore at the speed of the engine. As the ring gear and the carrier of the front planet unit are both driven at the speed of the engine, the sun gear unit 114 is caused to rotate at engine speed, thereby causing the carrier of the rear planet unit to rotate with the drum 81 and the sun gear unit 114. Hence, when the lock-up clutch 13 is engaged, the planetary gears and the driven element of the torque converter rotate substantially at the same speed as the output shaft and consume a minimum amount of power. Since the entire planet gear assembly rotates substantially at the same speed as the output shaft, there is little relative movement between the various parts of the planetary gear assembly so there is little need for lubrication. However, the supply of lubricant through passage 187 leading to the transmission is maintained during engagement of the lock-up clutch so the transmission is certain to be adequately lubricated.

When the lock-up clutch 13 is engaged, liquid under pressure supplied to the passage 195 leading to the operating chamber 50 of the lock-up clutch 13 flows through a branch of passage 195 to the chamber 249 at the face of the annular piston 251 associated with the T-V valve element 212 and causes the piston 251 to yieldingly oppose movement of the valve element 212 toward the throttle open position beyond the point at which further movement of the valve element will result in downshifting the transmission as hereinafter explained.

*Operation of transmission during downshift to low range*

The various parts of the transmission remain substantially as described with the lock-up clutch 13 engaged until conditions become such as to cause a downshift in the transmission. A downshift in the transmission, that is a shift from direct drive to drive through the torque converter and the low speed planetary gearing, may occur as a result of either of the following conditions, which are (1) a change in the vehicle speed and accelerator pedal position relationship such as a reduction in vehicle speed or a further movement of the accelerator pedal towards the throttle open position, (2) movement of the accelerator pedal towards the throttle open position beyond the position defined by the piston 251 associated with T-V valve element 212, or (3) movement of the manual control valve element 211 to the low range position L.

*Automatic downshift*

The downshift, which occurs as a result of the first condition described above, occurs automatically and serves to increase the torque available to move the vehicle when driving conditions are such as to indicate that more torque is required, or when the vehicle speed reduces to such a low value that a shift to low range becomes desirable.

As previously explained, when the shift control valves 270 and 271 are in their upshift positions, the valve is held in this position by the liquid under pressure supplied by the output shaft pump 17 to the chamber 273 at a face of the piston or head c of the valve element 270, and to the chamber 287 at a face of the head c of the shift modulator valve element 271, the pressure of this liquid varying with the speed of the vehicle. In addition, the shift control valve element 270 is urged to the upshift position by liquid at the pressure of the liquid supplied to direct drive clutch control passage 195, this liquid being present in the area between lands a and b of the valve element 270 and exerting force on land b. At this time the shift valve element 270 is urged towards the downshift position by the spring 276, while the force exerted by the shift modulator valve element 271 is decreased by the force exerted by T-V pressure acting on the area of land b outwardly of the land a of the valve element. Accordingly, as the vehicle speed decreases, the forces serving to maintain the shift control valve 270 in its upshift position are reduced, and as the accelerator pedal is depressed so that the T-V pressure increases, there is an increase in the forces tending to cause movement of the shift control valve 270 to its downshift position. Under a suitable combination of vehicle speed and accelerator pedal position, the forces tending to cause movement of the valve elements 270 and 271 to their downshift positions exceed the opposing forces so the valve element 270 and the valve element 271 move to the left to their downshift positions, as shown in Figure 18 of the drawings.

On this movement of the valve element 271, its land b opens communication between groove 292 and chamber 290 at a face of piston or head c of the valve element. Hence, liquid under pressure supplied from chamber 258 of the T-V valve flows to chamber 290, and thence through passage 281 to the chamber 275 at the spring side of the head c of valve element 270. The liquid under pressure in the chambers 290 and 275 and acting on the head c of valve element 271, and on head c of valve element 270, increases the force acting to hold the valve element 270 in the downshift position. Accordingly, as soon as the valve element 270 moves to the downshift position, there is a substantial increase in the forces opposing movement of the valve element to the upshift position and the valve element is certain to remain in the downshift position until there is a substantial change in the relationship between the vehicle speed and the accelerator pedal position.

On movement of the valve element 270 to the downshift position, land a of the valve element cuts off communication between groove 376 and groove 362 leading to the sump, while land a of valve element 271 opens communication between groove 323 and groove 376 so that liquid supplied through the primary regulator valve 310 to passage 322 flows from groove 323 to groove 376 and thence through passage 348 to the torque converter to charge the chamber of the torque converter with liquid under pressure and condition the torque converter to transmit torque through the planetary gearing.

On movement of the valve element 270 to the downshift position, its land a opens communication between groove 361, to which is connected the passage 195 leading to chamber 59 of the lock-up clutch 13, and groove 362 which is connected to the sump, while land b of valve element 270 cuts off the supply of liquid under pressure to the chamber 50 of the lock-up clutch 13 by cutting off communication between groove 371, to which is connected the supply passage 370, and the groove 361. As a result, the supply of liquid to the lock-up clutch is cut off and the clutch chamber is connected to the sump so there is a rapid reduction in the pressure of the liquid in the clutch chamber, and in the connected chambers and passages. On this reduction in the pressure of the liquid in the chamber of the lock-up clutch, the clutch becomes progressively released. At this time, there is a reduction in the pressure of the liquid in the area between lands a and b of valve element 270, so there is a reduction in the force urging valve element 270 to the upshift position.

This control valve is arranged so that during automatic downshifting of the transmission, the low speed control device will be automatically engaged at the appropriate time to insure smooth operation of the vehicle.

On the reduction in the pressure of the liquid in the chamber 50 of the lock-up clutch 13, there is an accompanying reduction in the pressure of the liquid in the chamber 297 at a face of the head d of the shift relay valve element 295, and a corresponding reduction in the force tending to hold the valve element 295 in the upshift position against the opposing force of the spring 296. When the pressure of the liquid in chamber 50 of the lock-up clutch 13 reduces to a relatively low value somewhat higher than that effective to overcome the release spring 52, at which time the clutch 13 is lightly engaged, the force exerted by the liquid in chamber 297 is ineffective to hold the valve element 295 in its upshift position, and the spring 296 moves the valve 295 to the right to its downshift position. This movement of the valve element 295 takes place slowly because of the restricted rate of flow of liquid from chamber 297 through the orifice 294. After valve element 295 completes its movement to the downshift position, the various parts of the control valve 19 are again substantially in the positions shown in Figure 15.

On movement of valve element 295 to its downshift position, land c of the valve element opens communication between grooves 366 and 367, but this is without effect as the passage 370 is closed by land b of valve element 270. Furthermore, on movement of the valve element 295 to its downshift position, land a opens communication from the T-V pressure supply groove 304 to chamber 303, and the pressure of the liquid in chamber 303 builds up to oppose return of valve element 295 to the upshift position. In addition, on movement of valve element 295 to its downshift position, its land a blocks communication between groove 373 to which is connected passage 185 leading to the low speed control device, and groove 392 which is connected to the sump. At the same time land b opens communication between groove 373 and groove 374 to which is connected the passage 375. Hence, liquid flows from the supply passage 265 through the area between lands a and b of valve element 211, through passage 375, through the area between lands a and b of valve element 295, and thence through passage 185 to chambers 163 and 164 of the low speed control device. On the increase in the pressure of the liquid in the chambers 163 and 164, the low speed control device is engaged, and holds the sun gear unit 114 to cause torque to be transmitted through the carrier 130 to the output shaft 12.

As previously explained, during an automatic downshift of the transmission, the lock-up clutch 13 is released to a large extent before engagement of the low range control device 115 is initiated. During the gradual release of the lock-up clutch 13, the load on the vehicle engine is reduced and the engine begins to run more rapidly, the lock-up clutch slipping at this time, with the result that the engine speed approaches the speed required to synchronize with the output shaft when the engine is coupled to the output shaft through the low speed gearing. Engagement of the low speed control device is gradual because of the stepped shape of the operating piston of the control device, and because of the self-energizing characteristics of the low speed gear mechanism which causes engagement of the control device to increase as the torque transmitted through the low speed gearing increases. Furthermore, application of torque to the output shaft 12 through the low speed gearing is cushioned by the torque converter through which the torque is transmitted from the engine to the gearing.

Accordingly, upon engagement of the low speed control device, there is no sudden reduction in the speed of the vehicle, as would occur if the engine speed had not been increased prior to engagement of the low speed control device. As the engine speed is increased prior to engagement of the low speed control device, the engine is effective to drive the vehicle on engagement of the low speed control device so the vehicle speed may increase at this time.

As engagement of the low speed control device is initiated before the lock-up clutch is fully released, there is no period in which the load on the engine is completely interrupted. Hence, there is no danger that the engine speed will increase to an excessive degree so as to cause objectionable racing of the engine prior to engagement of the low speed control device or a sudden increase in vehicle speed on engagement of the low speed control device.

After the automatic downshift to low speed, the transmission operates in the normal manner in this speed range until conditions change to cause a return to direct drive, or until the transmission is manually shifted into neutral. If the vehicle speed increases sufficiently, or the accelerator is released enough, or a combination of these conditions occurs, the transmission will automatically upshift to direct drive in the manner described in detail above.

*Full throttle downshift*

As previously stated, the control valve is arranged to cause the transmission to shift from direct drive to low speed when the accelerator is fully depressed so as to move valve element 212 against the annular piston 251.

For purposes of illustration, it will be assumed that the various elements of the control valve are in the positions shown in Figure 17 so that the control valve conditions the transmission to operate in direct drive, that the vehicle is moving at a substantial speed, and that the driver of the vehicle wishes to accelerate the vehicle rapidly, and, therefore, fully depresses the accelerator pedal.

When the control valve conditions the tarnsmission for direct drive, the shift control valve element 270, the shift modulator valve element 271, and the shift relay valve element 295 are in their upshift positions, as shown in Figure 17 of the drawings.

As it is assumed that the transmission is conditioned for operation in direct drive, liquid under pressure is present in the chamber 50 of the lock-up clutch 13, and is supplied from groove 361 through a branch of passage 195 to chamber 249 at a face of the annular piston 251.

As the vehicle is moving at a substantial speed, liquid under pressure is present in chamber 287 at a face of the head c of the shift modulator valve element 271, and in chamber 273 at a face of the head c of the valve element 270, and exerts force to hold valve elements 270 and 271 in their upshift positions. In addition, prior to movement of the accelerator to the fully depressed position, liquid supplied through the T-V valve acts on a portion of the land b of valve element 271 and urges this valve element towards the downshift position. At this time, the chamber 290 at a face of head c of valve element 271, and the chamber 275 at a face of the head c of valve element 270 are connected to the sump through passage 281 and orifice 391.

When the accelerator is depressed a sufficient amount the head 253 on valve element 212 engages the washer 252 so that on further movement of the accelerator toward the throttle open position, the piston 251 is moved against the pressure of the liquid in chamber 249. On this further movement of valve element 212, its land b cuts off communication between groove 283 and groove 390 leading to the exhaust, while land a of valve element 212 opens communication between groove 283 and groove 381 which is connected by passage 382 to the groove surrounding T-V chamber 258. At this time the spring 260 is compressed substantially the maximum amount so the presure of the liquid in chamber 258 is at the maximum value. This liquid flows from chamber 258 through passage 382, thence through the area between lands a and b of valve element 212 to groove 283 and passage 281 and to chambers 275 and 290. This increases the pressure in chambers 275 and 290 so that the force exerted on the head c of valve elements 270 and 271 may be great enough to overcome the opposing force of governor pressure in the chambers 273 and 287 with the result that the valve elements 270 and 271 move to the left to their downshift positions, and the various parts of the control valve 19 are substantially in the positions in which they are shown in Figure 19 of the drawings.

Movement of the valve element 212 to the left is limited by engagement of the member 233 with the end plate 254, thereby limiting the extent of the increase in the pressure of the liquid supplied to chamber 258 and therefrom to chambers 275 and 290. The various parts of the equipment are arranged and proportioned so that when the valve 212 is moved to the left the maximum amount, the pressure of the liquid supplied to chambers 275 and 290 is high enough to cause movement of the valve elements 270 and 271 to their downshift positions when and only when the vehicle speed is below a selected intermediate value, such as 55 miles an hour. This arrangement enables the operator to secure increased performance by shifting to low range, but prevents a shift to low range when the vehicle speed is so high that a shift to low range would not give improved performance.

On this movement of valve element 270 to its downshift position, the equipment operates as explained in detail above in connection with an automatic downshift of the transmission to release the direct drive or lock-up clutch 13 and to engage the low speed control device 115 so that the vehicle is driven through the torque converter in series with the planetary gearing controlled by the low speed control device.

On subsequent release of the accelerator pedal, the valve element 212 is moved to the right by force exerted by the spring 260. On this movement of valve element 212, its land a cuts off the supply of T-V pressure through passage 382 and thence to chambers 275 and 290, and land b opens groove 390 so that chambers 275 and 290 are connected to the sump through orifice 391. As valve element 271 is in its downshift position, liquid from the T-V valve flows from groove 292 to chamber 290, and thence through passage 281 to chamber 275 so that chambers 290 and 275 are filled with liquid at the pressure supplied by the T-V valve. However, because of release of the accelerator pedal the pressure of the liquid supplied by the T-V valve is substantially reduced.

After release of the accelerator, the transmission will continue in low speed, or automatically upshift to direct drive, according as the vehicle speed and accelerator pedal position indicate one or the other to be proper.

*Manually controlled downshift*

This transmission and the associated control valve are arranged so that when the vehicle is being operated with the transmission in direct drive, the operator may manually shift the transmission to low range at any time by moving the shift lever from its drive position to its low range position. On this movement of the shift lever the manually controlled valve element 211 is moved from its drive position D to its low range position L.

For purposes of illustration it will be assumed that the various elements of the control valve 19 are in the positions in which they are shown in Figure 17 of the drawings so that the control valve conditions the transmission to operate in direct drive, and that the valve element 211 is manually moved from its position D to its position L so that the elements of the control valve 19 are in the positions shown in Figure 20 of the drawings. When the transmission is conditioned for direct drive, the shaft control valve element 270, shift modulator valve element 271, and shift relay valve element 295 are in their upshift positions so that liquid under pressure is supplied to the direct drive clutch 13, while the passage 185 leading to the low speed control device 115 is connected to the sump.

On movement of the valve element 211 to its low speed position, land $a$ of the valve element cuts off communication between supply passage 265 and passage 363 leading to the direct drive clutch 13, and opens communication between passage 363 and the sump so that liquid under pressure is released from the direct drive clutch 13 and the pressure of the liquid in the clutch operating chamber 50 reduces.

In addition, on movement of the valve element 211 to its position L, communication is maintained between supply passage 265, and passage 375 leading to the shift relay valve element 295, while land $b$ of valve element 211 cuts off communication between passage 285 and the sump and causes supply passage 265 and the passage 285 to be connected together through the area between lands $a$ and $b$ of valve element 211. Hence, liquid under pressure flows from passage 265 to passage 285 and thence to chamber 277 between the shift blocker valve element 272 and the cover plate 254 and increases the pressure of the liquid in this chamber. On this increase in the pressure of the liquid in chamber 277, the valve element 272 moves to the left as viewed in Figure 19 of the drawings, thereby compressing the spring 276 until the valve element 272 engages the projection 284 on valve element 270. On further movement of the valve element 272, the shift control valve element 270 and the shift modulator valve 271 are moved to the left to their downshift positions.

When the valve element 270 reaches its downshift position, land $a$ opens communication from lock-up clutch control passage 195 to the sump, while at this time land $b$ of valve element 270 cuts off communication between passages 195 and 370 and thus cuts off release of liquid from the clutch 13 through the manual control valve 211. When valve element 270 is in its downshift position, the connection between torque converter control passage 348 and the sump is cut off, and connection is restored between passage 322 and the passage 348 leading to the torque converter so that the torque converter is supplied with liquid under pressure.

When the pressure of the liquid in the chamber 50 of clutch 13 reduces to a selected relatively low value, the force exerted by the liquid under pressure in the chamber 297 at a face of the head $d$ of shift relay valve element 295 is ineffective to hold the valve element 295 against the opposing force of the spring 296, and the spring 296 moves the valve element 295 to the downshift position to permit liquid supplied from passage 265 to passage 375 to flow from passage 375 to passage 185 leading to the low speed control device. Accordingly, the low speed control device 115 becomes engaged and causes the engine to be connected to the output shaft through the torque converter and the gearing controlled by the low speed control device.

When the manually operated valve element 211 is in the low range position, the passage 186 leading to the reverse control device 116 is connected to the sump so that the reverse control device is certain to remain released.

On engagement of the low range control device, the engine and the output shaft 12 are connected together through the torque converter in series with the gearing controlled by the low range control device. If the vehicle speed exceeds the engine speed, the engine will retard the vehicle. In addition, as previously explained, under these conditions the retarding effect on the vehicle is increased by the resistance to movement of the planetary gears offered by lubricant trapped within the drum 81.

A branch of the passage 285 leading to chamber 277 at a face of the shift blocker valve element 277 is connected to groove 324 and thus to the chamber 325 surrounding the shoulder radially outwardly of the projection 312 on the primary regulator valve element 310. Accordingly, there is an increase in the force opposing movement of the valve element 310 by liquid in the chamber 317 and a higher pressure is maintained on the liquid in this chamber and in the supply passage 265. Hence, relatively great force is available to insure engagement of the low range control device, while the increased force required to operate the pump 16 increases the retarding force on the vehicle.

A down shift effected by movement of the manual control valve element 211 to the low range position L may occur at relatively high vehicle speeds and may be instituted to retard the vehicle. Accordingly, at such times, considerable torque may be transmitted through the transmission to drive the engine. During transmission of torque through the transmission to drive the engine, the sun gear unit exerts force on the cone 162 tending to draw the cone away from its seat. The relatively high pressure maintained on the liquid for causing engagement of the cone insures that the cone will remain engaged. Although the high pressure maintained on the liquid for effecting engagement of the low range control device may cause initial engagement of the control device to be harsh, this is not objectionable since the manually initiated downshift is anticipated by the driver.

On the other hand, when the control valve element 211 is in the drive position D, and an automatic shift to low range takes place, a relatively low pressure is maintained on the liquid employed to engage the low range control device and engagement of the low range control device is smooth and soft. Under these conditions, engagement of the low range control device may be assisted by axial force exerted by the sun gear unit, but in any event engagement of the low range control device will not be materially reduced by axial force exerted by the sun gear unit so the liquid at relatively low pressure is adequate to insure engagement of the low range control device.

The transmission will operate in low range until the manual control valve element 211 is moved to a different position. If the manual control valve element 211 is returned to the drive position D, the passage 363 will be disconnected from the sump and will be connected to supply passage 265, while passage 285 will be disconnected from supply passage 265 and will be connected to the sump. As a result of the reduction in the pressure of the liquid in the chamber 277, the spring 276 expands and returns shift blocker valve element 272 to its normal position in engagement with the cover plate 254, while there is a reduction in the force tending to hold shift valve element 270 and shift modulator valve element 271 in their downshift positions. If the vehicle speed and accelerator pedal position relationship are such that an upshift in the transmission is proper the valve elements 270 and 271 will move to their upshift positions and the transmission will shift from low speed to direct drive in the manner explained in detail above. If the vehicle speed and accelerator pedal position relationship are not such as to cause an upshift, the transmission will remain in low speed after movement of valve element 211 to the drive position.

*Shift of transmission to neutral*

The transmission may be shifted to neutral at any time, either from operation in the drive range or in the low speed range. When the valve element 211 is moved to the neutral position N, land *b* blocks the supply passage 265, while passages 363 and 375 are open to the sump through groove 365. If at the time the valve element 211 was moved to the neutral position, the transmission was being operated in direct drive, the liquid in chamber 50 of clutch 13 will exhaust through port 365 until the vehicle speed reduces to the point at which the shift control valve element 270 is moved to its downshift position, after which the liquid in the direct drive clutch 13 is released through groove 362. On release of liquid from the direct drive clutch 13, the shift relay valve element 295 is returned to its downshift position but does not cause liquid under pressure to be supplied to the low range control device since passage 375 is connected to the sump. Hence, the low range control device remains released.

If at the time the manual control valve element 211 is moved to the neutral position N, the transmission is being operated in low range, liquid will be released from the chambers of the low speed control device 115 through passage 185, area between lands *a* and *b* of shift relay valve element 295, passage 375, and groove 365. As a result of release of liquid from the low speed control device, the control device becomes released so the transmission is in neutral.

It is to be observed that on movement of the valve element 211 to the neutral position N, the supply of liquid under pressure to the passages leading to the low range control device and direct drive clutch is cut off and both of these passages are connected to exhaust so that both devices are certain to be released.

*Reverse*

The transmission may be shifted into reverse at any time by moving the shift lever to the R position, thereby moving the manually controlled valve element 211 to its position R. When the valve element 211 is in its position R, the control passages 363 and 375 associated with the direct drive clutch and low speed control device are connected to the sump through the groove 365.

In addition, when the valve element 211 is in its position R, the supply passage 265 is connected to passage 186 leading to the reverse control device 116, and is also connected to passage 285 leading to chamber 277 at a face of the shift blocker valve element 272. The liquid supplied to chamber 277 increases the pressure therein so the shift blocker valve element 272 moves to the left against the spring 276 and holds the valve element 270 in the downshift position, or moves the valve element 270 to the downshift position if it is not already in that position. When the valve element 270 is in the downshift position, the control passage 195 leading to the direct drive clutch 13 is connected to the sump through groove 362 so that the clutch 13 is certain to be released. At this time the various parts of the control valve 19 are in the positions in which they are shown in Figure 21 of the drawings.

When the vehicle is operated in reverse, the output shaft driven pump 17 is ineffective to supply liquid under pressure to the passage 274 and to the connected passages and chambers, while the ball check valve 337 prevents supply to these passages and chambers from the supply line 265. Hence, the chambers 273 and 287 at the faces of the heads *c* of the valve elements 270 and 271 are at atmospheric pressure and little force is exerted to move the valve elements 270 and 271 away from the downshift position, and the valve element is certain to be held in the downshift position by the shift blocker valve element 272.

As heretofore explained, when the valve element 270 is in the downshift position, liquid under pressure is supplied to the torque converter so the torque converter is effective to transmit torque.

As a result of the supply of liquid under pressure to passage 186 leading to the reverse control device 116, the reverse control device becomes engaged and conditions the transmission to cause the output shaft 12 to be driven in the reverse direction.

A branch of the shift blocker chamber passage 285 is connected to chamber 325 so that on engagement of the reverse control device 116 there is an increase in the pressure of the liquid in the chamber 325 surrounding the shoulder radially outwardly of the projection 312 of the primary regulator valve element 310. On this increase in the pressure of the liquid in chamber 325 there is an increase in the force tending to move the valve element 310 to the left against the liquid under pressure in chamber 317 so the pressure in chamber 317 must increase to a relatively high value before liquid is released through groove 320. Hence, as long as the transmission is conditioned to operate in reverse, the valve element 310 maintains a relatively high pressure in chamber 317 and in the connected passage 265 with the result that a relatively high pressure is built up in chamber 172 of reverse control device 116. The operating characteristics of the reverse control device and reverse planetary gear mechanism are such that a high pressure is required in the operating chamber of the reverse control device, so the system operates to provide liquid at high pressure when the transmission is in reverse. Although increased power is required to drive the pump 16 when a high pressure is maintained in the chamber 317 and in the connected passages, the periods during which the transmission is in reverse are so brief that the power consumed by the pump is inconsequential.

As previously pointed out, the low speed and reverse control devices are constructed in such manner that the low speed control device is certain to be released before the reverse control device can be engaged, and so that the reverse control device is certain to be released before the low speed control device can be engaged. This prevents simultaneous engagement of these control devices in the event the control valve 211 is rapidly moved between its low speed and reverse positions, as may occur when it is desired to move the car in deep snow or mud.

On subsequent movement of the valve element 211 away from the reverse position to the neutral position, the reverse control device control passage 186 is connected to the sump and the control device becomes released, while the pressure in chamber 325 reduces so that valve element 310 maintains a lower pressure in chamber 317. In addition, the chamber 277 is connected to the sump so the shift blocker valve element 272 is moved into engagement with the cover plate 254 by the spring 276.

*Push start*

This transmission and associated control valve are arranged so that the vehicle engine can be readily started by pushing or towing the vehicle.

For purposes of illustration it will be assumed that the vehicle engine is not operating, that the vehicle is towed or pushed for the purpose of starting the engine, and that the manual control valve element 211 is held in the neutral position until a substantial vehicle speed is developed, after which the valve element is moved to the drive position D. As the engine is not operating, the engine driven pump 16 is idle and does not supply liquid under pressure to passage 318 and chamber 317. Accordingly, the valve element 332 is moved by the spring 336 towards the pin 313 to the position in which land *a* prevents flow of liquid between grooves 340 and chamber 317, and in which land *b* prevents flow of liquid from groove 334 to groove 341, while land *b* opens communication from the branch of passage 318 to the chamber on the spring side of valve element 332 and thus to the sump. As the valve element 211 is in the neutral position, land b blocks the supply passage 265.

When the vehicle is towed or pushed, the pump 17 operates and supplies liquid through passage 274 to chamber 333 and also through passage 274 to chambers 287 and 273 at the faces of the heads c of valve elements 271 and 270. In addition, liquid flows from chamber 333 to groove 340, but cannot flow from groove 340 to chamber 317 as groove 340 is blocked by land a of valve element 332. Hence, chamber 317 remains at atmospheric pressure and liquid in this chamber does not exert force to move the valve element 332 against the spring 336 and the valve element 332 is responsive only to liquid under pressure in chamber 333.

On the supply of liquid to passage 265, liquid flows to the T—V valve and may be supplied at reduced pressure from chamber 258 of the T—V to the various connecting chambers.

On the supply of liquid from pump 17 to the chamber 333, there is an increase in the pressure in this chamber, and in the connected passages and chambers. On an increase in the pressure of the liquid in chamber 333, force is exerted on the area of land b radially outwardly of land a of valve element 332 and tends to move the valve element 332 against the spring 336. The area of valve element 332 on which the liquid in chamber 333 is effective is relatively small so a relatively high pressure, such as 80 pounds per square inch, must be developed in chamber 333 before the valve element 332 is moved against the spring 336 far enough to permit liquid to flow from chamber 333 to groove 341 and thence to the sump through passages 342 and 350. The release of liquid through the groove 341 limits the extent of the increase in the pressure of the liquid in chamber 333 and prevents movement of the valve element 332 against the spring 336 far enough to cause land a to open communication between groove 340 and chamber 317. Under these conditions, valve element 332 serves as a pressure regulator valve and maintains the pressure in the system at a relatively high value.

The liquid at relatively high pressure in chambers 287 and 273 at the faces of the heads c of valve elements 271 and 270 exerts enough force on these valve elements to insure that they move to their upshift positions to cut off communication from the direct drive clutch control passage 195 to the sump, and to connect passage 195 to the passage 370 so that liquid under pressure may be supplied to the direct drive clutch on subsequent movement of the valve element 211 to its drive position.

As long as the valve element 211 remains in the neutral position, and the vehicle is in motion with the engine idle, the equipment remains in the condition described. If the valve element 211 is now moved to the drive position D, in which communication is established between supply passage 265 and passage 363, liquid under pressure supplied from pump 17 will flow from passage 363 to passage 370 and thence to passage 195 and to the chamber 50 of the clutch 13 and increases the pressure of the liquid in this chamber.

On initial movement of the valve element 211 to the drive position D, liquid under pressure also flows from supply passage 265 to passage 375, and thence through the area between lands a and b of valve element 295 to low speed control passage 185 so that the low speed control device starts to engage. However, at this time the torque converter is connected to the sump and has limited torque transmitting capacity. Furthermore, as soon as the pressure of the liquid in the chamber of the direct drive clutch 13 increases to a relatively low value, the liquid in chamber 297 moves the shift relay valve element 295 to its upshift position to cut off the supply of liquid under pressure to passage 185 and to connect the passage 185 to the sump so that the low speed control device is released. Hence, the low speed control device only becomes partially engaged and has limited effectiveness as the torque converter is connected to the sump, and as the elements of the torque converter are stationary, or nearly so. Accordingly, the temporary concurrent partial engagement of the low speed control device and direct drive clutch is not objectionable.

The pressure of the liquid in the chamber 50 of the clutch 13 builds up to the full value of the liquid in chamber 333, and as this liquid is at a relatively high value, the clutch 13 becomes firmly engaged and is capable of transmitting from the output shaft 12 to the vehicle engine sufficient torque to turn the engine under the most adverse conditions, as for example, when the engine is cold and the oil has abnormally high viscosity.

When the vehicle engine starts to turn, the pump 16 operates and supplies liquid through passage 318 to the chamber 317. During the building up of pressure in the chamber 50 of the direct drive clutch 13, the degree of engagement of the clutch gradually increases and a stage is reached where the torque transmitted to the engine may be barely capable of turning the engine. Under these conditions, in which the direct drive clutch is partially engaged, but is increasing in engagement, the engine may turn irregularly and the pump 16 will operate irregularly. On a further increase in the pressure of the liquid in the chamber 50 of the clutch 13, the degree of engagement of the clutch will increase so that the clutch will transmit torque sufficient to turn the vehicle engine continuously.

During the period in which the engine is starting to turn, and may be turning irregularly, the pump 16 operates slowly and may be operating irregularly. If all of the liquid supplied by pump 16 at this time were supplied to chamber 317, the pressure of the liquid in chamber 317 might increase enough to move valve element 332 against the spring 336 far enough to open communication between chamber 317 and groove 340 to which supply passage 265 is connected. If the valve element 332 is moved this amount, the pressure in passage 265, and therefore in the chamber of the clutch 13, will not be maintained at the high value established by operation of valve element 332, but will be permitted to reduce to the substantially lower value established by the primary regulator valve element 310. If the pressure in the supply passage 265 reduces in this manner, the pressure in the direct drive clutch may reduce enough to reduce engagement of the clutch below the degree necessary to insure continued rotation of the engine under adverse conditions.

The passage 379 governed by choke 380 permits liquid supplied by the pump 16 to chamber 317 to escape to the sump without increasing the pressure of the liquid in the chamber 317. The choke 380 is of such size as to permit flow therethrough of substantially the entire output of pump 16 at extremely low engine speeds so that operation of the pump 16 when the vehicle engine starts to turn will not cause a substantial increase in the pressure of the liquid in the chamber 317. Hence, the valve element 332 continues to regulate the pressure of the liquid in the supply passage 265, and the liquid supplied to the clutch 13 will be at a pressure high enough to cause effective engagement of the clutch and thereby insure that the vehicle engine will be turned at a substantial rate.

When the engine speed increases to a substantial rate, either because the engine is being operated by its own power, or because the engine is being driven by the vehicle, the pump 16 operates and supplies liquid in volume exceeding the flow capacity of the choke 380 so that the pressure of the liquid in chamber 317 increases to such an extent that valve element 332 is moved against the spring 336 far enough to open communication between chamber 317 and groove 340, while land b constantly opens groove 341. Furthermore, on this movement of the valve element 332, land b blocks the passage 379 governed by choke 380 so that liquid is no longer released from chamber 317 through passage 379.

Under these conditions, liquid supplied by output shaft driven pump 17 is discharged through the governor valve 345 and there is a reduction in the pressure of the liquid in chambers 287 and 273 at the faces of the heads c of the valve elements 271 and 270, and also in chamber 325 at a face of primary regulator valve element 310. However, if the vehicle is pushed or towed at a substantial speed, the pressure of the liquid in the chambers 273 and 287 continues to maintain the valve elements 270 and 271 in their upshift position to maintain the supply of liquid to the direct drive clutch 13. Furthermore, if the vehicle is being operated at a substantial speed the pump 16 supplies enough liquid to cause the pressure of the liquid in chamber 317 and in passages 265, as well as in the chamber 50 of the clutch 13, to be maintained at the full value which the primary regulator valve element 310 operates to establish. Although this pressure is somewhat lower than the pressure previously maintained by the valve element 332, it is sufficient to cause the direct drive clutch 13 to be engaged to a degree effective to continue to drive the engine at all vehicle speeds above a relatively low speed, such as 8 miles per hour.

On movement of the shift lever to the parking position, the parking lock is engaged as heretofore explained, and prevents rotation of the transmission output shaft. On this movement of the shift lever, the control valve element 211 is moved to its position P in which land b no longer blocks groove 356, while passage 265 is now open to the sump through passage 250. Hence, the pressure in chamber 317 reduces to the value necessary to operate valve element 332, assuming that the vehicle engine is running so that pump 16 is operating. At this time, the passages 363 and 375 leading to the direct drive clutch and low range control device are connected to the sump through groove 365, while passage 186 leading to the reverse control device is open to the sump through the end of the bore in which valve element 211 is mounted.

Although I have herein illustrated and described one form of improved automatic transmission embodying my invention, it should be understood that the invention is not limited to these details of construction and that numerous changes and modifications may be made without departing from the spirit and scope of the appended claims.

The embodiments of the invention in which an exclusive property or privilege is claimed are defined as follows:

1. In a vehicle transmission, an input member adapted to be driven by the vehicle engine, an output shaft adapted to drive the vehicle wheels, gearing controlled by a first friction control device for transmitting power between said input member and said output shaft, said first friction control device being effective on an increase in the pressure of the fluid in a first operating chamber to establish between said input member and said output shaft a first driving connection through said gearing effective to drive the output shaft at substantially less rapid rate than said input member, a second friction control device connected between said input member and said output shaft, said second friction control device being effective on an increase in the pressure of the fluid in a second operating chamber to establish between said input member and said output shaft a second driving connection effective to drive the output shaft at a rate substantially more rapid than that at which said output shaft is driven through said first driving connection, a shift valve biased to a first position and movable therefrom to a second position, means responsive to the pressure of the fluid in a first control chamber and urging said shift valve to said first position, means responsive to the pressure of the fluid in a second control chamber and urging said shift valve to said second position, means for supplying to said first control chamber fluid at a pressure which varies in accordance with the torque demand on the vehicle engine, means for supplying to said second control chamber fluid at a pressure which varies in accordance with the speed of said output shaft, a shift relay valve biased to a first position and movable therefrom to a second position, means responsive to the pressure of the fluid in a third control chamber and urging said shift relay valve to said second position, means for supplying fluid from said second operating chamber to said third control chamber, manually controlled means for supplying fluid under pressure to a first supply passage, means effective according as said shift relay valve is in said first or said second position for connecting said first operating chamber to said first supply passage or to an exhaust passage, and means effective according as said shift valve is in said first or said second position for connecting said second operating chamber to an exhaust passage or to a supply passage through which fluid under pressure may be supplied to said second operating chamber.

2. In a vehicle transmission, an input member adapted to be driven by the vehicle engine, an output shaft adapted to drive the vehicle wheels, gearing controlled by a first friction control device for transmitting power between said input member and said output shaft, said first friction control device effective on an increase in the pressure of the fluid in a first operating chamber to establish between said input member and said output shaft a first driving connection through said gearing effective to drive the output shaft at substantially less rapid rate than said input member, a second friction control device connected between said input member and said output shaft, said second friction control device being effective on an increase in the pressure of the fluid in a second operating chamber to establish between said input member and said output shaft a second driving connection effective to drive the output shaft at a rate substantially more rapid than that at which said output shaft is driven through said first driving connection, a shift valve biased to a first position and movable therefrom to a second position, means responsive to the pressure of the fluid in a first control chamber and urging said shift valve to said first position, means responsive to the pressure of the fluid in a second control chamber and urging said shift valve to said second position, means for supplying to said first control chamber fluid at a pressure which varies in accordance with the torque demand on the vehicle engine, means for supplying to said second control chamber fluid at a pressure which varies in accordance with the speed of said output shaft, a shift relay valve biased to a first position and movable therefrom to a second position, means responsive to the pressure of the fluid in a third control chamber and urging said shift relay valve to said second position, means for supplying fluid from said second operating chamber to said third control chamber, a manually controlled valve having a neutral position and a drive position, means effective when said shift relay valve is in said first position and said manually controlled valve is in said drive position to supply fluid under pressure to said first operating chamber, means effective when said shift relay valve is in said second position to connect said first operating chamber to an exhaust passage, and means effective according as said shift valve is in said first or or said second position for connecting said second operating chamber to an exhaust passage or to a supply passage through which fluid under pressure may be supplied to said second operating chamber.

3. In a vehicle transmission, an input member adapted to be driven by the vehicle engine, an output shaft adapted to drive the vehicle wheels, gearing controlled by a first friction control device for transmitting power between said input member and said output shaft, said first friction control device effective on an increase in the pressure of the fluid in a first operating chamber to establish between said input member and said output shaft a first driving connection effective to drive the output shaft through said gearing at substantially less rapid rate than said input member, a second friction control device connected between said input member and said output shaft, said second friction control device being effective on an increase in the pressure of the fluid in a second operating chamber to establish between said input member and said output shaft a second driving connection effective to drive the output shaft at a rate substantially more rapid than that at which said output shaft is driven through said first driving connection, a shift valve biased to a first position and movable therefrom to a second position, means responsive to the pressure of the fluid in a first control chamber and urging said shift valve to said first position, means responsive to the pressure of the fluid in a second control chamber and urging said shift valve to said second position, means for supplying to said first control chamber fluid at a pressure which varies in accordance with the torque demand on the vehicle engine, means for supplying to said second control chamber fluid at a pressure which varies in accordance with the speed of said output shaft, a shift relay valve biased to a first position and movable therefrom to a second position, means responsive to the pressure of the fluid in a third control chamber and urging said shift relay valve to said second position, means for supplying fluid from said second operating chamber to said third control chamber, a manually controlled valve having a neutral position and movable therefrom to a first or a second drive position, means effective when said shift relay valve is in said first position and said manually controlled valve is in either of said drive positions to supply fluid under pressure to said first operating chamber, means effective when said shift valve is in said first position to connect said second operating chamber to an exhaust passage, and means effective only when said shift valve is in said second position and said manually controlled valve is in a selected one of said drive positions to supply fluid under pressure to said second operating chamber.

4. In a vehicle transmission, an input member adapted to be driven by the vehicle engine, an output shaft adapted to drive the vehicle wheels, gearing controlled by a first friction control device for transmitting power between said input member and said output shaft, said first friction control device effective on an increase in the pressure of the fluid in a first operating chamber to establish between said input member and said output shaft a first driving connection through said gearing effective to drive the output shaft at substantially less rapid rate than said input member, a second friction control device connected between said input member and said output shaft, said second friction control device being effective on an increase in the pressure of the fluid in a second operating chamber to establish between said input member and said output shaft a second driving connection effective to drive the output shaft at a rate substantially more rapid than that at which said output shaft is driven through said first driving connection, a shift valve biased to a first position and movable therefrom to a second position, means responsive to the pressure of the fluid in a first control chamber and urging said shift valve to said first position, means responsive to the pressure of the fluid in a second control chamber and urging said shift valve to said second position, means for supplying to said first control chamber fluid at a pressure which varies in accordance with the torque demand on the vehicle engine, means for supplying to said second control chamber fluid at a pressure which varies in accordance with the speed of said output shaft, a shift relay valve biased to a first position and movable therefrom to a second position, means responsive to the pressure of the fluid in a third control chamber and urging said shift relay valve to said second position, means for supplying fluid from said second operating chamber to said third control chamber, a manually controlled valve having a neutral position and movable therefrom to a first or a second drive position, means effective when said shift relay valve is in said first position and said manually controlled valve is in either of said drive positions to supply fluid under pressure to said first operating chamber, means effective when said shift valve is in said first position to connect said second operating chamber to an exhaust passage, means effective only when said shift valve is in said second position and said manually controlled valve is in a selected one of said drive positions to establish a supply passage through which fluid under pressure is supplied to said second operating chamber, and means effective according as said shift relay valve is in said first or said second position for causing fluid to be supplied through said supply passage at a fast rate or at a slow rate.

5. In a vehicle transmission, an input member adapted to be driven by the vehicle engine, an output shaft adapted to drive the vehicle wheels, gearing controlled by a first friction control device for transmitting power between said input member and said output shaft, said first friction control device effective on an increase in the pressure of the fluid in a first operating chamber to establish between said input member and said output shaft a first driving connection through said gearing effective to drive the output shaft at substantially less rapid rate than said input member, a second friction control device connected between said input member and said output shaft, said second friction control device being effective on an increase in the pressure of the fluid in a second operating chamber to establish between said input member and said output shaft a second driving connection effective to drive the output shaft at a rate substantially more rapid than that at which said output shaft is driven through said first driving connection, a shift valve biased to a first position and movable therefrom to a second position, means responsive to the pressure of the fluid in a first control chamber and urging said shift valve to said first position, means responsive to the pressure of the fluid in a second control chamber and urging said shift valve to said second position, means for supplying to said first control chamber fluid at a pressure which varies in accordance with the torque demand on the vehicle engine, means for supplying to said second control chamber fluid at a pressure which varies in accordance with the speed of said output shaft, a shift relay valve biased to a first position and movable therefrom to a second position, means responsive to the pressure of the fluid in a third control chamber and urging said shift relay valve to said second position, means for supplying fluid from said second operating chamber to said third control chamber, a manually controlled valve having a neutral position and a drive position, means effective when said shift relay valve is in said first position and said manually controlled valve is in said drive position to supply fluid under pressure to said first operating chamber, means effective when said shift relay valve is in said second position to connect said first operating chamber to an exhaust passage, means effective according as said shift valve is in said first or said second position to connect said second operating chamber to an exhaust passage or to a supply passage through which fluid under pressure may be suuplied to said second operating chamber, and means effective according as said shift relay valve is in said first or said second position for causing fluid to be supplied to said second operating chamber through said supply passage at a fast rate or at a slow rate.

6. In a vehicle transmission, an input member adapted to be driven by the vehicle engine, an output shaft adapted to drive the vehicle wheels, gearing controlled by a first friction control device for transmitting power between said input member and said output shaft, said first friction control device effective on an increase in the pressure of the fluid in a first operating chamber to establish between said input member and said output shaft a first driving connection through said gearing effective to drive the output shaft at substantially less rapid rate than said input member, a second friction control device connected between said input member and said output shaft, said second friction control device being effective on an increase in the pressure of the fluid in a second operating chamber to establish between said input member and said output shaft a second driving connection effective to drive the output shaft at a rate substantially more rapid than that at which said output shaft is driven through said first driving connection, a shift valve biased to a first position and movable therefrom to a second position, means responsive to the pressure of the fluid in a first control chamber and urging said shift valve to said first position, means responsive to the pressure of the fluid in a second control chamber and urging said shift valve to said second position, a source of control fluid at a pressure which varies in accordance with the torque demand on the vehicle engine, means for supplying fluid from said source of control fluid to said first control chamber, means for supplying to said second control chamber fluid at a pressure which varies in accordance with the speed of said output shaft, a shift relay valve movable between a first and a second position, said shift relay valve being urged to said first position by biasing means and by fluid in a third control chamber and being urged to said second position by fluid in a fourth control chamber, means effective according as said shift relay valve is in the first or its second position to cause the fluid in said third control chamber to be substantially at the pressure of said source of control fluid or at atmospheric pressure, means for supplying fluid from said second operating chamber to said fourth control chamber, means effective according as said shift relay valve is in said first or said second position to connect said first operating chamber to a passage through which fluid under pressure may be supplied to said chamber or to an exhaust passage, and means effective according as said shift valve is in said first or said second position to connect said second operating chamber to an exhaust passage or to a passage through which fluid under pressure may be supplied to said chamber.

7. In a vehicle transmission, an input member adapted to be driven by the vehicle engine, an output shaft adapted to drive the vehicle wheels, gearing controlled by a first friction control device for transmitting power between said input member and said output shaft, said first friction control device effective on an increase in the pressure of the fluid in a first operating chamber to establish between said input member and said output shaft a first driving connection through said gearing effective to drive the output shaft at substantially less rapid rate than said input member, a second friction control device connected between said input member and said output shaft, said second friction control device being effective on an increase in the pressure of the fluid in a second operating chamber to establish between said input member and said output shaft a second driving connection effective to drive the output shaft at a rate substantially more rapid than that at which said output shaft is driven through said first driving connection, a shift valve biased to a first position and movable therefrom to a second position, means responsive to the pressure of the fluid in a first control chamber and urging said shift valve to said first position, means responsive to the pressure of the fluid in a second control chamber and urging said shift valve to said second position, a source of control fluid at a pressure which varies in accordance with the torque demand on the vehicle engine, means for supplying fluid from said source of control fluid to said first control chamber, means for supplying to said second control chamber fluid at a pressure which varies in accordance with the speed of said output shaft, a shift relay valve movable between a first and a second position, said shift relay valve being urged to said first position by biasing means and by fluid in a third control chamber and being urged to said second position by fluid in a fourth control chamber, means effective according as said shift relay valve is in the first or its second position to cause the fluid in said third control chamber to be substantially at the pressure of said source of control fluid or at atmospheric pressure, means for supplying fluid from said second operating chamber to said fourth control chamber, means effective according as said shift relay valve is in said first or said second position to connect said first operating chamber to a passage through which fluid under pressure may be supplied to said chamber or an exhaust passage, means effective when said shift valve is in said first position to connect said second operating chamber to an exhaust passage, means effective when said shift valve is in said second position to connect said second operating chamber to a supply passage through which fluid under pressure may be supplied to said second operating chamber, and means effective according as said shift relay valve is in its first or its second position for causing the supply of fluid under pressure to said second operating chamber to be at a rapid rate or at a slow rate.

8. In a vehicle transmission, an input member adapted to be driven by the vehicle engine, an output shaft adapted to be connected to the vehicle wheels, a planetary gear set comprising a ring gear driven by said input member and co-axial with said output shaft, a tubular sun gear unit surrounding said output shaft and having a sun gear on the exterior thereof, a carrier non-rotatably secured on said output shaft and having mounted thereon planet gears meshing with said ring and sun gears, said transmission having a housing, a transversely extending wall provided with an opening through which said sun gear unit extends, a control device element non-rotatably secured on said sun gear unit on the side of said transverse wall opposite from said sun gear, said control device element having on the periphery thereof a frusto-conical surface the smaller diameter of which is on the side of said element remote from said transverse wall, said transmission housing having thereon a frustro-conical surface adapted to be engaged by the frustro-conical surface on said control device element on movement of said control device element away from said transverse wall, said transverse wall having on the face thereof adjacent said control device element a bore surrounding said sun gear element, said control device element having associated therewith a central portion of substantially smaller diameter than the remainder of said control device element and adapted to be received by the bore in said transverse wall, said transmission housing and control device element cooperating to form between the control device element and said transverse wall when the frustro-conical surfaces on said control device element and said housing are in engagement a chamber adapted to contain fluid under pressure, a communication of restricted flow capacity between said chamber and the area between the axial face of said control device element central portion and said transverse wall, and manually controlled means for supplying fluid under pressure to and for releasing fluid under pressure from the area between the axial face of said control device element central portion and said transverse wall.

9. In a motor vehicle transmission, an output shaft adapted to be connected to the vehicle wheels, a driving member surrounding said output shaft and having at its first end a portion adapted to be driven by the vehicle engine, said driving member having a drum portion open on the second end of said member, said drum portion having on its radially inner face a first ring gear adjacent the open end of said drum, and a second ring gear separated from the open end of said drum by said first ring gear, a sun gear unit surrounding said output shaft and having on its radially outer face a first and a second sun gear, a first planet carrier rotatably supported relative to said drum and sun gear unit and having mounted thereon planet gears meshing with said first ring gear and said first sun gear, a second planet carrier non-rotatably secured on said output shaft and having mounted thereon planet gears meshing with said second ring gear and said second sun gear, manually controlled means for preventing rotation of said first planet carrier, and manually controlled means for preventing rotation of said sun gear unit.

10. In a transmission for a motor vehicle, a housing having spaced first and second transverse walls provided with aligned openings, an output shaft extending through at least one of said aligned openings, an input member surrounding said output shaft and rotatably supported in said housing between said transverse walls, said input member having a portion extending through the opening in said first transverse wall and adapted to be driven by the vehicle engine, said input member comprising a drum open at the end facing said second transverse wall and having provided on the radially inner face thereof a first ring gear located adjacent the closed end of the drum and a second ring gear located adjacent the open end of the drum, a tubular sun gear member surrounding said output shaft and having provided on its exterior a first and a second sun gear, said sun gear member extending through the opening in said second transverse wall, a first carrier secured on said output shaft so as to be rotatable therewith, planet gears mounted on said first carrier and meshing with said first ring and first sun gears, a second carrier surrounding said sun gear member and having mounted thereon planet gears meshing with said second ring and second sun gears, manually controlled means located between said first and second transverse walls for at times securing said second carrier to the transmission housing to thereby prevent rotation of said carrier, and other manually controlled means located on the side of said second transverse wall remote from said first transverse wall for at times securing said sun gear member to the transmission housing to thereby prevent rotation of said sun gear member.

11. A transmission as described in claim 9 and in which the diameter of the first sun gear is a substantially larger proportion of the diameter of the first ring gear than the diameter of the second sun gear is of the diameter of the second ring gear.

12. In a transmission for a motor vehicle, a housing having spaced first and second transverse walls provided with aligned openings, an output shaft extending through at least one of said aligned openings, an input member surrounding said output shaft and rotatably supported in said housing between said transverse walls, said input member having a portion extending through the opening in said first transverse wall and adapted to be driven by the vehicle engine, said input member comprising a drum open at the end facing said second transverse wall and having provided on the radially inner face thereof a first ring gear located adjacent the closed end of the drum and a second ring gear located adjacent the open end of the drum, a tubular sun gear member surrounding said output shaft and having provided on its exterior a first and a second sun gear, said sun gear member extending through the opening in said second transverse wall, a first carrier secured on said output shaft so as to be rotatable therewith, planet gears mounted on said first carrier and meshing with said first ring and first sun gears, a second carrier surrounding said sun gear member and having mounted thereon planet gears meshing with said second ring and second sun gears, a first cone non-rotatably secured on said sun gear member on the side of said second transverse wall remote from said first transverse wall and having on its periphery a frustro-conical surface adapted to engage a counterpart surface on the transmission housing, a first movable abutment subject to the pressure of the fluid in a first chamber at a face of said second transverse wall for pressing said first cone against the counterpart surface on said housing, a second cone non-rotatably secured on said second carrier and having on its periphery a frustro-conical surface adapted to engage a counterpart surface on the transmission housing, and a second movable abutment subject to the pressure of the fluid in a second chamber at a face of said second transverse wall for pressing said second cone against the counterpart surface on said housing.

13. In a transmission for a motor vehicle, a housing having spaced first and second transverse walls provided with aligned openings, an output shaft extending through at least one of said aligned openings, an input member surrounding said output shaft and rotatably supported in said housing between said transverse walls, said input member having a portion extending through the opening in said first transverse wall and adapted to be driven by the vehicle engine, said input member comprising a drum open at the end facing said second transverse wall and having provided on the radially inner face thereof a first ring gear located adjacent the closed end of the drum and a second ring gear located adjacent the open end of the drum, a tubular sun gear member surrounding said output shaft and having provided on its exterior a first and a second sun gear, said sun gear member extending through the opening in said second transverse wall, a first carrier secured on said output shaft so as to be rotatable therewith, planet gears mounted on said first carrier and meshing with said first ring and first sun gears, a second carrier surrounding said sun gear member and having mounted thereon planet gears meshing with said second ring and second sun gears, a first cone member non-rotatably secured on said sun gear member on the side of said second transverse wall remote from said first transverse wall and having on its periphery a frustro-conical surface which has its portion of largest diameter adjacent said second transverse wall and which is adapted to engage a counterpart surface associated with said transmission housing, a first movable abutment subject to the pressure of the fluid in a chamber at the face of said second transverse wall remote from said first transverse wall for moving said first cone member towards said counterpart surface, a second cone member non-rotatably secured on said second carrier and having on its periphery a frustro-conical surface which has its portion of largest diameter adjacent said second transverse wall and which is adapted to engage a counterpart surface associated with said transmission housing, and a second movable abutment subject to the pressure of the fluid in a chamber at the face of said second transverse wall nearer said first transverse wall for moving said second cone member towards the associated counterpart surface.

14. In a transmission for a motor vehicle, a housing having spaced first and second transverse walls provided with aligned openings, an output shaft extending through at least one of said aligned openings, a ring gear surrounding said output shaft and rotatably supported in said housing between said transverse walls, means associated with said ring gear and extending through the opening in said first transverse wall and adapted to establish driving connection between said ring gear and the vehicle engine, a tubular sun gear member surrounding said output shaft and extending through the opening in said second transverse wall, said sun gear member having a sun gear provided on its exterior, a carrier secured on said output shaft so as to be rotatable therewith, planet gears mounted on said carrier and meshing with said ring and sun gears, an element located on the side of said transverse wall remote from said first transverse wall, said element being secured on said sun gear member so as to be rigid relative thereto both axially and rotatably, said element and said transmission housing having associated therewith cooperating friction surfaces effective on axial movement of said element away from said second transverse wall to lock said sun gear member to said housing, and means including a movable abutment effective on an increase in the pressure of the fluid in a chamber at the face of said second transverse wall remote from said first transverse wall for exerting force to move said element away from said second transverse wall.

15. In a transmission for a motor vehicle, a housing having spaced first and second transverse walls provided with aligned openings, an output shaft extending through at least one of said aligned openings, a ring gear surrounding said output shaft and rotatably supported in said housing between said transverse walls, means associated with said ring gear and extending through the opening in said first transverse wall and adapted to establish driving connection between said ring gear and the vehicle engine, a tubular sun gear member surrounding said output shaft and extending through the opening in said second transverse wall, said sun gear member having a sun gear provided on its exterior, a carrier secured on said output shaft so as to be rotatable therewith, planet gears mounted on said carrier and meshing with said ring and sun gears, an element located on the side of said transverse wall remote from said first transverse wall, said element being secured on said sun gear member so as to be substantially rigid relative thereto both axially and rotatably, said element and said transmission housing having associated therewith cooperating friction surfaces effective on application thereto of force in a selected direction axially of said sun gear element to lock said sun gear member to said housing, and means including a movable abutment effective on an increase in the pressure of the fluid in a chamber at the face of said second transverse wall remote from said first transverse wall to exert force on said friction surfaces in said selected axial direction.

16. In a transmission for a motor vehicle, a housing having spaced first and second transverse walls provided with aligned openings, an output shaft extending through at least one of said aligned openings, a ring gear surrounding said output shaft and rotatably supported in said housing between said transverse walls, means associated with said ring gear and extending through the opening in said first transverse wall and adapted to establish driving connection between said ring gear and the vehicle engine, a tubular sun gear member surrounding said output shaft and extending through the opening in said second transverse wall, said sun gear member having a sun gear provided on its exterior, a carrier secured on said output shaft so as to be rotatable therewith, planet gears mounted on said carrier and meshing with said ring and sun gears, a control device element located on the side of said transverse wall remote from said first transverse wall, said control device element being secured on said sun gear member so as to be substantially rigid relative thereto both axially and rotatably, said control device element and said transmission housing having associated therewith cooperating friction surfaces effective on application thereto of force directed axially on said sun gear member and away from said second transverse wall to lock said sun gear member to said housing, a movable abutment effective on an increase in the pressure of the fluid in a chamber at the face of said second transverse wall to exert on said friction surfaces force directed axially of said sun gear member and away from said second transverse wall, said control device element being effective on movement of said sun gear member away from said first transverse wall to also exert on said friction surfaces force directed axially of said sun gear member and away from said second transverse wall, said ring, planet and sun gears having helical teeth arranged so that when said carrier is driven by force transmitted thereto from the vehicle engine through said ring gear axially directed force is exerted on said sun gear member to move said member away from said first transverse wall.

17. In a transmission for a motor vehicle, a housing having spaced first and second transverse walls provided with aligned openings, an output shaft extending through at least one of said aligned openings, a ring gear surrounding said output shaft and rotatably supported in said housing between said transverse walls, means associated with said ring gear and extending through the opening in said first transverse wall and adapted to establish driving connection between said ring gear and the vehicle engine, a tubular sun gear member surrounding said output shaft and extending through the opening in said second transverse wall, said sun gear member having a sun gear provided on its exterior, a carrier secured on said output shaft so as to be rotatable therewith, planet gears mounted on said carrier and meshing with said ring and sun gears, said housing having thereon on the side of said second transverse wall remote from said first transverse wall a frustro-conical surface concentric with said sun gear member and connected with said second transverse wall by an imperforate wall, the portion of said frustro-conical surface of largest diameter being located nearest said second transverse wall, a cone secured on said sun gear member so as to be rigid rotatively therof, said cone being located on the side of said second transverse wall remote from said first transverse wall and having a frustro-conical peripheral surface adapted to engage the frustro-conical surface on said housing to lock said sun gear member to said housing and to provide a seal which substantially prevents flow of liquid through the joint between said frustro-conical surfaces, said cone and said second transverse wall having confronting faces, one of said confronting faces having therein a cylindrical recess concentric with said sun gear member and of substantially smaller diameter than said cone, the other of said confronting faces having thereon a cylindrical projection adapted to be received by said cylindrical recess, the area within said recess at the face of said projection being connected with the area between said confronting faces radially outwardly of said projection by a communication of restricted flow capacity, and means for supplying fluid under pressure to and for releasing fluid under pressure from the area within said recess at the faces of said projection.

18. In a transmission for a motor vehicle, a housing having spaced first and second transverse walls provided with aligned openings, an output shaft extending through at least one of said aligned openings, a ring gear surrounding said output shaft and rotatably supported in said housing between said transverse walls, means associated with said ring gear and extending through the opening in said first transverse wall and adapted to establish driving connection between said ring gear and the vehicle engine, a tubular sun gear member surrounding said output shaft and extending through the opening in said second transverse wall, said sun gear member having a sun gear provided on its exterior, a carrier secured on said output shaft so as to be rotatable therewith, planet gears mounted on said carrier and meshing with said ring and sun gears, said housing having thereon on the side of said second transverse wall remote from said first transverse wall a frustro-conical surface concentric with said sun gear member and connected with said second transverse wall by an imperforate wall, the portion of said frustro-conical surface of largest diameter being located nearest said second transverse wall, a cone secured on said sun gear member so as to be substantially rigid rotatively and axially thereof, said cone being located on the side of said second transverse wall remote from said first transverse wall and having a frustro-conical peripheral surface adapted to engage the frustro-conical surface on said housing to lock said sun gear member to said housing and to provide a seal which substantially prevents flow of liquid through the joint between said frustro-conical surfaces, said cone and said second transverse wall having confronting faces, one of said confronting faces having therein a cylindrical recess concentric with said sun gear member and of substantially smaller diameter than said cone, the other of said confronting faces having thereon a cylindrical projection adapted to be received by said cylindrical recess, the area within said recess at the face of said projection being connected with the area between said confronting faces radially outwardly of said projection by a communication of restricted flow capacity, and means for supplying liquid under pressure to and for releasing liquid under pressure from the area within said recess at the face of said projection, said ring, planet and sun gears having helical teeth arranged so that when said carrier is driven by force transmitted thereto from the vehicle engine through said ring gear force is exerted on said sun gear member to move said sun gear member in the direction to exert force to press the frustroconical surface on said cone against the frustro-conical surface on said housing.

19. In a vehicle transmission, a housing, an input and output shaft rotatably supported relative to said housing, a friction device effective when operated to establish driving connection between said input and output shafts, hydraulically operated control means associated with said housing and effective at times to operate said friction device to establish driving connection between said shafts, a control valve mounted within said housing and controlling the supply of liquid under pressure to and the release of liquid under pressure from said control means, a wall of said housing having an opening therethrough surrounded by a locating surface formed on the exterior of said housing, a tubular member secured in said opening, said tubular member having adjacent its outer end a shoulder which cooperates with said locating surface to accurately position said tubular member relative to said housing and having an inner end portion projecting beyond the inner face of said housing wall surrounding said opening, a control shaft rotatably supported by said tubular member and having associated therewith spaced shoulders which cooperate with the inner and outer end faces of said tubular member to position said control shaft relative to said housing, a cam member secured on the end of said control shaft within said housing, said cam member extending radially from said control shaft and having formed on a radial face thereof a cam surface comprising a plurality of recesses separated by projections located substantially a first distance from the axis of said control shaft and including a braking projection located farther than said first distance from the axis of said control shaft, a rotor rigidly secured on said output shaft and having radially projecting teeth, a lever pivotally supported on said housing, said lever having adjacent its first end at least one tooth adapted to cooperate with the teeth on said rotor to prevent rotation of said output shaft, said lever having adjacent its second end a portion adapted to engage the cam surface on said cam member, spring means for yieldingly pressing said lever second end against said cam surface, said lever and cam member being arranged and proportioned so that the tooth on said lever is in engagement with the teeth on said rotor when said lever second end engages the braking projection on said cam surface and so that the tooth on said lever is out of engagement with the teeth on said rotor when the lever second end engages any portion of said cam surface other than said braking projection, means associated with said cam member for moving said valve element to different operating positions in response to movement of said cam member between positions in which the second end of said lever engages different recesses in said cam surface, and means on the end of said control shaft outside of said housing for manually oscillating said control shaft.

20. In a vehicle transmission, a housing, an input shaft and an output shaft rotatably supported relative to said housing, a friction device effective when operated to establish driving connection between said input and output shafts, hydraulically operated control means associated with said housing and effective at times to operate said friction device to establish driving connection between said input and output shafts, a control valve mounted within said housing and controlling the supply of liquid under pressure to and the release of liquid under pressure from said control means, said control valve including a first and a second manually operated valve element, a wall of said housing having an opening therethrough surrounded by a locating surface formed on the exterior of said housing, a tubular member secured in said opening, said tubular member having adjacent its outer end a shoulder which cooperates with said locating surface to accurately position said tubular member relative to said housing and having an inner end portion projecting beyond the inner face of the housing wall surrounding said opening, a tubular control shaft rotatably supported in said tubular member and having associated therewith spaced shoulders which cooperate with the inner and outer end faces of said tubular member to position said shaft relative to said housing, means at the end of said tubular control shaft within said housing for operating said first valve element, means on the end of said tubular control shaft outside of said housing for manually oscillating said tubular control shaft, a second control shaft rotatably supported in said tubular control shaft and having associated therewith spaced shoulders which cooperate with the inner and outer end faces of said tubular control shaft to position said second control shaft relative to said housing, means on the end of said second control shaft within said housing for operating said second valve element, and means on the end of said second control shaft outside said housing for manually oscillating said second control shaft.

21. In a vehicle transmission, a housing, an input shaft and an output shaft rotatably supported relative to said housing, a friction device effective when operated to establish driving connection between said input and output shafts, hydraulically operated control means associated with said housing and effective at times to operate said friction device to establish driving connection between said input and output shafts, a control valve mounted within said housing and controlling the supply of liquid under pressure to and the release of liquid under pressure from said control means, said control valve including a manually operated valve element, a wall of said housing having an opening therethrough surrounded by a locating surface formed on the exterior of said housing, a tubular member secured in said opening, said tubular member having adjacent its outer end a shoulder which cooperates with said locating surface to accurately position said tubular member relative to said housing and having an inner end portion projecting beyond the inner face of the housing wall surrounding said opening, a control shaft rotatably supported in said tubular member and having associated therewith spaced shoulders which cooperate with the inner and outer end faces of said tubular member to position said control shaft relative to said housing, a cam member secured on the end of said control shaft within said housing and having on a radial face thereof a cam surface including a braking portion located a selected distance from the axis of said shaft and including other portions located nearer the axis of said control shaft, a lever pivotally supported intermediate its ends on said housing for movement about an axis substantially parallel to the axis of said output shaft, the first end of said lever having at least one tooth adapted to engage the teeth on said rotor to prevent rotation of said output shaft, the second end of said lever being adapted to engage the cam surface on said cam member, said cam member and said lever being arranged and proportioned so that when the lever second end engages the braking portion of said cam surface the tooth on the lever first end meshes with the teeth on said rotor and so that when the lever second end engages any portion of said cam surface other than said braking portion the tooth on said lever first end is out of the path of movement of the teeth on said rotor, the portion of said cam surface other than said braking portion including a plurality of spaced recesses each of which is adapted to receive the second end of said lever, spring means pressing the lever second end against said cam surface, means associated with said cam member for moving said valve element to different selected positions according as the cam member is in positions determined by engagement of said lever second end with different ones of the recesses in said cam surface, and means secured on the end of said control shaft outside said housing for moving said cam member between a plurality of different operating positions.

22. In a vehicle transmission, a housing, input and output shafts rotatably supported relative to said housing, a rotor secured on said output shaft and having teeth in its periphery, a friction device effective when operated to establish driving connection between said input and output shafts, hydraulically operated control means effective at times to operate said friction device to establish driving connection between said input and output shafts, a control valve including a valve element movable between a plurality of positions for controlling said control means, a control shaft extending through a wall of said housing and supported by said housing for movement about an axis extending substantially perpendicular to the axis of said output shaft, a cam member secured on the end of said control shaft within said housing and having on a radial face thereof a cam surface including a braking portion located a selected distance from the axis of said control shaft and including other portions located nearer the axis of said control shaft, a lever pivotally supported intermediate its ends on said housing for movement about an axis substantially parallel to the axis of said output shaft, the first end of said lever having at least one tooth adapted to engage the teeth on said rotor to prevent rotation of said output shaft, the second end of said lever being adapted to engage the cam surface on said cam member, said cam member and said lever being arranged and proportioned so that when the lever second end engages the braking portion of said cam surface the tooth on the lever first end meshes with the teeth on said rotor and so that when the lever second end engages any portion of said cam surface other than said braking portion the tooth on said lever first end is out of the path of movement of the teeth on said rotor, spring means pressing the lever second end against said cam surface, means associated with said cam member for moving said valve element between its various positions, and means secured on the end of said control shaft outside said housing for manually moving said cam member between a plurality of different operating positions.

23. In control means for a vehicle transmission having an input shaft, an output shaft, gearing for transmitting power between said input and output shafts, a first hydraulically operated control device for establishing driving connection between said input and output shafts through gearing to cause said output shaft to be driven at a relatively slow rate, and a second hydraulically operated control device for establishing driving connection between said input and output shafts to cause said output shaft to be driven at a relatively fast rate, said control means comprising a supply passage from which liquid under pressure may be supplied to said first and second control devices, a first control valve element biased to a first position and movable therefrom to a second position on an increase in the pressure of the liquid in a governor chamber, said first control valve element being effective when in said first position to cause communication to be established between said supply passage and said first control device and to cause said second control device to be connected to the exhaust, said first control valve element being effective when in said second position to cause communication to be established between said supply passage and said second control device and to cause said first control device to be connected to the exhaust, a first pump driven synchronously with said input shaft and supplying liquid to a supply chamber, a second control valve element biased by a spring to a first position in which it cuts off communication between said supply chamber and said supply passage, said second control valve element being moved against said spring to a second position on a relatively small increase in the pressure of the liquid in said supply chamber and being effective when in said second position to establish communication between said supply chamber and said supply passage, a second pump driven synchronously with said output shaft and supplying liquid to said governor chamber, a passage through which liquid supplied by said second pump may be supplied through a check valve to said supply passage, valve means operative on a relatively small increase in the pressure of the liquid in said supply chamber to establish communication between said governor chamber and exhaust through an orifice of restricted flow capacity, and valve means operative on a relatively large increase in the pressure of the liquid in said governor chamber to establish a communication through which liquid may be released from said governor chamber.

24. In control means for a vehicle transmission having an input shaft, an output shaft, a friction device effective when operated to establish driving connection between said input and output shafts, and a hydraulically operated control device effective on an increase in the pressure of the liquid in an operating chamber to operate said friction device to establish driving connection between said input and output shafts, said control means comprising a shift valve biased to a first position and movable therefrom to a second position on an increase in the pressure of the liquid in a governor chamber, said shift valve being effective in said first position to connect said operating chamber to exhaust and being effective in said second position to connect said operating chamber to a supply passage, a regulating valve responsive to the pressure of the liquid in a supply chamber for releasing liquid from said supply chamber, valve means biased to a first position in which it cuts off flow and liquid between said supply passage and said supply chamber, said valve means being movable on a relatively small increase in the pressure of the liquid in said supply chamber to a second position in which it permits flow of liquid between said supply passage and said supply chamber, a first pump operated synchronously with said input shaft and supplying liquid under pressure to said supply chamber, a second pump operated synchronously with said output shaft and supplying liquid under pressure to said governor chamber, valve means operative on a relatively small increase in the pressure of the liquid in said supply chamber to establish communication between said governor chamber and an exhaust orifice of restricted flow capacity, valve means operative on a relatively large increase in the pressure of the liquid in said governor chamber to open a communication through which liquid may be discharged from said governor chamber, and a passage through which liquid may be supplied from said governor chamber through a check valve to said supply passage.

25. A control means for a transmission as described in claim 24 and characterized by valve means operative on a relatively small increase in the pressure of the liquid in said supply chamber to close a communication through which liquid is released from said supply chamber at a restricted rate.

26. In control means for a vehicle transmission having an input shaft, an output shaft, a friction device effective when operated to establish driving connection between said input and output shaft, and a hydraulically operated control device effective on an increase in the pressure of the liquid in an operating chamber to operate said friction device to establish driving connection between said input and output shafts, said control means comprising a shift valve biased to a first position and movable therefrom to a second position on an increase in the pressure of the liquid in a governor chamber, said shift valve being effective in said first position to connect said operating chamber to exhaust and being effective in said second position to connect said operating chamber to a supply passage, a regulating valve responsive to the pressure of the liquid in a supply chamber for releasing liquid from said supply chamber, a valve element biased to a first position in which it cuts off communication from said governor chamber through an exhaust orifice of restricted flow capacity and movable to a second position in which it establishes communication from said governor chamber through said exhaust orifice, said valve element having a relatively large area on which liquid in said supply chamber is effective to exert force to move said valve element against said biasing means and having a relatively small area on which liquid in said governor chamber is effective to exert force to move said valve element against said biasing means, whereby said valve element is moved from said first position to said second position on a relatively small increase in the pressure of the liquid in said supply chamber and is moved from said first to said second position only on a relatively large increase in the pressure of the liquid in said governor chamber, a first pump operated synchronously with said input shaft and supplying liquid under pressure to said supply chamber, a second pump operated synchronously with said output shaft and supplying liquid under pressure to said governor chamber, means for supplying liquid from said supply chamber to said supply passage, and means for supplying liquid from said governor chamber to said supply passage through a check valve.

27. In control means for a vehicle transmission having an input shaft, an output shaft, a friction device effective when operated to establish driving connection between said input and output shafts, and a hydraulically operated control device effective on an increase in the pressure of the liquid in an operating chamber to operate said friction device to establish driving connection between said input and output shafts, said control means comprising a shift valve biased to a first position and movable therefrom to a second position on an increase in the pressure of the liquid in a governor chamber, said shift valve being effective in said first position to connect said operating chamber to exhaust and being effective in said second position to connect said operating chamber to a supply passage, a regulating valve responsive to the pressure of the liquid in a supply chamber for releasing liquid from said supply chamber, a valve element biased to a first position in which it cuts off communication from said governor chamber through a first exhaust orifice of restricted flow capacity and in which said valve element establishes communication from said supply chamber through a second exhaust orifice of restricted flow capacity, said valve element being movable from said first position to a second position on a relatively small increase in the pressure of the liquid in said supply chamber, said valve element being effective when in said second position to establish communication from said governor chamber through said first exhaust orifice and to cut off communication from said supply chamber through said second exhaust orifice, valve means operative on a relatively large increase in the pressure of the liquid in said governor chamber to release liquid therefrom, a first pump operated synchronously with said input shaft and supplying liquid under pressure to said supply chamber, a second pump operated synchronously with said output shaft and supplying liquid under pressure to said governor chamber, means for supplying liquid from said supply chamber to said supply passage, and means for supplying liquid from said governor chamber to said supply passage through a check valve.

28. In control means for a vehicle transmission having an input shaft, an output shaft, a friction device effective when operated to establish driving connection between said input and output shafts, and a hydraulically operated control device effective on an increase in the pressure of the liquid in an operating chamber to operate said friction device to establish driving connection between said input and output shafts, said control means comprising a shift valve biased to a first position and movable therefrom to a second position on an increase in the pressure of the liquid in a governor chamber, said shift valve being effective in said first position to connect said operating chamber to exhaust and being effective in said second position to connect said operating chamber to a supply passage, a regulating valve responsive to the pressure of the liquid in a supply chamber for releasing liquid from said supply chamber, a valve element biased to a first position in which it cuts off communication from said governor chamber through a first exhaust orifice of restricted flow capacity and in which said valve element establishes communication from said supply chamber through a second exhaust orifice of restricted flow capacity, said valve element being movable from said first position to an intermediate position in which it establishes communication from said governor chamber through said first exhaust orifice and from said supply chamber through said second exhaust orifice, said valve element also being movable from said first position through said intermediate position to a second position in which said valve element establishes communication from said governor chamber through said first exhaust orifice and cuts off communication from said supply chamber through said second orifice, said valve element having a relatively large area on which liquid in said supply chamber is effective to exert force to move said valve element against said biasing means and having a relatively small area on which liquid in said governor chamber is effective to exert force to move said valve element against said biasing means, whereby said valve element is moved from said first to said second position on a relatively small increase in the pressure of the liquid in said supply chamber and is moved from said first to said intermediate position only upon a relatively large increase in the pressure of the liquid in said governor chamber, a first pump operated synchronously with said input shaft and supplying liquid under pressure to said supply chamber, a second pump operated synchronously with said output shaft and supplying liquid under pressure to said governor chamber, means for supplying liquid from said supply chamber to said supply passage, and means for supplying liquid from said governor chamber to said supply passage through a check valve.

29. In control means for a vehicle transmission having an input member adapted to be driven by the vehicle engine, an output shaft adapted to drive the vehicle wheels, gearing for transmitting power between said input member and said output shaft, a first friction control device effective on an increase in the pressure of the fluid in a first operating chamber to establish between said input and output shafts a first driving connection through said gearing effective to drive the output shaft slower than said input shaft, and a second friction control device effective on an increase in the pressure of the fluid in a second operating chamber to establish between said input and output shafts a second driving connection effective to drive the output shaft at a rate substantially more rapid than that at which said output shaft is driven through said driving connection, said control means comprising means for supplying fluid under pressure to said first operating chamber, means for supplying fluid under pressure to said second operating chamber, valve means responsive to an increase in the pressure of the fluid in said second operating chamber to cut off the supply of fluid to said first operating chamber and to release fluid from said first operating chamber, and means responsive to the torque demand on the vehicle engine for adjustably varying in accordance with the torque demand on the vehicle engine the pressure which must be developed in said second operating chamber to effect operation of said valve means.

30. In control means for a vehicle transmission having an input member adapted to be driven by the vehicle engine, an output shaft adapted to drive the vehicle wheels, gearing for transmitting power between said input member and said output shaft, a first friction control device effective on an increase in the pressure of the fluid in a first operating chamber to establish between said input and output shafts a first driving connection through said gearing effective to drive the output shaft slower than said input shaft, and a second friction control device effective on an increase in the pressure of the fluid in a second operating chamber to establish between said input and output shafts a second driving connection effective to drive the output shaft at a rate substantially more rapid than that at which said output shaft is driven through said first driving connection, a control valve movable between a first position and a second position, said control valve being effective when in said first position to connect said first operating chamber to a supply passage through which fluid under pressure may be supplied to said first operating chamber and being effective when in said second position to connect said first operating chamber to an exhaust passage, means for supplying fluid under pressure to said second operating chamber, means responsive to the pressure of the fluid in said second operating chamber for moving said control valve from its first to its second position, and means for causing the pressure which must be developed in said second operating chamber to effect movement of said control valve from said first to said second position to adjustably vary in accordance with the torque demand on the vehicle engine.

31. In control means for a vehicle transmission having an input member adapted to be driven by the vehicle engine, an output shaft adapted to drive the vehicle wheels, gearing for transmitting power between said input member and said output shaft, a first friction control device effective on an increase in the pressure of the fluid in a first operating chamber to establish between said input and output shafts a first driving connection through said gearing effective to drive the output shaft slower than said input shaft, and a second friction control device effective on an increase in the pressure of the fluid in a second operating chamber to establish between said input and output shafts a second driving connection effective to drive the output shaft at a rate substantially more rapid than that at which said output shaft is driven through said first driving connection, said control means comprising a control valve biased to a first position and movable therefrom to a second position, said control valve being effective when in said first position to connect said first operating chamber to a supply passage through which fluid under pressure may be supplied to said first operating chamber and being effective when in said second position to connect said first operating chamber to an exhaust passage, means for supplying fluid under pressure to and for releasing fluid under pressure from said second operating chamber, means responsive to the pressure of the fluid in said second operating chamber for moving said control valve against the associated biasing means from said first position to said second position, and means responsive to the torque demand on the vehicle engine effective to oppose movement of said control valve from said first to said second position but ineffective to affect movement of said control valve from said second to said first position.

32. In a vehicle transmission, a housing, a planetary gear unit rotatably supported in said housing, said planetary gear unit comprising a ring gear element, a sun gear element, and a carrier element including planet gears meshing with said ring and sun gear elements, said ring gear element comprising a drum substantially closed at its first end and having its second end open and surrounded by an annular surface, said housing having associated therewith a transverse surface extending across the open face of said ring gear element and including an annular surface confronting the annular surface on said ring gear element, said ring gear element being supported in said housing so as to be movable axially therein between a first position in which the annular surface on said ring gear element is spaced from the annular surface associated with said housing and a second position in which the annular surface on said ring gear element is adjacent the annular surface associated with said housing to thereby restrict flow of lubricant from the area within said ring gear element, means for supplying lubricant under pressure to the area within said ring gear element, a first element of said planetary gear unit being adapted to be connected to the vehicle engine, a second element of said planetary gear unit being adapted to be connected to an output shaft, the third element of said planetary gear unit having associated therewith brake means for at times securing said element to the housing to thereby establish driving connection between the other elements of said planetary gear unit, the gears of said planetary gear unit having helical teeth arranged so that when and only when force is transmitted through the planetary gear unit from the second to the first element thereof force is exerted on said ring gear element to move said element to its second position.

33. In a vehicle transmission, a housing, a planetary gear unit rotatably supported in said housing, said planetary gear unit comprising a ring gear element, a sun gear element, and a carrier element including planet gears meshing with said ring and sun gear elements, said ring gear element comprising a drum substantially closed at its first end and having its second end open and surrounded by an annular surface, said housing having associated therewith a transverse surface extending across the open face of said ring gear element and including an annular surface confronting the annular surface on said ring gear element, said ring gear element being supported in said housing so as to be movable axially therein between a first position in which the annular surface on said ring gear element is spaced from the annular surface associated with said housing and a second position in which the annular surface on said ring gear element is adjacent the annular surface associated with said housing to thereby restrict flow of lubricant from the area within said ring gear element, means for supplying lubricant under pressure to the area within said ring gear element, the sun gear element of said planetary gear unit having associated therewith brake means for at times securing said element to the housing to thereby establish driving connection between the ring gear and carrier elements of said planetary gear unit, the first of the elements of the planetary gear unit other than said sun gear element being adapted to be connected to the vehicle engine and the second of the elements of the planetary gear unit other than said sun gear element being adapted to be connected to an output shaft, the gears of said planetary unit having helical teeth arranged so that when and only when force is transmitted through said planetary gear unit from the element adapted to be connected to the output shaft to the element adapted to be driven by the engine force is exerted on said ring gear element to move said element to its second position.

34. In a vehicle transmission, a housing, a planetary gear unit rotatably supported in said housing, said planetary gear unit comprising a ring gear element, a sun gear element, and a carrier element including planet gears meshing with said ring and sun gear elements, said ring gear element comprising a drum substantially closed at its first end and having its second end open and surrounded by an annular surface, said housing having associated therewith a transverse surface extending across the open face of said ring gear element and including an annular surface confronting the annular surface on said ring gear element, said ring gear element being supported in said housing so as to be movable axially therein between a first position in which the annular surface on said ring gear element is spaced from the annular surface associated with said housing and a second position in which the annular surface on said ring gear element is adjacent the annular surface associated with said housing to thereby restrict flow of lubricant from the area within said ring gear element, means for supplying lubricant under pressure to the area within said ring gear element, means for connecting said ring gear element with the vehicle engine, means for connecting said carrier element with an output shaft, brake means for at times securing said sun gear element to the housing to thereby establish driving connection between said ring gear and carrier elements, the gears of said planetary unit having helical teeth arranged so that when and only when force is transmitted through said planetary gear unit from said carrier element to said ring gear element force is exerted on said ring gear element to move said element to its second position.

35. In a vehicle transmission, a housing, a planetary gear unit rotatably supported in said housing, said planetary gear unit comprising a ring gear element, a sun gear element, and a carrier element including planet gears meshing with said ring and sun gear elements, said ring gear element comprising a drum substantially closed at its first end and having its second end open and surrounded by an annular surface, a transverse surface extending across the open face of said ring gear element and including an annular surface confronting the annular surface on said ring gear element, brake means for at times securing one of the elements of said planetary gear unit to said housing and thereby establish driving connection between the first and second remaining elements of said planetary gear unit, the first of said remaining elements of said planetary gear unit being adapted to be driven by the vehicle engine and the second of said remaining elements of said planetary gear unit being adapted to be connected to an output shaft, the gears of said planetary gear unit having helical teeth and being arranged so that transmission of torque from said first to said second element causes relative movement between said ring gear and said annular surface in the direction away from each other and so that transmission of torque from said second to said first element causes relative movement between said ring gear and said annular surface towards each other, and means for supplying lubricant to the area within said ring gear.

36. In a vehicle transmission, a housing, a planetary gear unit having an input member adapted to be driven by the vehicle engine and comprising a drum having on its inner face the teeth of a first and a second ring gear, said planetary gear unit having a sun gear element having formed on its outer face the teeth of a first and a second sun gear, a first planet carrier secured on an output shaft and supporting planet gears meshing with said first ring and first sun gear, a second planet carrier supporting planet gears meshing with said second ring and second sun gears, the gears of said planetary gear unit having helical teeth and being arranged so that when said sun gear element is locked to said housing torque is transmitted through said planetary gear unit to drive said output shaft in the forward direction and so that force is exerted on said sun gear element in a first axial direction, the gears of said planetary unit also being arranged so that when said second planet carrier is locked to said housing torque is transmitted through said planetary gear unit to drive said output shaft in the reverse direction and so that force is exerted on said sun gear element in the opposite axial direction, a forward brake effective when engaged to lock said sun gear element to said housing, a reverse brake effective when engaged to lock said second planet carrier to said housing, means responsive to force exerted in said first axial direction on said sun gear element for effecting release of said reverse brake, and means responsive to force exerted in said opposite axial direction in said sun gear element for effecting release of said forward brake.

37. In a vehicle transmission, a housing, a planetary gear unit having an input member adapted to be driven by the vehicle engine and comprising a drum having on its inner face the teeth of a first and a second ring gear, said planetary gear unit having a sun gear element having formed on its outer face the teeth of a first and a second sun gear, a first planet carrier secured on an output shaft and supporting planet gears meshing with said first ring and first sun gear, a second planet carrier supporting planet gears meshing with said second ring and second sun gears, the gears of said planetary gear unit being arranged so that when said sun gear element is locked to said housing torque is transmitted through said planetary gear unit to drive said output shaft in the forward direction and so that when said second planet carrier is locked to said housing torque is transmitted through said planetary gear unit to drive said output shaft in the reverse direction, the gears of said planetary gear unit having helical teeth and being arranged so that when torque is transmitted through said planetary gear unit to drive said output shaft in the forward direction force is exerted on said sun gear element to move said element in a selected axial direction, a forward brake effective when engaged to lock said sun gear element to said housing, a reverse brake effective when engaged to lock said second planet carrier to said housing, means responsive to force exerted in said selected axial direction on said sun gear element to assist in effecting engagement of said forward brake, and means responsive to force exerted in said selected axial direction on said sun gear element to effect release of said reverse brake.

38. In a vehicle transmission, a housing, a planetary gear unit having an input member adapted to be driven by the vehicle engine and comprising a drum having on its inner face the teeth of a first and a second ring gear, said planetary gear unit having a sun gear element having formed on its outer face the teeth of a first and a second sun gear, a first planet carrier secured on an output shaft and supporting planet gears meshing with said first ring and first sun gear, a second planet carrier supporting planet gears meshing with said second ring and second sun gears, the gears of said planetary gear unit being arranged so that when said sun gear element is locked to said housing torque is transmitted through said planetary gear unit to drive said output shaft in the forward direction and so that when said second planet carrier is locked to said housing torque is transmitted through said planetary gear unit to drive said output shaft in the reverse direction, the gears of said planetary gear unit having helical teeth and being arranged so that when torque is transmitted through said planetary gear unit to drive said output shaft in the forward direction force is exerted on said sun gear element to move said element in a selected axial direction, a forward brake effective when engaged to lock said sun gear element to said housing, a reverse brake effective when engaged to lock said second planet carrier to said housing, means responsive to force exerted in said selected axial direction on said sun gear element to assist in effecting engagement of said forward brake, and means responsive to force exerted in said selected axial direction on said sun gear element and acting through said second carrier to effect release of said reverse brake.

39. In a vehicle transmission, a housing, an output shaft rotatably supported adjacent each end from said housing, a planetary gear unit having an input member surrounding said output shaft and rotatably supported in said housing, said input member comprising a drum having on its inner face the teeth of a first and a second ring gear, a first carrier splined on said output shaft and supporting planet gears meshing with said first ring gear, a sun gear element surrounding said output shaft and having formed on its exterior the teeth of a first sun gear meshing with the planet gears on said first carrier and also having formed on its exterior the teeth of a second sun gear, said sun gear element being rotatably supported adjacent one end on said first carrier on a surface located substantially in the radial plane of said first sun gear and being rotatably supported adjacent its other end on said housing, a second carrier supporting planet gears meshing with said second ring gear and said second sun gear, said second carrier being rotatably supported on said sun gear element on surfaces on opposite sides of said second sun gear, a first brake for at times securing said sun gear element to said housing, and a second brake for at times securing said second carrier to said housing.

40. In a vehicle transmission, a housing, a planetary gear unit rotatably supported in said housing and comprising a ring gear adapted to be driven by the vehicle engine, a carrier adapted to be connected to an output shaft and a sun gear adapted to be locked to said housing to establish driving connection between said ring gear and carrier, a frustro-conical surface on said housing concentric with said sun gear, a brake element secured to said sun gear and having a frustro-conical peripheral portion adapted to engage the frustro-conical surface on said housing to lock said sun gear to said housing, said brake element having on one face a cylindrical projection of substantially smaller diameter than the remainder of said brake element, a wall of said housing having therein a bore adapted to receive said brake element projection, said brake element and said housing cooperating to form a first operating chamber at the face of said brake element projection and a second operating chamber at the face of said brake element radially outwardly of said brake element projection, a passage to which fluid under pressure is at times supplied and from which fluid under pressure is at other times released, a connection between said passage and said first operating chamber, and a connection of restricted flow capacity from said passage to said second operating chamber.

41. In a vehicle transmission, a housing, a planetary gear unit rotatably supported in said housing and comprising a ring gear adapted to be driven by the vehicle engine, a carrier adapted to be connected to an output shaft and a sun gear adapted to be locked to said housing to establish driving connection between said ring gear and carrier, a frustro-conical surface on said housing concentric with said sun gear, a brake element secured to said sun gear and having a frustro-conical peripheral portion adapted to engage the frustro-conical surface on said housing to lock said sun gear to said housing, said brake element having on one face a cylindrical projection of substantially smaller diameter than the remainder of said brake element, a wall of said housing having therein a bore adapted to receive said brake element projection, said brake element and said housing cooperating to form a first operating chamber at the face of said brake element projection and a second operating chamber at the face of said brake element radially outwardly of said brake element projection, a passage to which fluid under pressure is at times supplied and from which fluid under pressure is at other times released, a connection between said passage and said first operating chamber, a connection of restricted flow capacity from said passage to said second operating chamber, and valve means responsive to changes in the speed in rotation of said brake element and controlling a communication between said second operating chamber and a chamber within said housing and open to the atmosphere.

42. In control means for a vehicle transmission having an input member adapted to be driven by the vehicle engine, an output shaft adapted to drive the vehicle wheels, gearing for transmitting power between said input member and said output shaft, a first friction control device effective on an increase in the pressure of the fluid in a first operating chamber to establish between said input member and said output shaft a first driving connection through said gearing effective to drive the output shaft at substantially less rapid rate than said input member, and a second friction control device effective on an increase in the pressure of the fluid in a second operating chamber to establish between said input member and said output shaft a second driving connection effective to drive the output shaft at a rate substantially more rapid than that at which said output shaft is driven through said first driving connection, said control means comprising a shift valve biased to a first position and movable therefrom to a second position, means effective when said shift valve is in its first position to supply fluid under pressure to said first operating chamber and to release fluid under pressure from said second operating chamber, means effective when said shift valve is in its second position to supply fluid under pressure to said second operating chamber and to release fluid under pressure from said first operating chamber, means responsive to the pressure of the fluid in a first control chamber and urging said shift valve to said first position, means responsive to the pressure of the fluid in a second control chamber and urging said shift valve to said second position, means for supplying to said second control chamber fluid at pressure which varies in accordance with the speed of said output shaft, a third control chamber, means for maintaining in said third control chamber fluid at a pressure which varies in accordance with the torque demand on the vehicle engine, means effective when and only when said shift valve is in its first position for maintaining in said first control chamber fluid substantially at the pressure of the fluid in said third control chamber, and manually controlled means for supplying fluid under pressure from said third control chamber to said first control chamber irrespective of the position of said shift valve.

43. In control means for a vehicle transmission having an input member adapted to be driven by the vehicle engine, an output shaft adapted to drive the vehicle wheels, gearing for transmitting power between said input member and said output shaft, a first friction control device effective on an increase in the pressure of the fluid in a first operating chamber to establish between said input member and said output shaft a first driving connection through said gearing effective to drive the output shaft at substantially less rapid rate than said input member, and a second friction control device effective on an increase in the pressure of the fluid in a second operating chamber to establish between said input member and said output shaft a second driving connection effective to drive the output shaft at a rate substantially more rapid than that at which said output shaft is driven through said first driving connection, said control means comprising a shift valve biased to a first position and movable therefrom to a second position, means effective when said shift valve is in its first position to supply fluid under pressure to said first operating chamber and to release fluid under pressure from said second operating chamber, means effective when said shift valve is in its second position to supply fluid under pressure to said second operating chamber and to release fluid under pressure from said first operating chamber, means responsive to the pressure of the fluid in a first control chamber and urging said shift valve to said first position, means responsive to the pressure of the fluid in a second control chamber and urging said shift valve to said second position, means for supplying to said second control chamber fluid at pressure which varies in accordance with the speed of said output shaft, a third control chamber, means for maintaining in said third control chamber fluid at a pressure which varies between a minimum value and a maximum value in accordance with the torque demand on the vehicle engine, means effective when and only when said shift valve is in said first position for maintaining in said first control chamber fluid substantially at the pressure of the fluid in said third control chamber, and means effective when and only when the vehicle engine throttle is substantially in its full open position to supply fluid under pressure from said third control chamber to said first control chamber irrespective of the position of said shift valve, the maximum value of the fluid under pressure in said third control chamber being ineffective to move said shift valve from its second position to its first position only when the vehicle speed is less than a selected intermediate value.

44. In a vehicle transmission, an input member adapted to be driven by the vehicle engine, an output shaft adapted to drive the vehicle wheels, a planetary gear unit through which driving connection may be established between said input member and said output shaft, the gears of said planetary gear unit having helical teeth arranged so that force varying in accordance with the magnitude of the torque transmitted through said planetary gear unit is exerted on a selected element of said planetary gear unit in a first or a second axial direction according as torque is transmitted from said input member to said output shaft or is transmitted from said output shaft to said input member, a first friction control device effective when engaged to establish driving connection between said input member and said output shaft through said planetary gear unit, means for exerting on a member of said first friction control device to effect engagement of said first friction control device a force varying in accordance with the pressure of the fluid in a first operating chamber, said planetary gear unit selected element exerting on a member of said first friction control device force varying in accordance with the force exerted on said selected element and effective to increase or decrease the degree of engagement of said control device according as said planetary gear unit selected element is moved in said first or said second axial direction, a second friction control device connected between said input member and said output shaft, said second friction control device being responsive to the pressure of the fluid in a second operating chamber and effective when engaged to establish between said input member and said output shaft a second driving connection which is operative to cause said output shaft to turn at a more rapid rate than that at which said shaft is caused to turn when driven as a result of engagement of said first friction control device, a manually controlled valve having a neutral position and movable therefrom to a first or a second drive position, means effective when said manually controlled valve is in said first drive position to supply fluid under pressure to said first operating chamber, means responsive to the speed of the vehicle for supplying fluid under pressure to said first or said second operating chamber when said manually control valve is in said second drive position, and means effective according as said manually controlled valve is in said first or said second drive position for causing the pressure of the fluid supplied to said first operating chamber to be at a high or a low value.

45. In a vehicle transmission, an input shaft, an output shaft, a friction device effective when operated to establish driving connection between said input and output shafts, and a hydraulically operated control device effective on an increase in the pressure of the liquid in an operating chamber to operate said friction device to establish driving connection between said input and output shafts, a supply passage, a first pump operated synchronously with said input shaft and supplying liquid under pressure to said supply passage, a second pump operated synchronously with said output shaft and also supplying liquid under pressure to said supply passage, a valve element biased to a first position and movable therefrom to a second position only in response to the supply of liquid under pressure by said first pump, a manual control valve having a first position in which said operating chamber is connected to the sump and being movable from said first position to a second position, means effective when said manual control valve and said valve element are both in their second positions for controlling communication between said operating chamber and said supply passage in response to variations in the speed of said output shaft, and means effective when said manual control valve is in its second position and said valve element is in its first position for establishing communication between said operating chamber and said supply passage irrespective of the speed of said output shaft.

46. In a transmission, an input member adapted to be driven by an engine, an output member adapted to drive the driven mechanism, a drive mechanism having an operating chamber operative on the supply of liquid to said chamber to establish driving connection between said input and output members, a supply passage, means for connecting said chamber with said supply passage, a first pump having a first output passage operated synchronously with said input member for at times supplying liquid to said supply passage, a second pump having a second outlet passage operated synchronously with said output member for at times supplying liquid to said supply passage, a first pressure regulating valve connected to one of said output passages effective when rendered operative to regulate the pressure, a second pressure regulating valve connected to the other of said output passages effective when rendered operative to regulate the pressure and connect said pressure to said supply passage, means connecting said one of said output passages to said second pressure regulating valve to disable said second pressure regulating valve in response to fluid under pressure in said one of said output passages to vent said other output passage, and means to connect said one output passage to said supply passage.

47. In a transmission, an input member adapted to be driven by an engine, an output member adapted to drive the driven mechanism, a drive mechanism having an operating chamber operative on the supply of liquid to said chamber to establish driving connection between said input and output members, a supply passage, means for connecting said chamber with said supply passage, a first pump having a first output passage operated synchronously with said input member for at times supplying liquid to said supply passage, a second pump having a second outlet passage operated synchronously with said output member for at times supplying liquid to said supply passage, a first pressure regulating valve connected to one of said output passages effective when rendered operative to regulate the pressure at one pressure value, a second pressure regulating valve connected to the other of said output passages effective when rendered operative to regulate the pressure at a different pressure value and connect said pressure to said supply passage, and means connecting said one of said output passages to said second pressure regulating valve to disable said second pressure regulating valve in response to fluid under pressure in said one of said output passages to vent said other output passage and to connect said one output passage to said supply passage.

48. In a transmission, an input member adapted to be driven by an engine, an output member adapted to drive the driven mechanism, a drive mechanism having an operating chamber operative on the supply of liquid to said chamber to establish driving connection between said input and output members, a supply passage, means for connecting said chamber with said supply passage, a first pump having a first output passage operated synchronously with said input member for at times supplying liquid to said supply passage, said first output passage having a bleed opening, a second pump having a second outlet passage operated synchronously with said output member for at times supplying liquid to said supply passage, a first pressure regulating valve connected to one of said output passages effective on the supply of fluid to said first pressure regulating valve in excess of the volume of fluid passing through said bleed opening to regulate the pressure at one pressure value, a second pressure regulating valve connected to the other of said output passages effective when rendered operative to regulate the pressure at a different pressure value and connect said pressure to said supply passage, and means connecting said one of said output passages to said second pressure regulating valve to disable said second pressure regulating valve in response to fluid pressure in said one of said output passages to vent said other output passage, to close said bleed opening, and to connect said one output passage through said second pressure regulating valve to said supply passage.

49. In a transmission, an input member adapted to be driven by an engine, an output member adapted to drive the driven mechanism, a drive mechanism having an operating chamber operative on the supply of liquid to said chamber to establish driving connection between said input and output members, a supply passage, means for connecting said chamber with said supply passage, a first pump operated synchronously with said input member and having a first output passage at times connected to said supply passage, a second pump operated synchronously with said output member and having a second output passage at times connected to said supply passage, a first pressure regulating valve connected to said first output passage for regulating the pressure delivered from said first output passage to said supply passage over a predetermined range of pressure, a second pressure regulating valve connected to the second output passage for at times regulating the pressure delivered by said second pump to said supply passage at a maximum pressure in excess of the maximum pressure regulated by said first regulator valve, and means whereby said second regulator valve is rendered inoperative to regulate pressure when the pressure delivered by said first pump and regulated by said first regulating valve exceeds a predetermined minimum pressure.

50. The invention defined in claim 49, and means whereby the pressure of liquid delivered by said second pump when said second regulating valve is inoperative to regulate pressure varies with the speed of rotation of said output member.

51. In a transmission, an input member adapted to be driven by an engine, an output member adapted to drive the driven mechanism, a drive mechanism having an operating chamber operative on the supply of liquid to said chamber to establish driving connection between said input and output members, a supply passage, control means for connecting said chamber with said supply passage, a first fluid source having a first output passage at times connected to said supply passage, a second fluid source having a pump operated synchronously with one of said members and having a second output passage at times connected to said supply passage, a first pressure regulating valve connected to said first output passage for regulating the pressure delivered from said first output passage to said supply passage, governing means to control the pressure of the second pump to regulate the pressure proportionate to the speed of rotation of said one member to actuate said control means, a second pressure regulating valve connected to said second output passage having a first position regulating the pressure delivered by said second pump to said supply passage and having a second position connecting said second pump to said governing means and means to move said second regulating valve to said second position to render it inoperative to regulate pressure when pressure is delivered by said first fluid source.

References Cited in the file of this patent

UNITED STATES PATENTS

| | | |
|---|---|---|
| 2,116,234 | Cotterman | May 3, 1938 |
| 2,204,872 | Thompson | June 18, 1940 |
| 2,332,593 | Nutt et al. | Oct. 26, 1943 |
| 2,407,289 | La Brie | Sept. 10, 1946 |
| 2,454,614 | Peterson et al. | Nov. 23, 1948 |
| 2,478,868 | Hasbany | Aug. 9, 1949 |
| 2,478,869 | Hasbany | Aug. 9, 1949 |
| 2,516,203 | Greenlee et al. | July 25, 1950 |
| 2,516,208 | Hasbany | July 25, 1950 |
| 2,568,007 | Jandasek | Sept. 18, 1951 |
| 2,568,798 | Farkas et al. | Sept. 25, 1951 |
| 2,640,373 | Jandasek | June 2, 1953 |
| 2,644,559 | Randol | July 7, 1953 |
| 2,689,029 | McFarland | Sept. 14, 1954 |
| 2,691,940 | McFarland | Oct. 19, 1954 |
| 2,694,948 | McFarland | Nov. 23, 1954 |
| 2,720,124 | Polanski | Oct. 11, 1955 |

FOREIGN PATENTS

| | | |
|---|---|---|
| 477,530 | Great Britain | Jan. 3, 1938 |
| 966,238 | France | Oct. 4, 1950 |

OTHER REFERENCES

Automotive Industries, pp. 26–30, 85, Dec. 11, 1949.
Product Engineering, January 1950, vol. 21, #1, pages 94–97 inclusive.

UNITED STATES PATENT OFFICE
CERTIFICATE OF CORRECTION

Patent No. 2,792,716                              May 21, 1957

Howard W. Christenson

It is hereby certified that error appears in the printed specification of the above numbered patent requiring correction and that the said Letters Patent should read as corrected below.

Column 2, line 22, before "establishing" insert -- drive --; line 32, after "controlling" strike out -- governing --; line 36, before "more" strike out -- drive-establishing --; line 37, before "device" insert -- drive-establishing; line 38, before "the" first occurrence, strike out "governing"; approximately line 57, for "accordanec" read -- accordance --; column 6, line 19, for "it adapted" read -- is adapted --; column 17, line 1, for "gears 142" read -- gears 132 --; column 25, line 31, for "valving" read -- valve --; line 34, for "lock 81" read -- lock 18 --; column 29, line 16, for "grooves" read -- groove --; column 38, line 63, for "is to" read -- is so --; column 43, line 73, for "shift" read -- shaft --; column 51, line 12, for "shaft" read -- shift --; column 65, line 50, for "axially on" read -- axially of --; column 72, line 58, before "driving" insert -- first --.

Signed and sealed this 17th day of September 1957.

(SEAL)
Attest:
KARL H. AXLINE                                        ROBERT C. WATSON
Attesting Officer                              Commissioner of Patents